US012007589B2

(12) United States Patent
Tsai et al.

(10) Patent No.: US 12,007,589 B2
(45) Date of Patent: Jun. 11, 2024

(54) IMAGING LENS SYSTEM, IMAGE CAPTURING MODULE AND ELECTRONIC DEVICE

(71) Applicant: LARGAN PRECISION CO., LTD., Taichung (TW)

(72) Inventors: Chun-Hua Tsai, Taichung (TW); Yu Chen Lai, Taichung (TW); Ming-Ta Chou, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 517 days.

(21) Appl. No.: 17/369,631

(22) Filed: Jul. 7, 2021

(65) Prior Publication Data

US 2022/0365254 A1 Nov. 17, 2022

(30) Foreign Application Priority Data

May 14, 2021 (TW) ................................ 110117582

(51) Int. Cl.
*G02B 5/00* (2006.01)
*G02B 7/02* (2021.01)

(52) U.S. Cl.
CPC ............ *G02B 5/005* (2013.01); *G02B 7/021* (2013.01); *G02B 7/028* (2013.01)

(58) Field of Classification Search
CPC ......... G02B 5/005; G02B 7/021; G02B 7/028
See application file for complete search history.

(56) References Cited

U.S. PATENT DOCUMENTS

| | | | | |
|---|---|---|---|---|
| 7,724,452 B2 | 5/2010 | Huang | | |
| 7,760,446 B2 * | 7/2010 | Watanabe | .............. | G02B 7/025 359/811 |
| 8,570,672 B2 | 10/2013 | Lin | | |
| 9,016,876 B2 * | 4/2015 | Lai | ..................... | G02B 13/0035 359/740 |
| 10,558,013 B2 | 2/2020 | Chou et al. | | |
| 10,663,697 B2 | 5/2020 | Chou | | |
| 11,353,676 B2 * | 6/2022 | Cheng | ................ | G02B 13/0045 |

(Continued)

FOREIGN PATENT DOCUMENTS

| | | |
|---|---|---|
| CN | 208636525 U | 3/2019 |
| CN | 210222335 U | 3/2020 |
| IN | 209525506 U | 10/2019 |

*Primary Examiner* — Bao-Luan Q Le
(74) *Attorney, Agent, or Firm* — Maschoff Brennan

(57) ABSTRACT

An imaging lens system includes a lens element and an aperture element surrounding an imaging optical path and forming an aperture. The aperture element includes a first conical surface, a second conical surface and a contact surface. The first and second conical surfaces surround the imaging optical path. The contact surface is perpendicular to the imaging optical path and contacts the lens element. When the imaging lens system is in a first environment condition, the first conical surface is in contact with the lens element, the second conical surface is spaced apart from the lens element, and the aperture is aligned with the optically effective region. When the imaging lens system is in a second environment condition, the second conical surface is in contact with the lens element, the first conical surface is spaced apart from the lens element, and the aperture is aligned with the optically effective region.

36 Claims, 42 Drawing Sheets

1126
E1
112
1124
E11
E12
1125

(56) References Cited

U.S. PATENT DOCUMENTS

| | | | | |
|---|---|---|---|---|
| 11,662,506 | B2 * | 5/2023 | Cheng | G02B 7/021<br>359/601 |
| 2006/0291076 | A1 * | 12/2006 | Watanabe | G02B 7/026<br>359/811 |
| 2012/0314288 | A1 * | 12/2012 | Lai | G02B 13/0035<br>359/503 |
| 2021/0080623 | A1 * | 3/2021 | Cheng | G02B 7/021 |
| 2021/0247586 | A1 * | 8/2021 | Cheng | G02B 7/022 |

* cited by examiner 7
74
79
781
78
752
7a
72
73
7b
7c
7e
7d
751

IMAGING LENS SYSTEM, IMAGE CAPTURING MODULE AND ELECTRONIC DEVICE

RELATED APPLICATIONS

This application claims priority to Taiwan Application 110117582, filed on May 14, 2021, which is incorporated by reference herein in its entirety.

BACKGROUND

Technical Field

The present disclosure relates to an imaging lens system, an image capturing module and an electronic device, more particularly to an imaging lens system and an image capturing module applicable to an electronic device.

Description of Related Art

With the development of semiconductor manufacturing technology, the performance of image sensors has been improved, and the pixel size thereof has been scaled down. Therefore, featuring high image quality becomes one of the indispensable features of an optical system nowadays. Furthermore, due to the rapid changes in technology, electronic devices equipped with optical systems are trending towards multi-functionality for various applications, and therefore the functionality requirements for the optical systems have been increasing.

In recent years, there is an increasing demand for electronic devices featuring compact size, but conventional optical systems are difficult to meet both the requirements of high image quality and compactness. Conventional camera modules usually have functionalities such as auto focus, optical image stabilization and optical zoom. However, in order to achieve the above functionalities, the structure of the camera modules becomes more complex and the size thereof also increases, and thus, the size of electronic devices equipped with the camera modules also increases. When conventional optical lens systems experience changes of environmental conditions, optical elements, such as lens elements and aperture elements, thereof may have a displacement in a direction perpendicular to the imaging optical path, so that the optical elements cannot be aligned with one another, thereby degrading the image quality.

SUMMARY

According to one aspect of the present disclosure, an imaging lens system includes a first lens element and an aperture element. The first lens element has an optically effective region, and an imaging optical path of the imaging lens system passes through the optically effective region. The aperture element surrounds the imaging optical path and forms an aperture, and the aperture element faces and is in physical contact with an object side or an image side of the first lens element. One side of the aperture element facing the first lens element includes a first conical surface, a second conical surface and a contact surface. The first conical surface surrounds the imaging optical path. The second conical surface surrounds the imaging optical path, and the second conical surface is located closer to the aperture than the first conical surface to the aperture. The contact surface is substantially perpendicular to the imaging optical path, and the contact surface is in physical contact with the first lens element. When the imaging lens system is in a first environment condition, the first conical surface is in physical contact with the first lens element, the second conical surface is spaced apart from the first lens element, and the aperture is aligned with the optically effective region. When the imaging lens system is in a second environment condition, the second conical surface is in physical contact with the first lens element, the first conical surface is spaced apart from the first lens element, and the aperture is aligned with the optically effective region. In addition, the first environment condition and the second environment condition have at least one of the following relations:

a temperature dependent relation, wherein a temperature of the first environment condition is Ta, a temperature of the second environment condition is Tb, and the following condition is satisfied: $6\ K \leq |Ta-Tb| \leq 198\ K$; and a humidity dependent relation, wherein a relative humidity of the first environment condition is RHa, a relative humidity of the second environment condition is RHb, and the following condition is satisfied: $14\% \leq |RHa-RHb| \leq 81\%$.

According to another aspect of the present disclosure, an imaging lens system includes a first aperture element and a second aperture element. The first aperture element surrounds an imaging optical path of the imaging lens system and forms a first aperture. The second aperture element surrounds the imaging optical path and forms a second aperture, and the second aperture element faces and is in physical contact with an object side or an image side of the first aperture element. One side of the first aperture element facing the second aperture element includes a first conical surface, a second conical surface and a contact surface. The first conical surface surrounds the imaging optical path. The second conical surface surrounds the imaging optical path, and the second conical surface is located closer to the first aperture than the first conical surface to the first aperture. The contact surface is substantially perpendicular to the imaging optical path, and the contact surface is in physical contact with the second aperture element. When the imaging lens system is in a first environment condition, the first conical surface is in physical contact with the second aperture element, the second conical surface is spaced apart from the second aperture element, and the first aperture is aligned with the second aperture. When the imaging lens system is in a second environment condition, the second conical surface is in physical contact with the second aperture element, the first conical surface is spaced apart from the second aperture element, and the first aperture is aligned with the second aperture. In addition, the first environment condition and the second environment condition have at least one of the following relations:

a temperature dependent relation, wherein a temperature of the first environment condition is Ta, a temperature of the second environment condition is Tb, and the following condition is satisfied: $6\ K \leq |Ta-Tb| \leq 198\ K$; and a humidity dependent relation, wherein a relative humidity of the first environment condition is RHa, a relative humidity of the second environment condition is RHb, and the following condition is satisfied: $14\% \leq |RHa-RHb| \leq 81\%$.

According to another aspect of the present disclosure, an imaging lens system includes a first lens element and a second lens element. The first lens element has a first optically effective region, and an imaging optical path of the imaging lens system passes through the first optically effective region. The second lens element includes a second optically effective region and an opaque region. The imaging optical path passes through the second optically effective region. The opaque region is located farther away from the imaging optical path than the second optically effective region to the imaging optical path, and the opaque region faces and is in physical contact with an object side or an image side of the first lens element. One side of the opaque region facing the first lens element includes a first conical surface, a second conical surface and a contact surface. The first conical surface surrounds the imaging optical path. The second conical surface surrounds the imaging optical path, and the second conical surface is located closer to the second optically effective region than the first conical surface to the second optically effective region. The contact surface is substantially perpendicular to the imaging optical path, and the contact surface is in physical contact with the first lens element. When the imaging lens system is in a first environment condition, the first conical surface is in physical contact with the first lens element, the second conical surface is spaced apart from the first lens element, and the first optically effective region is aligned with the second optically effective region. When the imaging lens system is in a second environment condition, the second conical surface is in physical contact with the first lens element, the first conical surface is spaced apart from the first lens element, and the first optically effective region is aligned with the second optically effective region. In addition, the first environment condition and the second environment condition have at least one of the following relations:

a temperature dependent relation, wherein a temperature of the first environment condition is Ta, wherein a temperature of the second environment condition is Tb, and the following condition is satisfied: $6\ K \leq |Ta-Tb| \leq 198\ K$; and a humidity dependent relation, wherein a relative humidity of the first environment condition is RHa, a relative humidity of the second environment condition is RHb, and the following condition is satisfied: $14\% \leq |RHa-RHb| \leq 81\%$.

According to another aspect of the present disclosure, an image capturing module includes one of the aforementioned imaging lens systems and an image sensor. The image sensor is disposed on an image surface of the imaging lens system.

According to another aspect of the present disclosure, an electronic device includes the aforementioned image capturing module.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
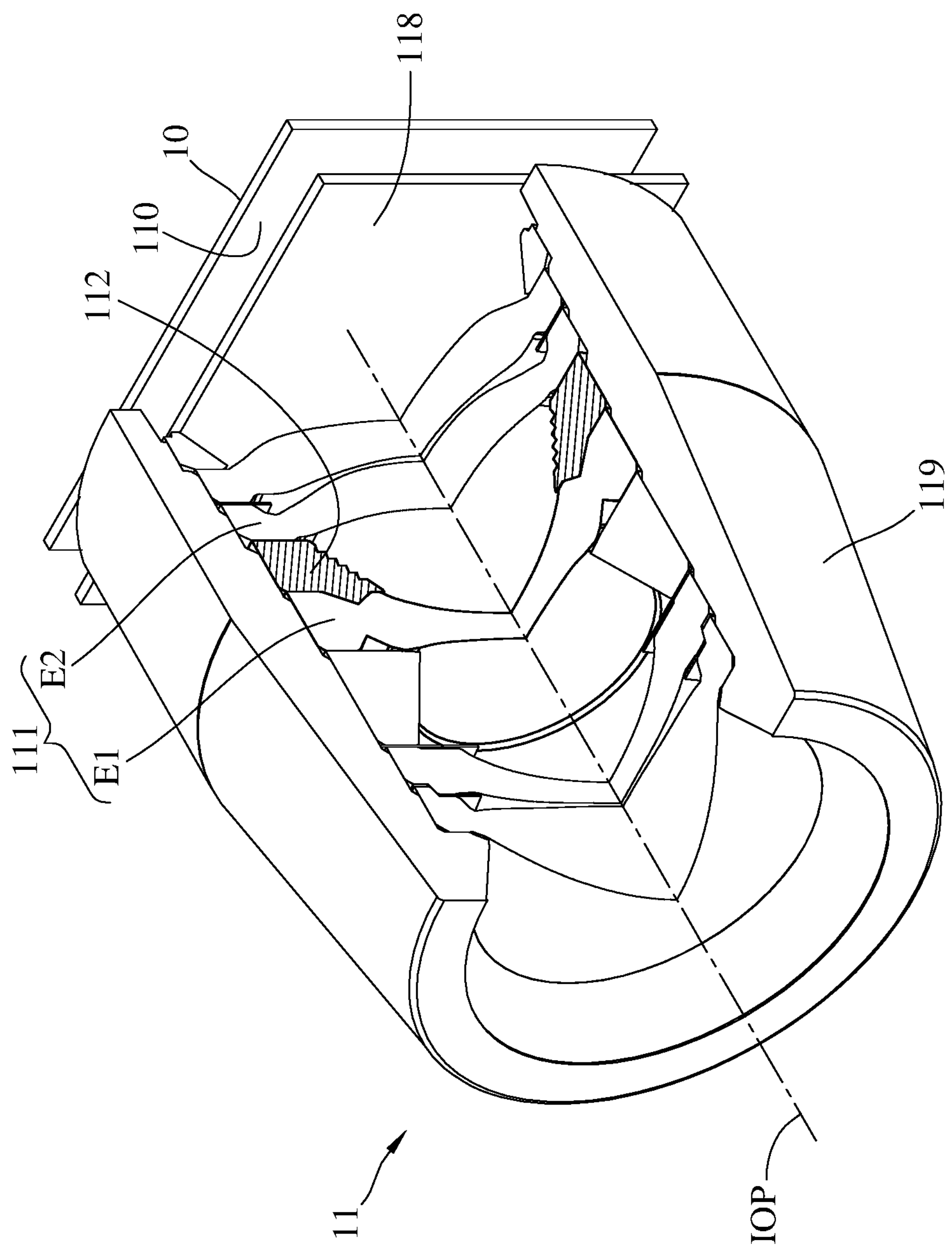
FIG. 1 is a sectional perspective view of an image capturing module according to the 1st embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure provides an imaging lens system. The imaging lens system includes a first lens element and an aperture element. The first lens element has an optically effective region, and an imaging optical path of the imaging lens system pass through the optically effective region. The aperture element surrounds the imaging optical path and forms an aperture, and the aperture element faces and is in physical contact with an object side or an image side of the first lens element.

One side of the aperture element facing the first lens element includes a first conical surface, a second conical surface and a contact surface. The first conical surface surrounds the imaging optical path. The second conical surface surrounds the imaging optical path, and the second conical surface is located closer to the aperture than the first conical surface to the aperture. The contact surface is substantially perpendicular to the imaging optical path, and the contact surface is in physical contact with the first lens element. Moreover, the aperture element has a light-shielding function for blocking or absorbing non-imaging light so as to improve image quality. Furthermore, the aperture element can have functions of maintaining spacing between lens elements and fastening lens element(s).

When the imaging lens system is in a first environment condition, the first conical surface is in physical contact with the first lens element, the second conical surface is spaced apart from the first lens element, and the aperture is aligned with the optically effective region. When the imaging lens system is in a second environment condition, the second conical surface is in physical contact with the first lens element, the first conical surface is spaced apart from the first lens element, and the aperture is aligned with the optically effective region. In addition, the first environment condition and the second environment condition have at least one of the following relations: a temperature dependent relation, wherein a temperature of the first environment condition is Ta, a temperature of the second environment condition is Tb, and the following condition is satisfied: 6 Kelvin (K)$\leq|Ta-Tb|\leq$198 K; and a humidity dependent relation, wherein a relative humidity of the first environment condition is RHa, a relative humidity of the second environment condition is RHb, and the following condition is satisfied: 14%$\leq|RHa-RHb|\leq$81%. In detail, aperture element and lens element have different rates of volume change in the first and second environment conditions, which can be because aperture element and lens element have different thermal expansion coefficients, and because aperture element and lens element have different water absorption rates or different degrees of sensitivity of volume change to humidity, and even because different rates of volume change caused by components arrangement of the imaging lens system with gradients of temperature or humidity existing in the imaging lens system, and aperture element and lens element can be made of the same material. Therefore, the lens element and the aperture element restrict each other's relative displacement in a direction perpendicular to the imaging optical path during temperature and/or humidity changes so as to achieve double alignments, which can reduce the possibility of axes misalignment between the lens element and the aperture element. Furthermore, by having the first conical surface and the second conical surface in physical contact with the lens element not at the same time, the collaboration between lens elements may not be influenced due to mechanical interferences. Moreover, when the first environment condition and the second environment condition have the temperature dependent relation, the following condition can also be satisfied: 10 K$\leq|Ta-Tb|\leq$100 K.

Moreover, when the first environment condition and the second environment condition have the temperature dependent relation, the following condition can also be satisfied: 15 K$\leq|Ta-Tb|\leq$50 K. Moreover, when the first environment condition and the second environment condition have the humidity dependent relation, the following condition can also be satisfied: 20%$\leq|RHa-RHb|\leq$60%. Said "when the imaging lens system is in one environment condition" can refer to that the imaging lens system is in the environment condition for a period of time and there is no obvious change of the environment condition. For example, in a condition of the temperature dependent relation, the imaging lens system is in a specific environmental temperature for a period of time, and it is confirmed that there is no obvious increase or decrease in temperature in this environment, which can be, for instance, a temperature difference of 6K or less being maintained.

With the above configuration, the lens element and the aperture element can be maintained aligned with each other along the imaging optical path even though the imaging lens system experiences environment changes, and the lens element and the aperture element can still collaborate with each other when the environment condition returns to its original state, so that the resistance of the imaging lens system against environmental factors can be improved. Furthermore, the imaging lens system can further resist against external forces such as impacts of falling objects and vibrations. Moreover, the contact surface of the aperture element is maintained in physical contact with the first lens element during environment changes. Said environment changes can refer to temperature changes, humidity changes or in an environment of high temperature and high humidity for a long period of time.

The first lens element can further include a first counterpart conical surface and a second counterpart conical surface. The first counterpart conical surface and the first conical surface are disposed corresponding to each other, and the second counterpart conical surface and the second conical surface are disposed corresponding to each other. In addition, on a plane perpendicular to the imaging optical path and crossing the first conical surface, the first counterpart conical surface, the second conical surface and the second counterpart conical surface, when a minimum distance between the first conical surface and the second conical surface is D, and a minimum distance between the first counterpart conical surface and the second counterpart conical surface is d, the following condition can be satisfied: 0.2 um$\leq$|D−d|$\leq$19.8 um. Therefore, by the control to the distance (ID-di) between the conical surfaces, an optimal design of the imaging lens system according to actual circumstances can be achieved. Moreover, the following condition can also be satisfied: 1.0 um$\leq$|D−d|$\leq$9.8 um. Moreover, the following condition can also be satisfied: 2.0 um$\leq$|D−d|$\leq$3.5 um. Please refer to FIG. 6, which shows a schematic view of D and d according to the 1st embodiment of the present disclosure.

The first lens element can further include an opaque region surrounding the optically effective region and having the first counterpart conical surface and the second counterpart conical surface. Therefore, the opaque region can block non-imaging light from entering the image sensor and thus reduce flare so as to improve image quality. Moreover, the opaque region and the optically effective region can be jointed together by two-shot molding process to integrally form the first lens element. In addition, the opaque region and the optically effective region can be made of the same material, and the opaque region can be formed by adding opaque pigments. Therefore, the connection between the opaque region and the optically effective region can be enhanced. Moreover, the opaque region and the optically effective region can alternatively be made of different materials, and the opaque region and the optically effective region can be connected to each other in an embedded manner. Therefore, the connection between the optically effective region and the opaque region can be enhanced.

When an angle between the first conical surface and the second conical surface on a plane parallel to the imaging optical path is θ, the following condition can be satisfied: 12 degrees$\leq\theta\leq$145 degrees. Therefore, directions of forces exerted on the lens element and the aperture element can be controlled so as to prevent warpage of the lens element and the aperture element when thermal expansion or contraction occurs. Moreover, the following condition can also be satisfied: 15 degrees$\leq\theta\leq$90 degrees. Moreover, the following condition can also be satisfied: 20 degrees$\leq\theta\leq$60 degrees. Please refer to FIG. 6, which shows a schematic view of θ according to the 1st embodiment of the present disclosure.

According to the present disclosure, the imaging lens system can further include a second lens element, and the aperture element can further include an inner surface. The inner surface surrounds the imaging optical path and forms the aperture, and the second lens element is disposed in the aperture and is in physical contact with the inner surface. Therefore, the aperture element can provide both functionalities of blocking non-imaging light and fastening the lens element, so that the number of components can be reduced, thereby increasing manufacturing efficiency.

The aperture element can further include an anti-reflective structure covering at least a part of the inner surface. Therefore, the anti-reflective structure can reduce flare generated due to non-imaging light reflected by the inner surface. Moreover, the anti-reflective structure can be a peak-valley structure having several protrusions. In addition, the anti-reflective structure can also be a coating layer having a light absorption functionality, and the present disclosure is not limited thereto.

The second lens element and the aperture element can be integrally jointed together by two-shot molding process. Therefore, it can reduce steps of assembly process and assembly errors of the second lens element and the aperture element.

The first lens element can be a reflection lens element which includes, in order from the object side to the image side along the imaging optical path, a light entrance surface, at least one reflecting surface and a light exit surface, and the imaging optical path is folded at the reflecting surface. Therefore, the lens element can further provide a light folding functionality so as to reduce the height of the imaging lens system.

According to the present disclosure, the imaging lens system can further include a light-shielding element disposed between the first lens element and the aperture element. Therefore, the light-shielding element can block non-imaging light so as to reduce flare and thus improve image quality.

There can be at least one of the first conical surface and the second conical surface not entirely surrounding the imaging optical path. Therefore, the size of the imaging lens system can be reduced, thereby reducing the size of the electronic device. Furthermore, it can correspond to non-circular lens elements (e.g., prism or lens element having reducing surfaces) and non-circular aperture elements. Moreover, each of the first conical surface and the second conical surface can be in a C-shape.

The aperture element can be an opaque element. For example, the aperture element can be an opaque plastic component, ceramic component or metallic component, but the present disclosure is not limited to the above exemplary materials.

According to the present disclosure, the imaging lens system can further include a third lens element spaced apart from the first lens element, and the aperture element is disposed between the first lens element and the third lens element. Therefore, the aperture element can be a spacer between two lens elements.

The aforedisclosed imaging lens system includes the aperture element for restricting the displacement of lens element in the direction perpendicular to the imaging optical path. However, the present disclosure is not limited to the configuration of the aperture element in physical contact with the lens element. The present disclosure provides another imaging lens system. The imaging lens system includes a first aperture element and a second the aperture element. The first aperture element surrounds an imaging optical path of the imaging lens system and forms a first aperture. The second aperture element surrounds the imaging optical path and forms a second aperture, and the second aperture element faces and is in physical contact with an object side or an image side of the first aperture element.

One side of the first aperture element facing the second aperture element includes a first conical surface, a second conical surface and a contact surface. The first conical surface surrounds the imaging optical path. The second conical surface surrounds the imaging optical path, and the second conical surface is located closer to the first aperture than the first conical surface to the first aperture. The contact surface is substantially perpendicular to the imaging optical path, and the contact surface is in physical contact with the second aperture element. Moreover, the aperture element has a light-shielding function for blocking or absorbing non-imaging light so as to improve image quality. Furthermore, the aperture element can have functions of maintaining spacing between lens elements and fastening lens element(s).

When the imaging lens system is in a first environment condition, the first conical surface is in physical contact with the second aperture element, the second conical surface is spaced apart from the second aperture element, and the first aperture is aligned with the second aperture. When the imaging lens system is in a second environment condition, the second conical surface is in physical contact with the second aperture element, the first conical surface is spaced apart from the second aperture element, and the first aperture is aligned with the second aperture. In addition, the first environment condition and the second environment condition have at least one of the following relations: a temperature dependent relation, wherein a temperature of the first environment condition is Ta, a temperature of the second environment condition is Tb, and the following condition is satisfied: $6\ K \leq |Ta-Tb| \leq 198\ K$; and a humidity dependent relation, wherein a relative humidity of the first environment condition is RHa, a relative humidity of the second environment condition is RHb, and the following condition is satisfied: $14\% \leq |RHa-RHb| \leq 81\%$. Therefore, the aperture elements restrict each other's relative displacement in a direction perpendicular to the imaging optical path during temperature and/or humidity changes so as to achieve double alignments, which can reduce the possibility of axes misalignment between the aperture elements. Furthermore, by having the first conical surface and the second conical surface in physical contact with the second aperture element not at the same time, the collaboration between lens elements may not be influenced due to mechanical interferences. Moreover, when the first environment condition and the second environment condition have the temperature dependent relation, the following condition can also be satisfied: $10\ K \leq |Ta-Tb| \leq 100\ K$. Moreover, when the first environment condition and the second environment condition have the temperature dependent relation, the following condition can also be satisfied: $15\ K \leq |Ta-Tb| \leq 50\ K$. Moreover, when the first environment condition and the second environment condition have the humidity dependent relation, the following condition can also be satisfied: $20\% \leq |RHa-RHb| \leq 60\%$.

With the above configuration, the aperture elements can be maintained aligned with each other along the imaging optical path even though the imaging lens system experiences environment changes, and the aperture elements can still collaborate with each other when the environment condition returns to its original state, so that the resistance of the imaging lens system against environmental factors can be improved. Furthermore, the imaging lens system can further resist against external forces such as impacts of falling objects and vibrations. Moreover, the contact surface of the first aperture element is maintained in physical contact with the second aperture element during environment changes. Said environment changes can refer to temperature changes, humidity changes or in an environment of high temperature and high humidity for a long period of time.

The second aperture element can further include a first counterpart conical surface and a second counterpart conical surface. The first counterpart conical surface and the first conical surface are disposed corresponding to each other, and the second counterpart conical surface and the second conical surface are disposed corresponding to each other. In addition, on a plane perpendicular to the imaging optical path and crossing the first conical surface, the first counterpart conical surface, the second conical surface and the second counterpart conical surface, when a minimum distance between the first conical surface and the second conical surface is D, and a minimum distance between the first counterpart conical surface and the second counterpart conical surface is d, the following condition can be satisfied: $0.2\ um \leq |D-d| \leq 19.8\ um$. Therefore, by the control to the distance (ID-di) between the conical surfaces, an optimal design of the imaging lens system according to actual circumstances can be achieved. Moreover, the following condition can also be satisfied: $1.0\ um \leq |D-d| \leq 9.8\ um$. Moreover, the following condition can also be satisfied: $2.0\ um \leq |D-d| \leq 3.5\ um$.

When an angle between the first conical surface and the second conical surface on a plane parallel to the imaging optical path is θ, the following condition can be satisfied: $12\ degrees \leq \theta \leq 145\ degrees$. Therefore, directions of forces exerted on the aperture elements can be controlled so as to prevent warpage of the aperture elements when thermal expansion or contraction occurs. Moreover, the following condition can also be satisfied: $15\ degrees \leq \theta \leq 90\ degrees$. Moreover, the following condition can also be satisfied: $20\ degrees \leq \theta \leq 60\ degrees$.

According to the present disclosure, the imaging lens system can further include a first lens element, and the first aperture element can further include an inner surface. The inner surface surrounds the imaging optical path and forms the first aperture, and the first lens element is disposed in the first aperture and is in physical contact with the inner surface. Therefore, the aperture element can provide both functionalities of blocking non-imaging light and fastening the lens element, so that the number of components can be reduced, thereby increasing manufacturing efficiency.

The first aperture element can further include an anti-reflective structure covering at least a part of the inner surface. Therefore, the anti-reflective structure can reduce flare generated due to non-imaging light reflected by the inner surface. Moreover, the anti-reflective structure can be a peak-valley structure having several protrusions. In addition, the anti-reflective structure can also be a coating layer having a light absorption functionality, and the present disclosure is not limited thereto.

The first lens element and the first aperture element can be integrally jointed together by two-shot molding process. Therefore, it can reduce steps of assembly process and assembly errors of the first lens element and the aperture element. Moreover, the first lens element and the first aperture element can be made of the same material. Therefore, the connection between the first lens element and the first aperture element can be enhanced. Moreover, the first lens element and the first aperture element can alternatively be made of different materials, and the first lens element and the first aperture element can be connected to each other in an embedded manner. Therefore, the connection between the optically effective region and the opaque region can be enhanced.

The first lens element can be a reflection lens element which includes, in order from the object side to the image side along the imaging optical path, a light entrance surface, at least one reflecting surface and a light exit surface, and the imaging optical path is folded at the reflecting surface. Therefore, the lens element can further provide a light folding functionality so as to reduce the height of the imaging lens system.

According to the present disclosure, the imaging lens system can further include a light-shielding element disposed between the first aperture element and the second aperture element. Therefore, the light-shielding element can block non-imaging light so as to reduce flare and thus improve image quality.

There can be at least one of the first conical surface and the second conical surface not entirely surrounding the imaging optical path. Therefore, the size of the imaging lens system can be reduced, thereby reducing the size of the electronic device. Furthermore, it can correspond to non-circular lens elements (e.g., prism or lens element having reducing surfaces) and non-circular aperture elements. Moreover, each of the first conical surface and the second conical surface can be in a C-shape.

Each of the first aperture element and the second aperture element can be an opaque element. For example, the aperture element can be an opaque plastic component, ceramic component or metallic component, but the present disclosure is not limited to the above exemplary materials.

The aforedisclosed imaging lens system includes additional individual aperture element. However, lens elements of the present disclosure may also be provided with structures thereon similar to that on the aforementioned aperture element. The present disclosure provides another imaging lens system. The imaging lens system includes a first lens element and a second lens element. The first lens element has a first optically effective region, and an imaging optical path of the imaging lens system passes through the first optically effective region. The second lens element includes a second optically effective region and an opaque region. The imaging optical path passes through the second optically effective region. The opaque region is located farther away from the imaging optical path than the second optically effective region to the imaging optical path, and the opaque region faces and is in physical contact with an object side or an image side of the first lens element.

One side of the opaque region facing the first lens element includes a first conical surface, a second conical surface and a contact surface. The first conical surface surrounds the imaging optical path. The second conical surface surrounds the imaging optical path, and the second conical surface is located closer to the second optically effective region than the first conical surface to the second optically effective region. The contact surface is substantially perpendicular to the imaging optical path, and the contact surface is in physical contact with the first lens element. Moreover, the opaque region has a light-shielding function for blocking or absorbing non-imaging light so as to improve image quality. Furthermore, aperture element can have functions of maintaining spacing between lens elements and fastening lens element(s).

When the imaging lens system is in a first environment condition, the first conical surface is in physical contact with the first lens, the second conical surface is spaced apart from the first lens element, and the first optically effective region is aligned with the second optically effective region. When the imaging lens system is in a second environment condition, the second conical surface is in physical contact with the first lens element, the first conical surface is spaced apart from the first lens element, and the first optically effective region is aligned with the second optically effective region. In addition, the first environment condition and the second environment condition have at least one of the following relations: a temperature dependent relation, wherein a temperature of the first environment condition is Ta, a temperature of the second environment condition is Tb, and the following condition is satisfied: $6\ K \leq |Ta-Tb| \leq 198\ K$; and a humidity dependent relation, wherein a relative humidity of the first environment condition is RHa, a relative humidity of the second environment condition is RHb, and the following condition is satisfied: $14\% \leq |RHa-RHb| \leq 81\%$. Moreover, when the first environment condition and the second environment condition have the temperature dependent relation, the following condition can also be satisfied: $10\ K \leq |Ta-Tb| \leq 100\ K$. Moreover, when the first environment condition and the second environment condition have the temperature dependent relation, the following condition can also be satisfied: $15\ K \leq |Ta-Tb| \leq 50\ K$. Moreover, when the first environment condition and the second environment condition have the humidity dependent relation, the following condition can also be satisfied: $20\% \leq |RHa-RHb| \leq 60\%$.

With the above configuration, the lens elements can be maintained aligned with each other along the imaging optical path even though the imaging lens system experiences environment changes, and the lens elements can still collaborate with each other when the environment condition returns to its original state, so that the resistance of the imaging lens system against environmental factors can be improved. Said environment changes can refer to temperature changes, humidity changes or in an environment of high temperature and high humidity for a long period of time. Furthermore, the imaging lens system can further resist against external forces such as impacts of falling objects and vibrations. Moreover, the contact surface of the opaque region of the second lens element is maintained in physical contact with the first lens element during environment changes.

The first lens element can further include a first counterpart conical surface and a second counterpart conical surface. The first counterpart conical surface and the first conical surface are disposed corresponding to each other, and the second counterpart conical surface and the second conical surface are disposed corresponding to each other. In addition, on a plane perpendicular to the imaging optical path and crossing the first conical surface, the first counterpart conical surface, the second conical surface and the second counterpart conical surface, when a minimum distance between the first conical surface and the second conical surface is D, and a minimum distance between the first counterpart conical surface and the second counterpart conical surface is d, the following condition can be satisfied: 0.2 um≤|D−d|≤19.8 um. Therefore, by the control to the distance (|D-d|) between the conical surfaces, an optimal design of the imaging lens system according to actual circumstances can be achieved. Moreover, the following condition can also be satisfied: 1.0 um≤|D−d|≤9.8 um. Moreover, the following condition can also be satisfied: 2.0 um≤|D−d|≤3.5 um.

When an angle between the first conical surface and the second conical surface on a plane parallel to the imaging optical path is θ, the following condition can be satisfied: 12 degrees≤θ≤145 degrees. Therefore, directions of forces exerted on the lens elements can be controlled so as to prevent warpage of the lens elements when thermal expansion or contraction occurs. Moreover, the following condition can also be satisfied: 15 degrees≤θ≤90 degrees. Moreover, the following condition can also be satisfied: 20 degrees≤θ≤60 degrees.

The opaque region can further include an inner surface and an anti-reflective structure. The inner surface faces the imaging optical path, and the anti-reflective structure covers at least a part of the inner surface. Therefore, the anti-reflective structure can reduce flare generated due to non-imaging light reflected by the inner surface. Moreover, the anti-reflective structure can be a peak-valley structure having several protrusions. In addition, the anti-reflective structure can also be a coating layer having a light absorption functionality, and the present disclosure is not limited thereto.

One of the first lens element and the second lens element can be a reflection lens element which includes, in order from the object side to the image side along the imaging optical path, a light entrance surface, at least one reflecting surface and a light exit surface, and the imaging optical path is folded at the reflecting surface. Therefore, the lens element can further provide a light folding functionality so as to reduce the height of the imaging lens system.

According to the present disclosure, the imaging lens system can further include a light-shielding element disposed between the first lens element and the second lens element. Therefore, the light-shielding element can block non-imaging light so as to reduce flare and thus improve image quality.

There can be at least one of the first conical surface and the second conical surface not entirely surrounding the imaging optical path. Therefore, the size of the imaging lens system can be reduced, thereby reducing the size of the electronic device. Furthermore, it can correspond to non-circular lens elements (e.g., prism or lens element having reducing surfaces) and non-circular aperture elements. Moreover, each of the first conical surface and the second conical surface can be in a C-shape.

The opaque region and the second optically effective region can be jointed together by two-shot molding process to integrally form the second lens element. In addition, the opaque region and the optically effective region can be made of the same material, and the opaque region can be formed by adding opaque pigments. Therefore, the connection between the opaque region and the optically effective region can be enhanced. Moreover, the opaque region and the optically effective region can alternatively be made of different materials, and the opaque region and the optically effective region can be connected to each other in an embedded manner. Therefore, the connection between the optically effective region and the opaque region can be enhanced. Additionally, the opaque region can be an aperture element, and the opaque region surrounds the imaging optical path and forms an aperture. For example, the aperture element can be an opaque plastic component, ceramic component or metallic component, but the present disclosure is not limited to the above exemplary materials.

The present disclosure provides an image capturing module, which includes at least one of the aforementioned imaging lens systems and an image sensor. The image sensor is disposed on an image surface of the imaging lens system.

The present disclosure provides an electronic device, which includes the aforementioned image capturing module.

According to the present disclosure, the aforementioned features and conditions can be utilized in numerous combinations so as to achieve corresponding effects.

According to the above description of the present disclosure, the following specific embodiments are provided for further explanation.

1st Embodiment

Figure 2:
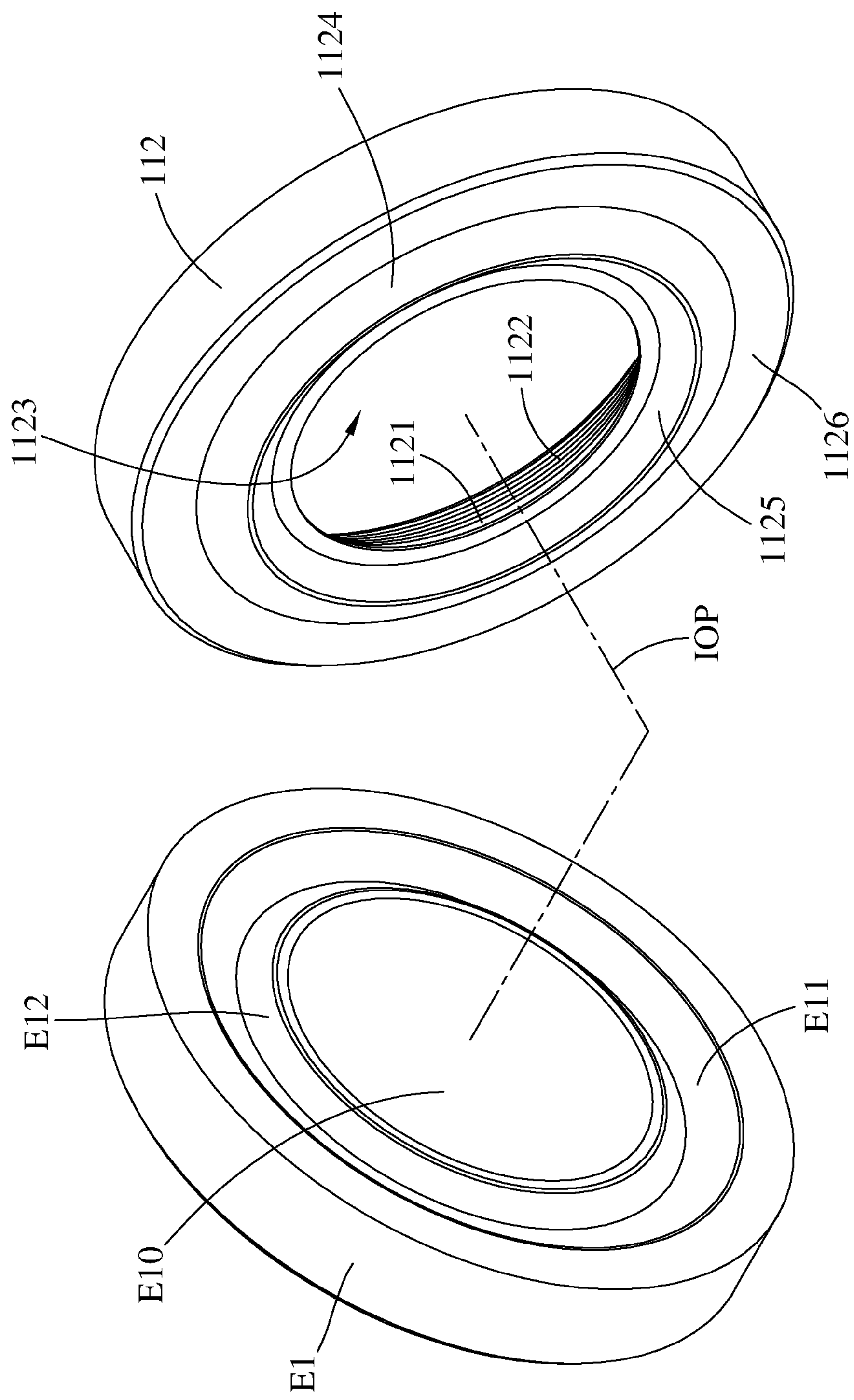
FIG. 2 is an exploded view of a first lens element and an aperture element of an imaging lens system of the image capturing module in FIG. 1.
Figure 3:
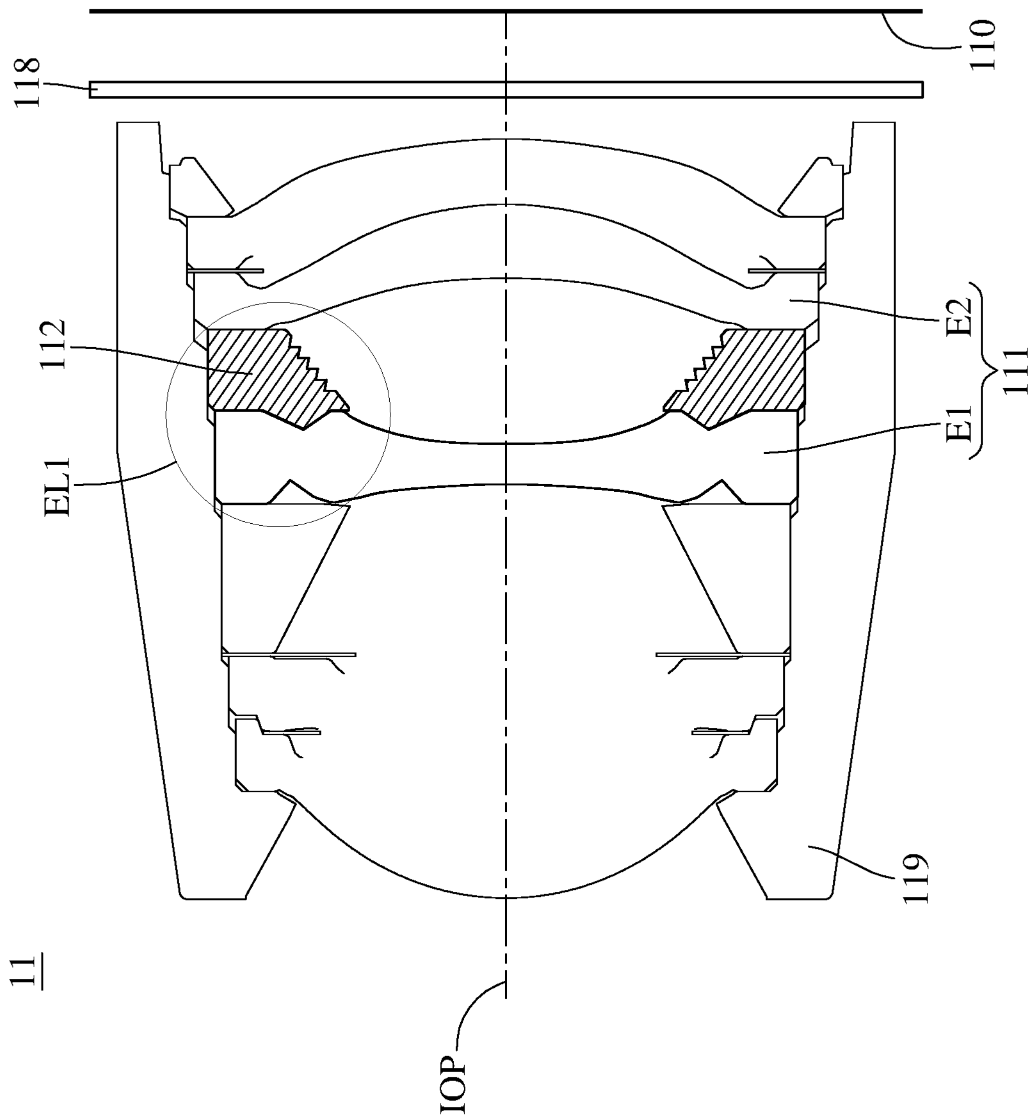
FIG. 3 is a cross-sectional view of the imaging lens system of the image capturing module in FIG. 1.
Figure 4:
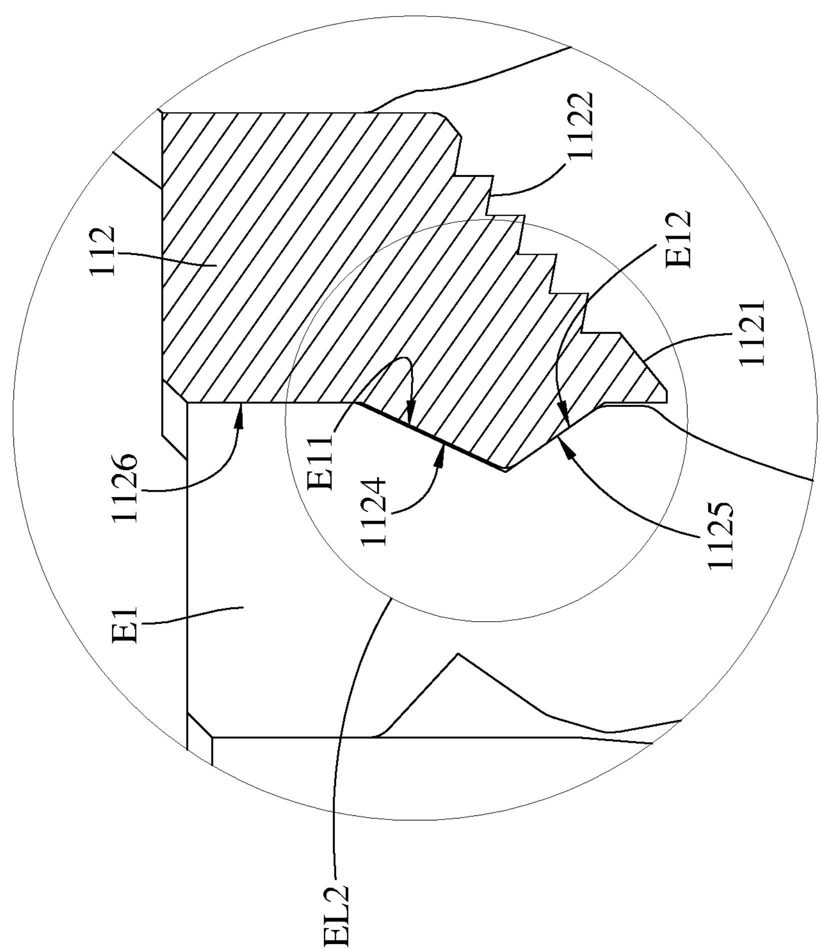
FIG. 4 is an enlarged view of region EL1 in FIG. 3.
Figure 6:
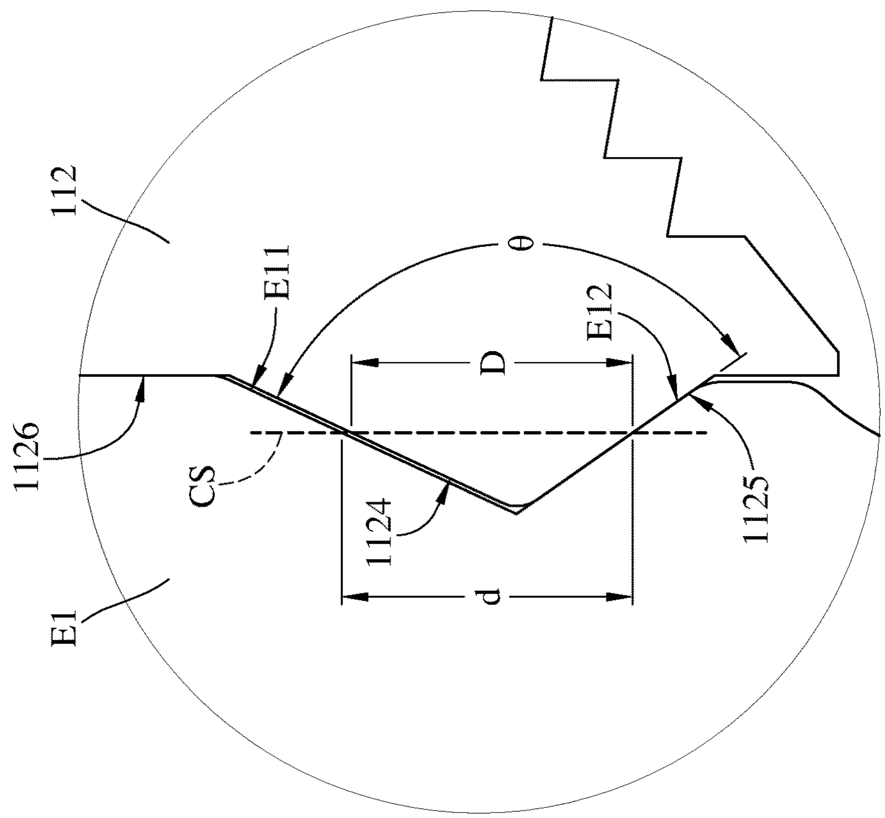
FIG. 6 is an enlarged view of region EL2 in FIG. 4 when the imaging lens system is in a second environment condition.
Figure 5:
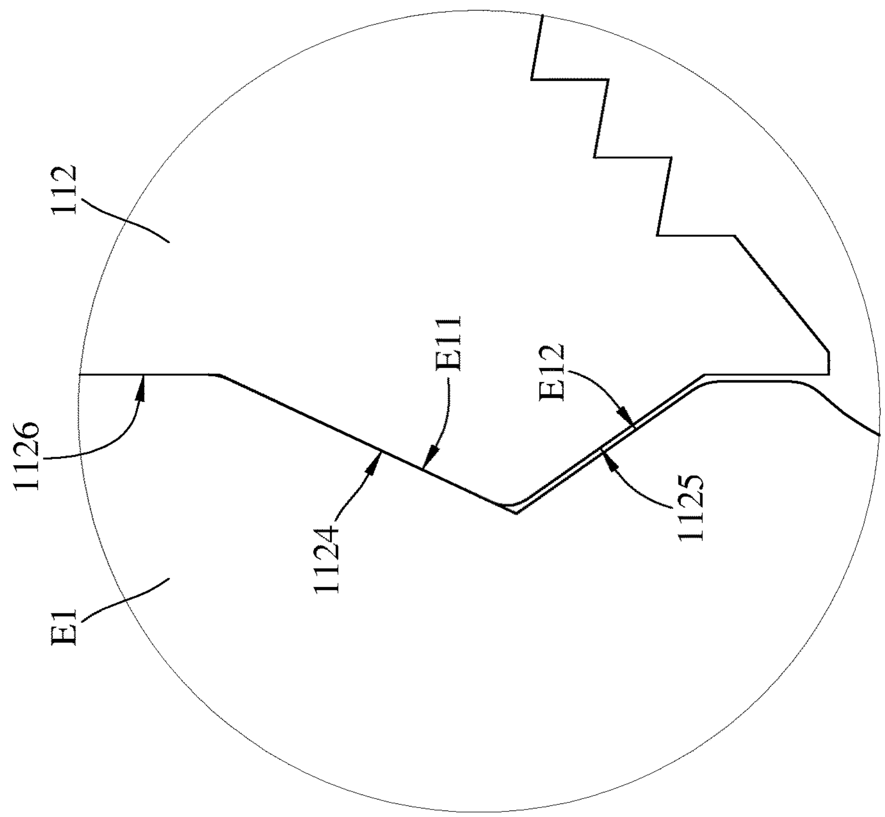
FIG. 5 is an enlarged view of region EL2 in FIG. 4 when the imaging lens system is in a first environment condition.

Please refer to FIG. 1 to FIG. 6. FIG. 1 is a sectional perspective view of an image capturing module according to the 1st embodiment of the present disclosure, FIG. 2 is an exploded view of a first lens element and an aperture element of an imaging lens system of the image capturing module in FIG. 1, FIG. 3 is a cross-sectional view of the imaging lens system of the image capturing module in FIG. 1, FIG. 4 is an enlarged view of region EL1 in FIG. 3, FIG. 5 is an enlarged view of region EL2 in FIG. 4 when the imaging lens system is in a first environment condition, and FIG. 6 is an enlarged view of region EL2 in FIG. 4 when the imaging lens system is in a second environment condition.

In this embodiment, an image capturing module includes an imaging lens system 11 and an image sensor 10, and the image sensor 10 is disposed on an image surface 110 of the imaging lens system 11.

The imaging lens system 11 includes an imaging lens assembly 111, an aperture element 112, a filter 118 and a barrel 119. The barrel 119 is configured for holding the imaging lens assembly 111 and the aperture element 112. The filter 118 is disposed between the imaging lens assembly 111 and the image surface 110.

The imaging lens assembly 111 includes, in order from an object side to an image side along an imaging optical path 10P of the imaging lens system 11, a first lens element E1 and a second lens element E2. The first lens element E1 has an optically effective region E10, and the imaging optical path 10P passes through the optically effective region E10 of the first lens element E1.

The aperture element 112 is disposed between the first lens element E1 and the second lens element E2. The aperture element 112 faces and is in physical contact with an image side of the first lens element E1. The aperture element 112 works as a spacer between adjacent two lens elements. Furthermore, the aperture element 112 is an opaque element which includes an inner surface 1121 and an anti-reflective structure 1122. The inner surface 1121 surrounds the imaging optical path 10P and forms an aperture 1123, and the anti-reflective structure 1122 covers at least a part of the inner surface 1121. The anti-reflective structure 1122 includes a plurality of annular grooves surrounding the imaging optical path 10P, and the annular grooves are adjacently arranged to form a convex-concave structure which reduces the amount of non-imaging light reaching the image sensor 10 by reflection on the inner surface 1121, so that the aperture element 112 can reduce flare. In this embodiment, the aperture element 112 is, for example, an opaque plastic component, ceramic component or metallic component.

One side of the aperture element 112 facing the first lens element E1 further includes a first conical surface 1124, a second conical surface 1125 and a contact surface 1126. The first conical surface 1124 surrounds the imaging optical path 10P with the imaging optical path 10P as an axis. The second conical surface 1125 surrounds the imaging optical path 10P with the imaging optical path 10P as an axis, and the second conical surface 1125 is located closer to the aperture 1123 than the first conical surface 1124 to the aperture 1123. The contact surface 1126 is substantially perpendicular to the imaging optical path 10P, and the contact surface 1126 is in physical contact with the first lens element E1.

One side of the first lens element E1 facing the aperture element 112 further includes a first counterpart conical surface E11 and a second counterpart conical surface E12. The first counterpart conical surface E11 and the first conical surface 1124 are disposed corresponding to each other, and the second counterpart conical surface E12 and the second conical surface 1125 are disposed corresponding to each other.

As shown in FIG. 5, when the imaging lens system 11 is in a first environment condition, the first conical surface 1124 is in physical contact with the first lens element E1, and the second conical surface 1125 is spaced apart from the first lens element E1. In the meantime, the aperture 1123 of the aperture element 112 is aligned with the optically effective region E10 of the first lens element E1. In addition, as shown in FIG. 6, when the imaging lens system 11 is in a second environment condition, the second conical surface 1125 is in physical contact with the first lens element E1, and the first conical surface 1124 is spaced apart from the first lens element E1. In the meantime, the aperture 1123 of the aperture element 112 is aligned with the optically effective region E10 of the first lens element E1. Moreover, the contact surface 1126 of the aperture element 112 is maintained in physical contact with the first lens element E1 during environment changes. In this embodiment, the first environment condition and the second environment condition have a humidity dependent relation. When a relative humidity of the first environment condition is RHa, and a relative humidity of the second environment condition is RHb, the following conditions are satisfied: RHa=98%; RHb=30%; and |RHa−RHb|=68%. Additionally, in this embodiment, temperatures of the first environment condition and the second environment condition are the same, and both of them are, for example, 293.1 K. Therefore, the first environment condition and the second environment condition have no temperature dependent relation.

As shown in FIG. 6, on a plane CS perpendicular to the imaging optical path 10P and crossing the first conical surface 1124, the first counterpart conical surface E11, the second conical surface 1125 and the second counterpart conical surface E12, when a minimum distance between the first conical surface 1124 and the second conical surface 1125 is D, and a minimum distance between the first counterpart conical surface E11 and the second counterpart conical surface E12 is d, the following conditions are satisfied: D=0.284 mm; d=0.294 mm; and |D−d|=10 um.

When an angle between the first conical surface 1124 and the second conical surface 1125 on a plane parallel to the imaging optical path 10P is θ, the following condition is satisfied: θ=120 degrees.

2nd Embodiment

Figure 7:
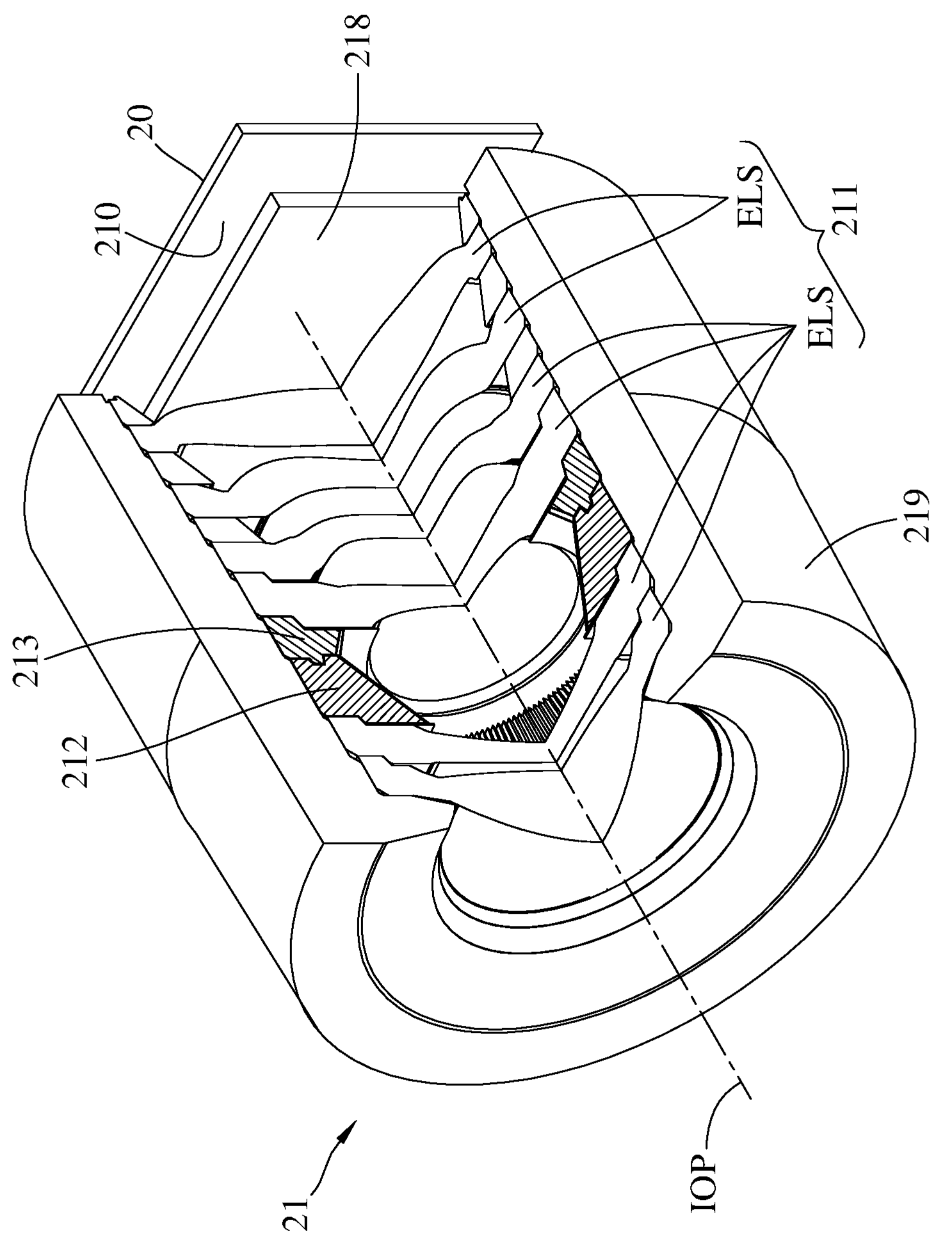
FIG. 7 is a sectional perspective view of an image capturing module according to the 2nd embodiment of the present disclosure.
Figure 8:
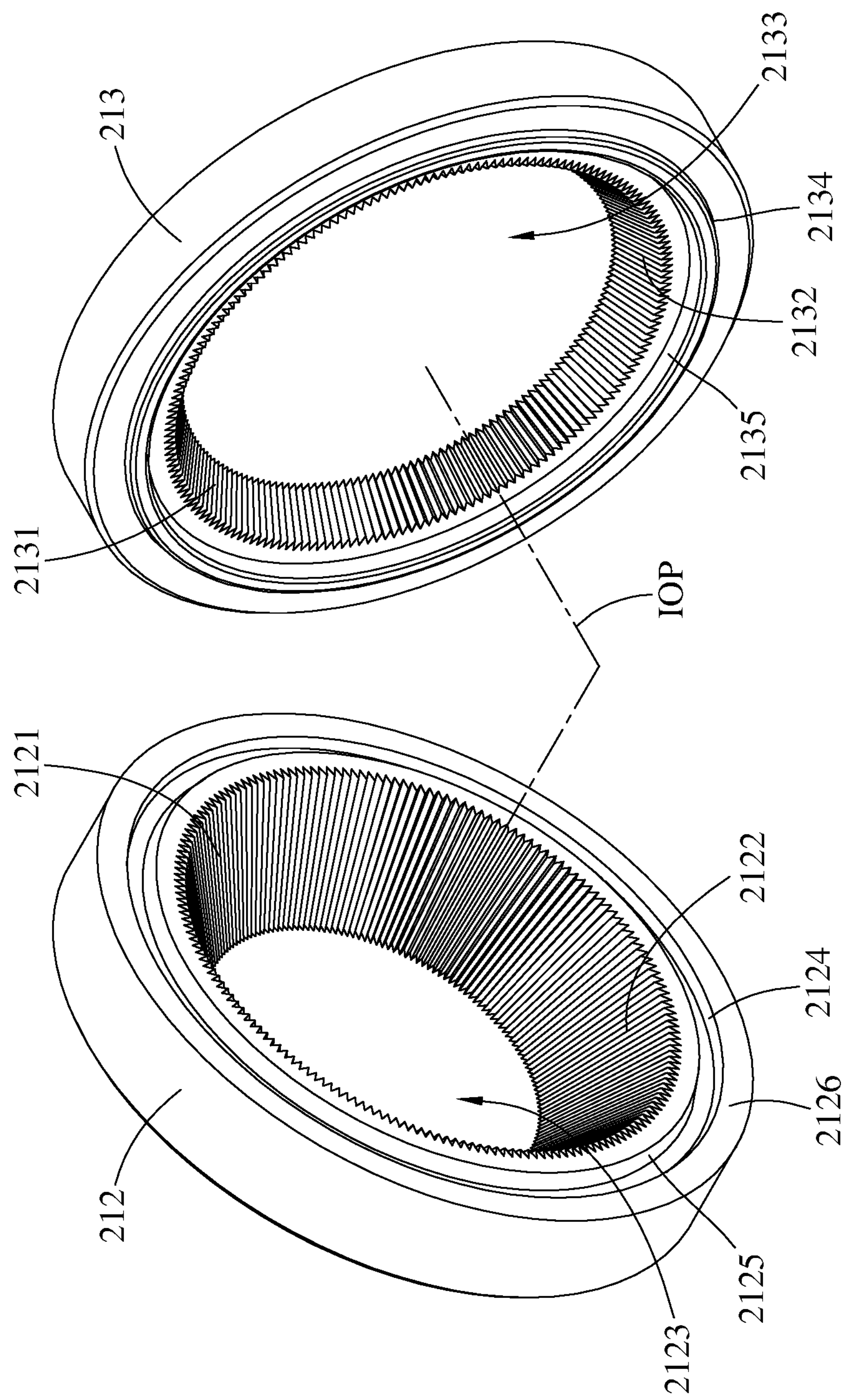
FIG. 8 is an exploded view of a first aperture element and a second aperture element of an imaging lens system of the image capturing module in FIG. 7.
Figure 9:
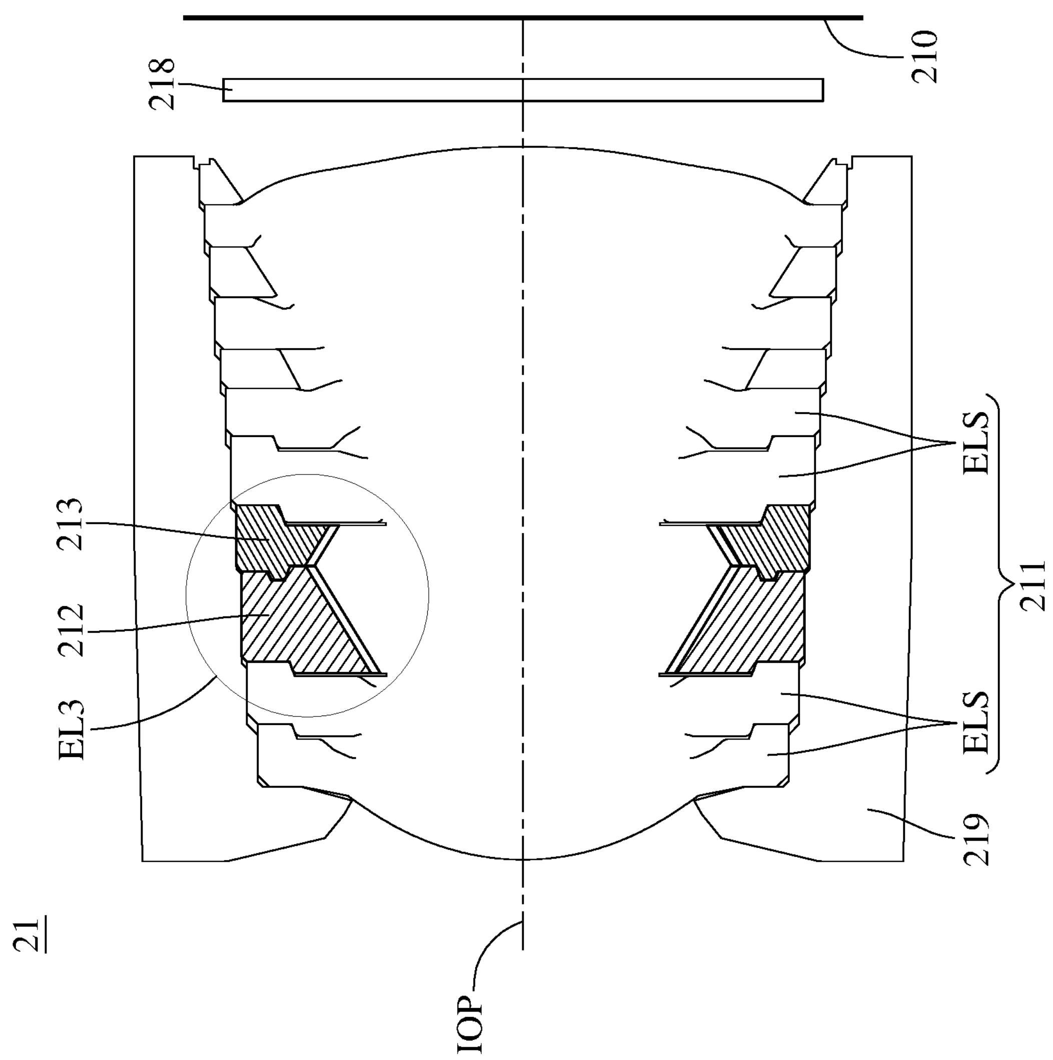
FIG. 9 is a cross-sectional view of the imaging lens system of the image capturing module in FIG. 7.
Figure 10:
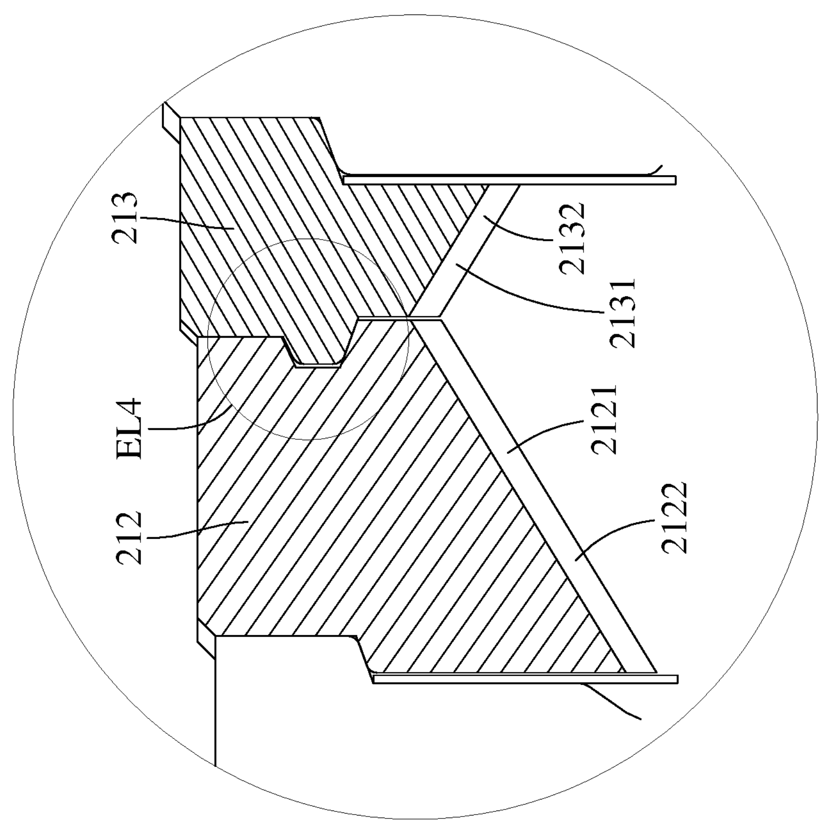
FIG. 10 is an enlarged view of region EL3 in FIG. 9.
Figure 12:
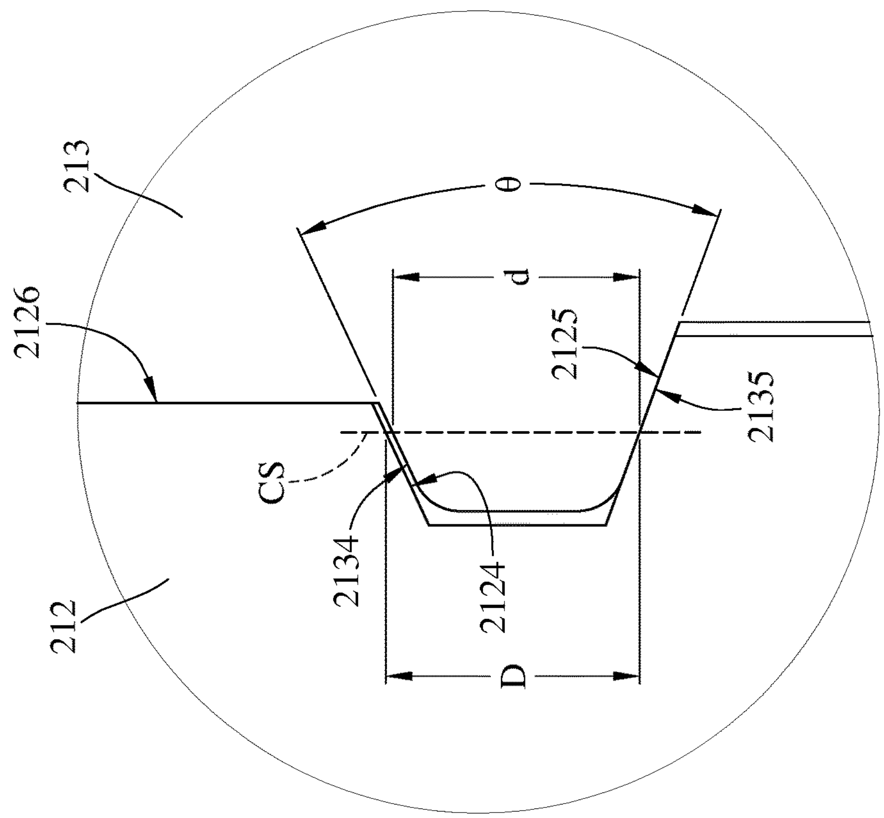
FIG. 12 is an enlarged view of region EL4 in FIG. 10 when the imaging lens system is in a second environment condition.
Figure 11:
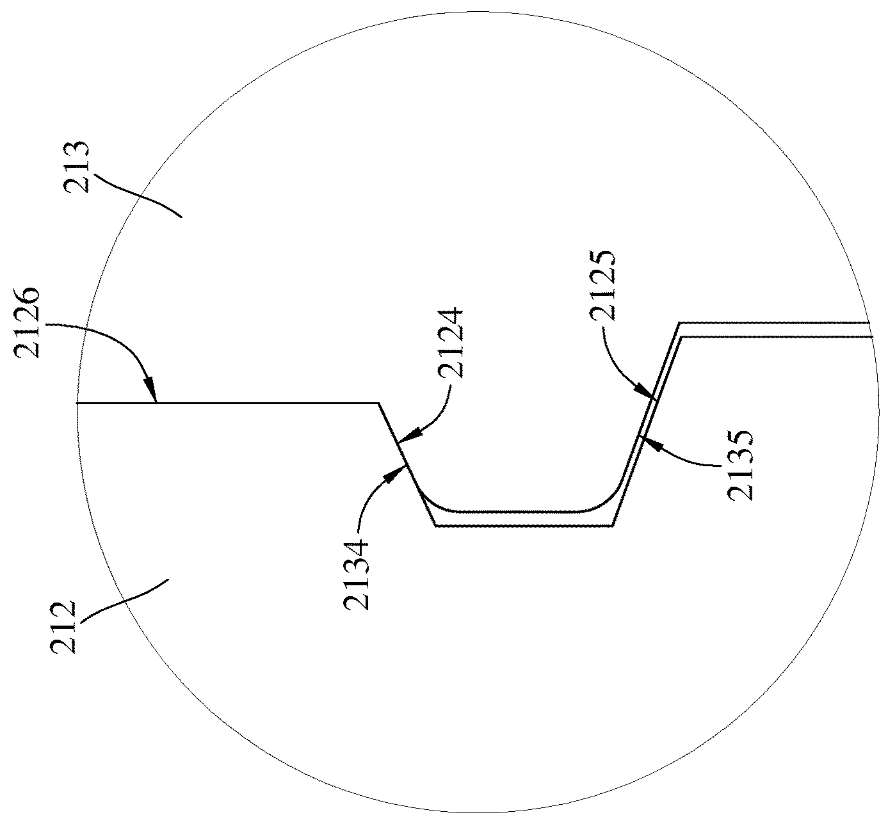
FIG. 11 is an enlarged view of region EL4 in FIG. 10 when the imaging lens system is in a first environment condition.

Please refer to FIG. 7 to FIG. 12. FIG. 7 is a sectional perspective view of an image capturing module according to the 2nd embodiment of the present disclosure, FIG. 8 is an exploded view of a first aperture element and a second aperture element of an imaging lens system of the image capturing module in FIG. 7, FIG. 9 is a cross-sectional view of the imaging lens system of the image capturing module in FIG. 7, FIG. 10 is an enlarged view of region EL3 in FIG. 9, FIG. 11 is an enlarged view of region EL4 in FIG. 10 when the imaging lens system is in a first environment condition, and FIG. 12 is an enlarged view of region EL4 in FIG. 10 when the imaging lens system is in a second environment condition.

In this embodiment, an image capturing module includes an imaging lens system 21 and an image sensor 20, and the image sensor 20 is disposed on an image surface 210 of the imaging lens system 21.

The imaging lens system 21 includes an imaging lens assembly 211, a first aperture element 212, a second aperture element 213, a filter 218 and a barrel 219. The barrel 219 is configured for holding the imaging lens assembly 211, the first aperture element 212 and the second aperture element 213. The filter 218 is disposed between the imaging lens assembly 211 and the image surface 210.

The imaging lens assembly 211 includes a plurality of lens elements ELS arranged along an imaging optical path 10P of the imaging lens system 21. The first aperture element 212 and the second aperture element 213 are disposed between two of the lens elements ELS. The second aperture element 213 faces and is in physical contact with an image side of the first aperture element 212. Each of the first aperture element 212 and the second aperture element 213 works as a spacer between adjacent two of lens elements ELS. Furthermore, each of the first aperture element 212 and the second aperture element 213 is an opaque element. The first aperture element 212 includes an inner surface 2121 and an anti-reflective structure 2122, and the second aperture element 213 includes an inner surface 2131 and an anti-reflective structure 2132. The inner surface 2121 of the first aperture element 212 surrounds the imaging optical path 10P and forms a first aperture 2123, and the inner surface 2131 of the second aperture element 213 surrounds the imaging optical path 10P and forms a second aperture 2133. The anti-reflective structure 2122 of the first aperture element 212 covers at least a part of the inner surface 2121. The anti-reflective structure 2132 of the second aperture element 213 covers at least a part of the inner surface 2131. Each of the anti-reflective structures 2122 and 2132 includes a plurality of strip protrusions each extending along a direction parallel to the imaging optical path 10P, and the strip protrusions are arranged to from a convex-concave structure which reduces the amount of non-imaging light reaching the image sensor 20 by reflection on the inner surfaces, so that the aperture elements 212 and 213 can reduce flare. In this embodiment, each of the aperture elements 212 and 213 is, for example, an opaque plastic component, ceramic component or metallic component.

One side of the first aperture element 212 facing the second aperture element 213 further includes a first conical surface 2124, a second conical surface 2125 and a contact surface 2126. The first conical surface 2124 surrounds the imaging optical path 10P with the imaging optical path 10P as an axis. The second conical surface 2125 surrounds the imaging optical path 10P with the imaging optical path 10P as an axis, and the second conical surface 2125 is located closer to the first aperture 2123 than the first conical surface 2124 to the first aperture 2123. The contact surface 2126 is substantially perpendicular to the imaging optical path 10P, and the contact surface 2126 is in physical contact with the second aperture element 213.

One side of the second aperture element 213 facing the first aperture element 212 further includes a first counterpart conical surface 2134 and a second counterpart conical surface 2135. The first counterpart conical surface 2134 and the first conical surface 2124 are disposed corresponding to each other, and the second counterpart conical surface 2135 and the second conical surface 2125 are disposed corresponding to each other.

As shown in FIG. 11, when the imaging lens system 21 is in a first environment condition, the first conical surface 2124 is in physical contact with the second aperture element 213, and the second conical surface 2125 is spaced apart from the second aperture element 213. In the meantime, the first aperture 2123 is aligned with the second aperture 2133. In addition, as shown in FIG. 12, when the imaging lens system 21 is in a second environment condition, the second conical surface 2125 is in physical contact with the second aperture element 213, and the first conical surface 2124 is spaced apart from the second aperture element 213. In the meantime, the first aperture 2123 is aligned with the second aperture 2133. Moreover, the contact surface 2126 of the first aperture element 212 is maintained in physical contact with the second aperture element 213.

In this embodiment, the first environment condition and the second environment condition have a temperature dependent relation. When a temperature of the first environment condition is Ta, and a temperature of the second environment condition is Tb, the following conditions are satisfied: Ta=343.1 K; Tb=293.1 K; and |Ta−Tb|=50 K.

In this embodiment, the first environment condition and the second environment condition also have a humidity dependent relation. When a relative humidity of the first environment condition is RHa, and a relative humidity of the second environment condition is RHb, the following conditions are satisfied: RHa=70%; RHb=50%; and |RHa−RHb|=20%.

As shown in FIG. 12, on a plane CS perpendicular to the imaging optical path 10P and crossing the first conical surface 2124, the first counterpart conical surface 2134, the second conical surface 2125 and the second counterpart conical surface 2135, when a minimum distance between the first conical surface 2124 and the second conical surface 2125 is D, and a minimum distance between the first counterpart conical surface 2134 and the second counterpart conical surface 2135 is d, the following conditions are satisfied: D=0.1815 mm; d=0.1765 mm; and |D−d|=5 um.

When an angle between the first conical surface 2124 and the second conical surface 2125 on a plane parallel to the imaging optical path 10P is θ, the following condition is satisfied: θ=45 degrees.

3rd Embodiment

Figure 13:
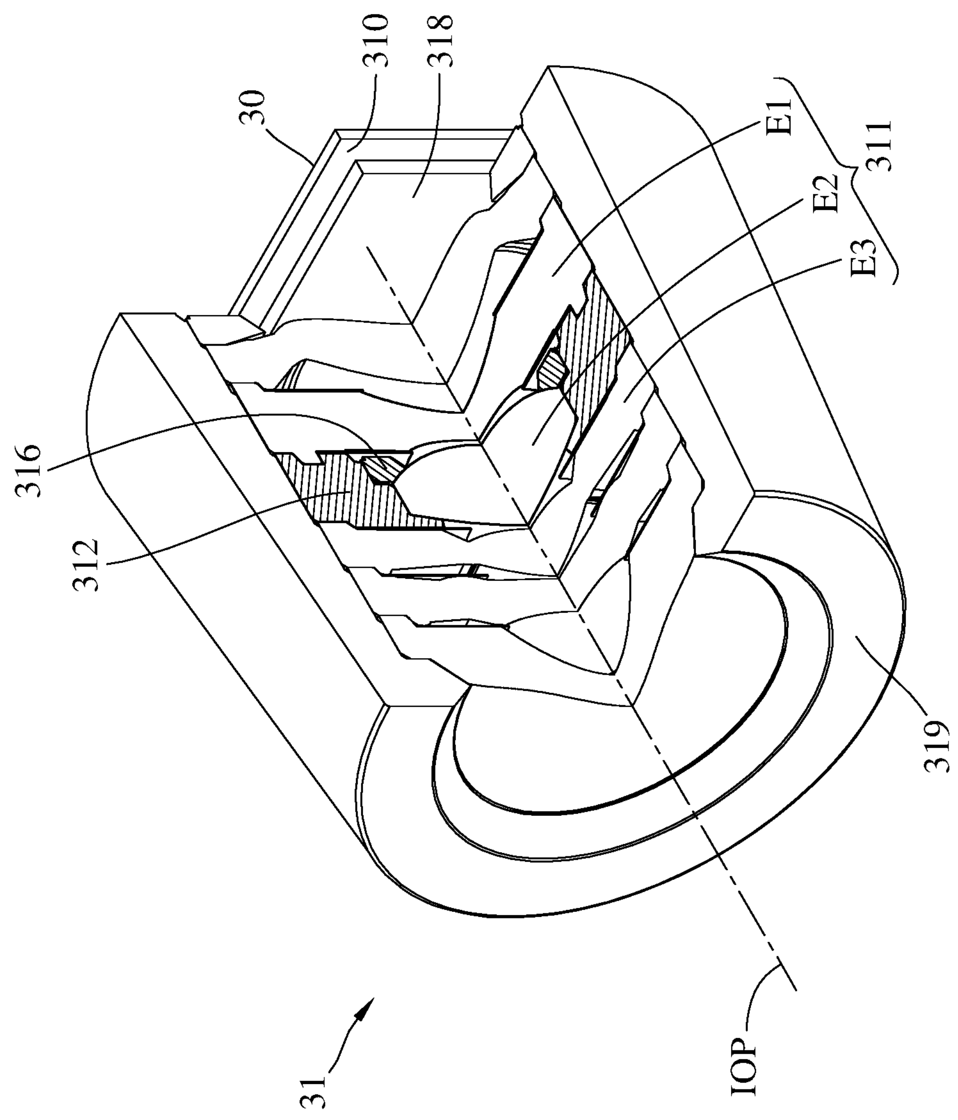
FIG. 13 is a sectional perspective view of an image capturing module according to the 3rd embodiment of the present disclosure.
Figure 14:
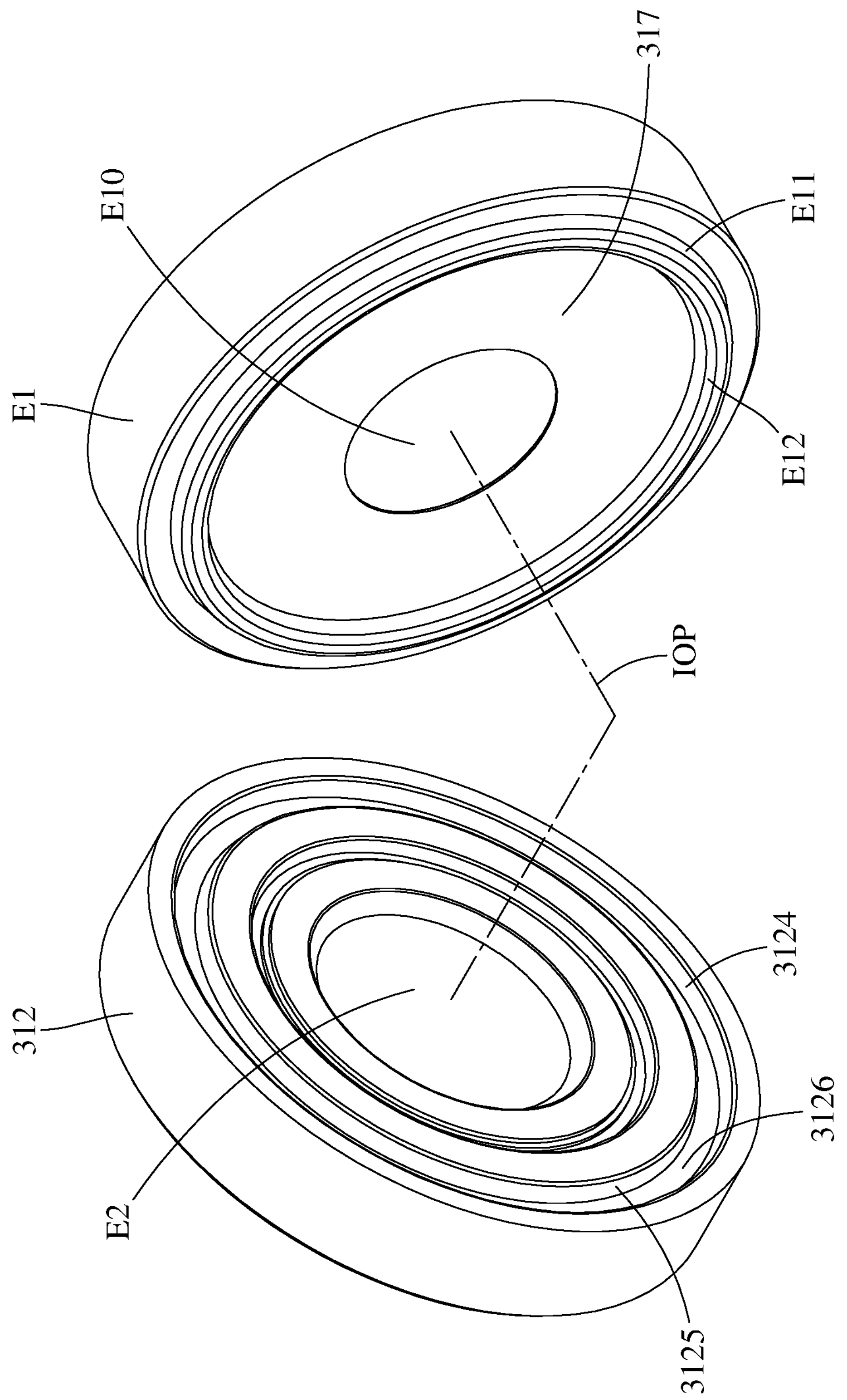
FIG. 14 is an exploded view of a first lens element, a second lens element, an aperture element and a light-shielding element of an imaging lens system of the image capturing module in FIG. 13.
Figure 15:
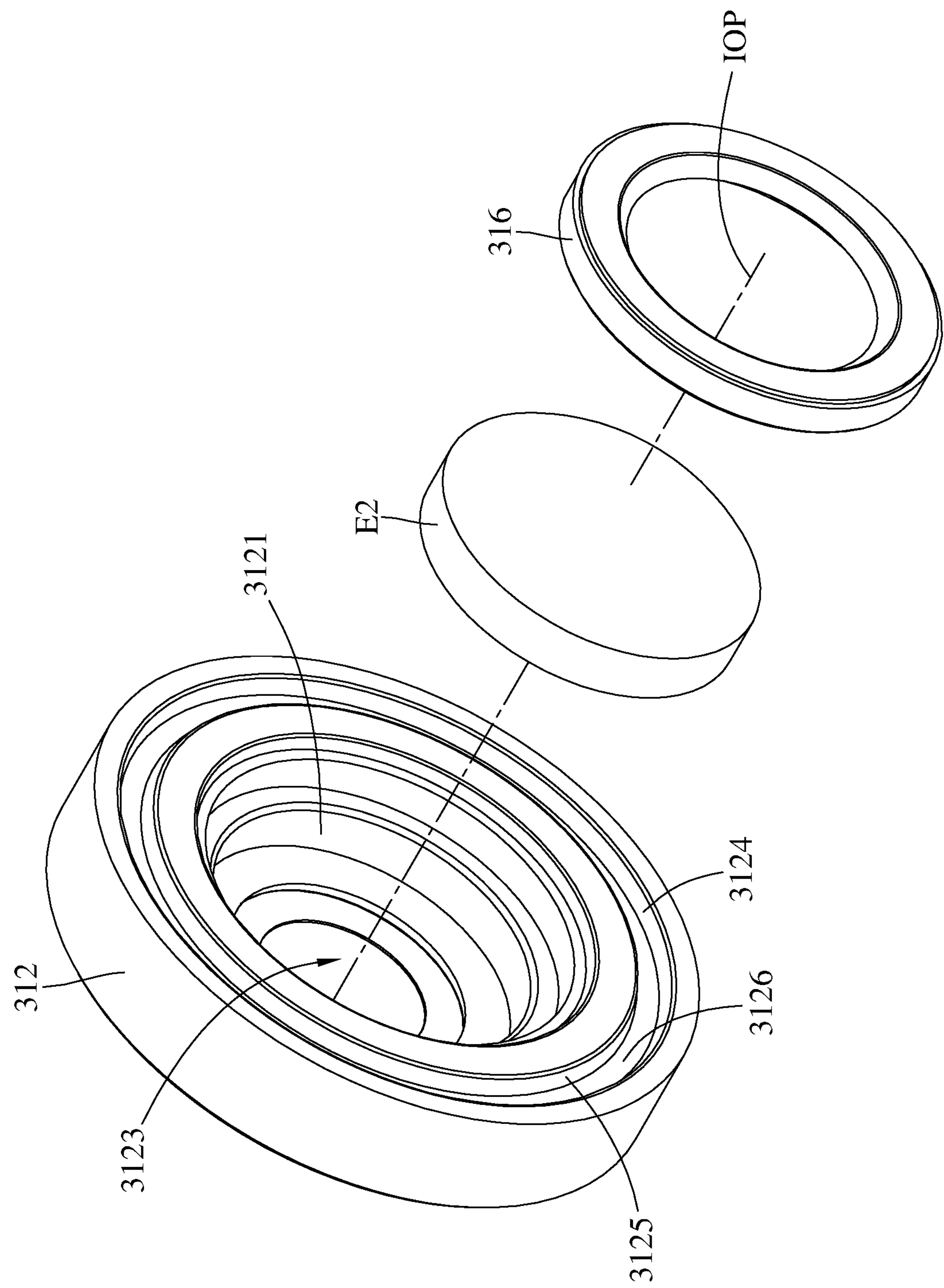
FIG. 15 is an exploded view of the second lens element, the aperture element and a fastening element of the imaging lens system of the image capturing module in FIG. 13.
Figure 16:
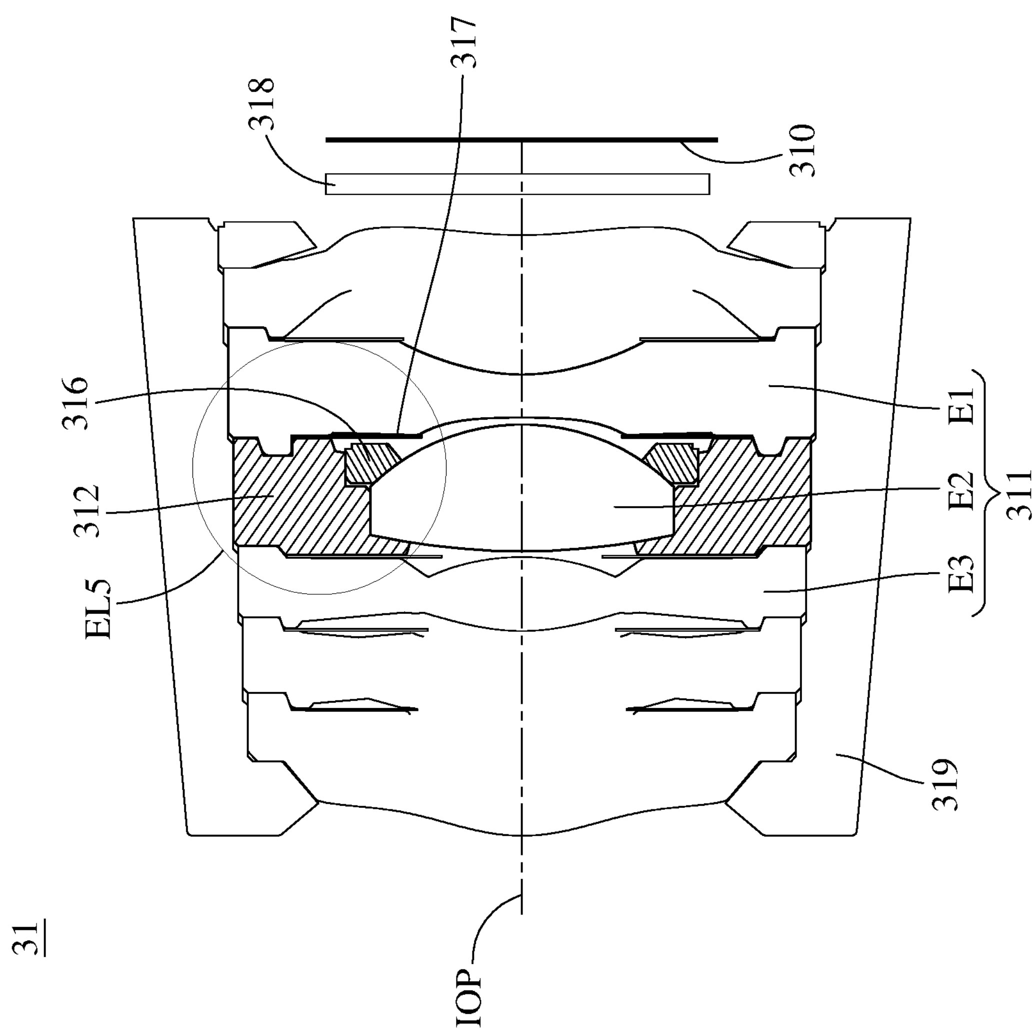
FIG. 16 is a cross-sectional view of the imaging lens system of the image capturing module in FIG. 13.
Figure 17:
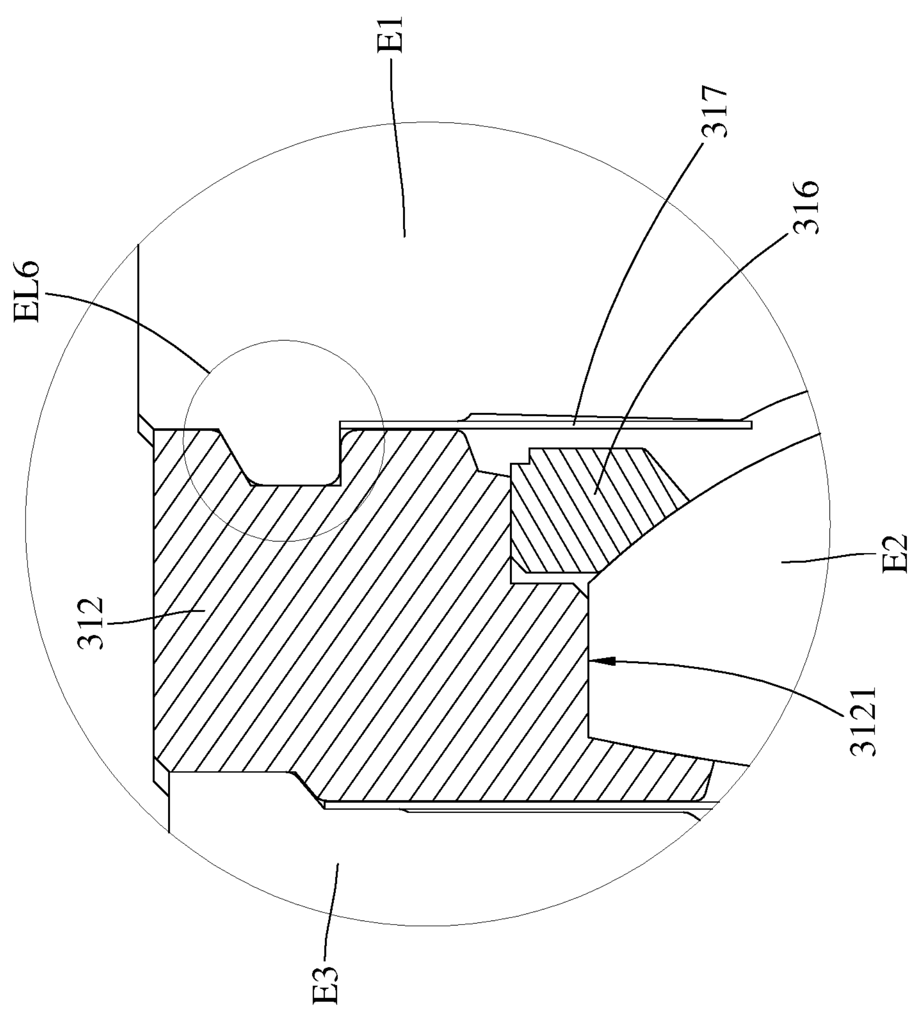
FIG. 17 is an enlarged view of region EL5 in FIG. 16.
Figure 19:
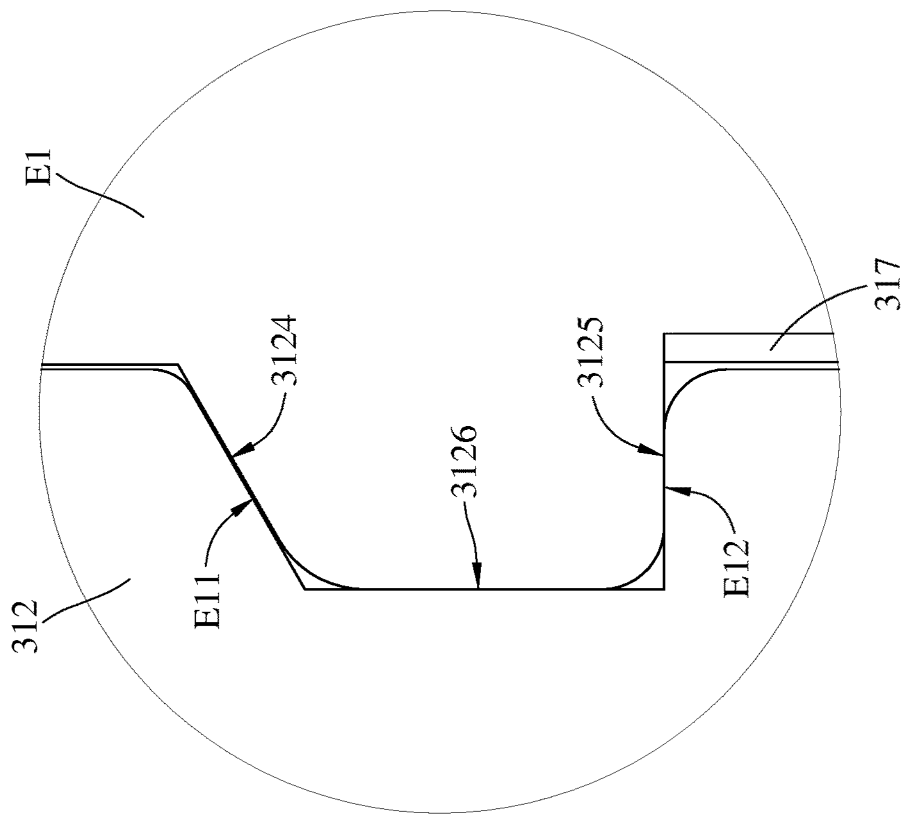
FIG. 19 is an enlarged view of region EL6 in FIG. 17 when the imaging lens system is in a second environment condition.
Figure 18:
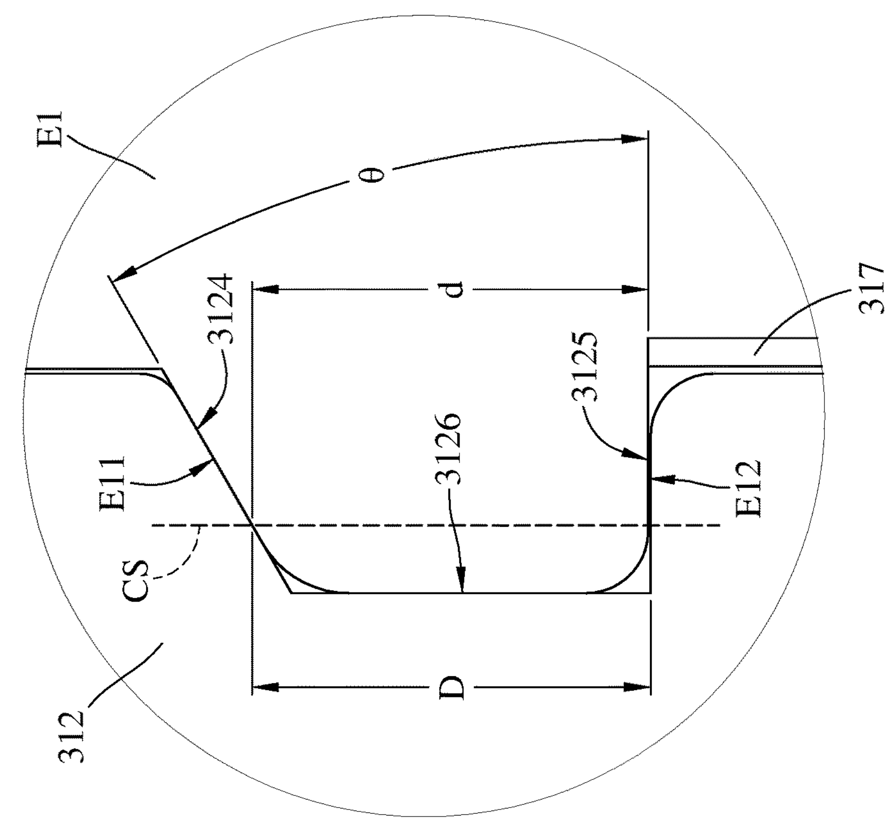
FIG. 18 is an enlarged view of region EL6 in FIG. 17 when the imaging lens system is in a first environment condition.

Please refer to FIG. 13 to FIG. 19. FIG. 13 is a sectional perspective view of an image capturing module according to the 3rd embodiment of the present disclosure, FIG. 14 is an exploded view of a first lens element, a second lens element, an aperture element and a light-shielding element of an imaging lens system of the image capturing module in FIG. 13, FIG. 15 is an exploded view of the second lens element, the aperture element and a fastening element of the imaging lens system of the image capturing module in FIG. 13, FIG. 16 is a cross-sectional view of the imaging lens system of the image capturing module in FIG. 13, FIG. 17 is an enlarged view of region ELS in FIG. 16, FIG. 18 is an enlarged view of region EL6 in FIG. 17 when the imaging lens system is in a first environment condition, and FIG. 19 is an enlarged view of region EL6 in FIG. 17 when the imaging lens system is in a second environment condition.

In this embodiment, an image capturing module includes an imaging lens system 31 and an image sensor 30. The image sensor 30 is disposed on an image surface 310 of the imaging lens system 31.

The imaging lens system 31 includes an imaging lens assembly 311, an aperture element 312, a fastening element 316, a light-shielding element 317, a filter 318 and a barrel 319. The barrel 319 is configured for holding the imaging lens assembly 311 and the aperture element 312. The filter 318 is disposed between the imaging lens assembly 311 and the image surface 310.

The imaging lens assembly 311 includes, in order from an image side to an object side along an imaging optical path 10P of the imaging lens system 31, a first lens element E1, a second lens element E2 and a third lens element E3. The first lens element E1 has an optically effective region E10, and the imaging optical path 10P passes through the optically effective region E10 of the first lens element E1.

The third lens element E3 is spaced apart from the first lens element E1. The aperture element 312 is disposed between the first lens element E1 and the third lens element E3. The aperture element 312 faces and is in physical contact with an object side of the first lens element E1. The aperture element 312 works as a spacer between adjacent two lens elements. Furthermore, the aperture element 312 is an opaque element, which includes an inner surface 3121. The inner surface 3121 surrounds the imaging optical path 10P and forms an aperture 3123, and the second lens element E2 is disposed in the aperture 3123 and in physical contact with the inner surface 3121. Furthermore, the second lens element E2 is fixed in the aperture 3123 of the aperture element 312 via the fastening element 316. In this embodiment, the aperture element 312 is, for example, an opaque is, for example, an opaque plastic component, ceramic component or metallic component.

One side of the aperture element 312 facing the first lens element E1 further includes a first conical surface 3124, a second conical surface 3125 and a contact surface 3126. The first conical surface 3124 surrounds the imaging optical path 10P with the imaging optical path 10P as an axis. The second conical surface 3125 surrounds the imaging optical path 10P with the imaging optical path 10P as an axis, and the second conical surface 3125 is located closer to the aperture 3123 than the first conical surface 3124 to the aperture 3123. The contact surface 3126 is substantially perpendicular to the imaging optical path 10P, and the contact surface 3126 is in physical contact with the first lens element E1.

One side of the first lens element E1 facing the aperture element 312 further includes a first counterpart conical surface E11 and a second counterpart conical surface E12. The first counterpart conical surface E11 and the first conical surface 3124 are disposed corresponding to each other, and the second counterpart conical surface E12 and the second conical surface 3125 are disposed corresponding to each other.

The light-shielding element 317 is disposed between the first lens element E1 and the aperture element 312. Therefore, the light-shielding element 317 can block non-imaging light so as to reduce flare and thus improve image quality.

As shown in FIG. 18, when the imaging lens system 31 is in a first environment condition, the first conical surface 3124 is in physical contact with the first lens element E1, and the second conical surface 3125 is spaced apart from the first lens element E1. In the meantime, the aperture 3123 of the aperture element 312 is aligned with the optically effective region E10 of the first lens element E1. In addition, as shown in FIG. 19, when the imaging lens system 31 is in a second environment condition, the second conical surface 3125 is in physical contact with the first lens element E1, and the first conical surface 3124 is spaced apart from the first lens element E1. In the meantime, the aperture 3123 of the aperture element 312 is aligned with the optically effective region E10 of the first lens element E1. Moreover, the contact surface 3126 of the aperture element 312 is maintained in physical contact with the first lens element E1. The first environment condition and the second environment condition have a temperature dependent relation. When a temperature of the first environment condition is Ta, and a temperature of the second environment condition is Tb, the following conditions are satisfied: Ta=293.1 K; Tb=273.1 K; and |Ta−Tb|=20 K. Additionally, in this embodiment, a relative humidity of the first environment condition and a relative humidity of the second environment condition are the same, and both of them are, for example, 30%. Therefore, the first environment condition and the second environment condition have no humidity dependent relation.

As shown in FIG. 18, on a plane CS perpendicular to the imaging optical path 10P and crossing the first conical surface 3124, the first counterpart conical surface E11, the second conical surface 3125 and the second counterpart conical surface E12, when a minimum distance between the first conical surface 3124 and the second conical surface 3125 is D, and a minimum distance between the first counterpart conical surface E11 and the second counterpart conical surface E12 is d, the following conditions are satisfied: D=0.322 mm; d=0.32 mm; and |D−d|=2 um.

When an angle between the first conical surface 3124 and the second conical surface 3125 on a plane parallel to the imaging optical path 10P is θ, the following condition is satisfied: θ=30 degrees.

4th Embodiment

Figure 20:
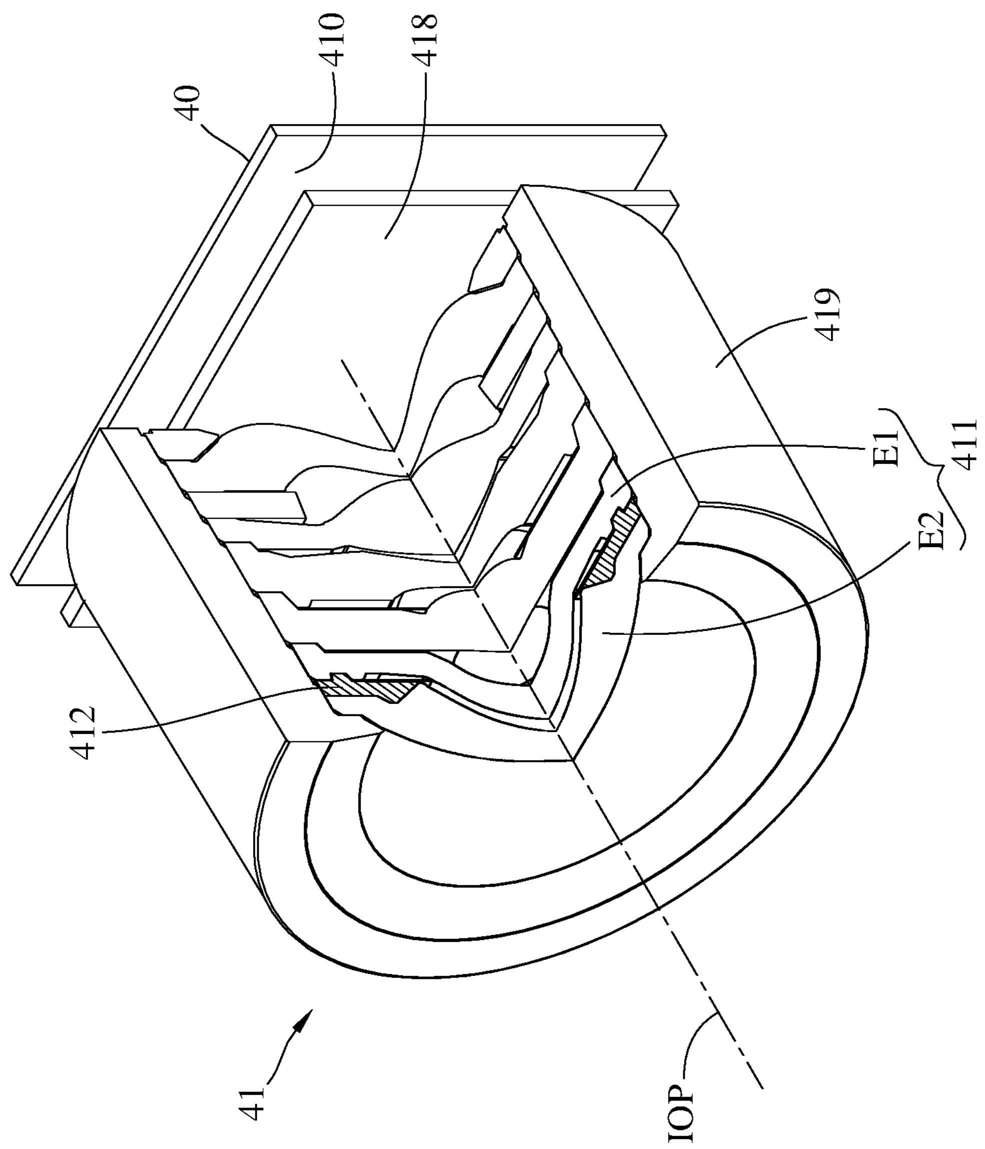
FIG. 20 is a sectional perspective view of an image capturing module according to the 4th embodiment of the present disclosure.
Figure 21:
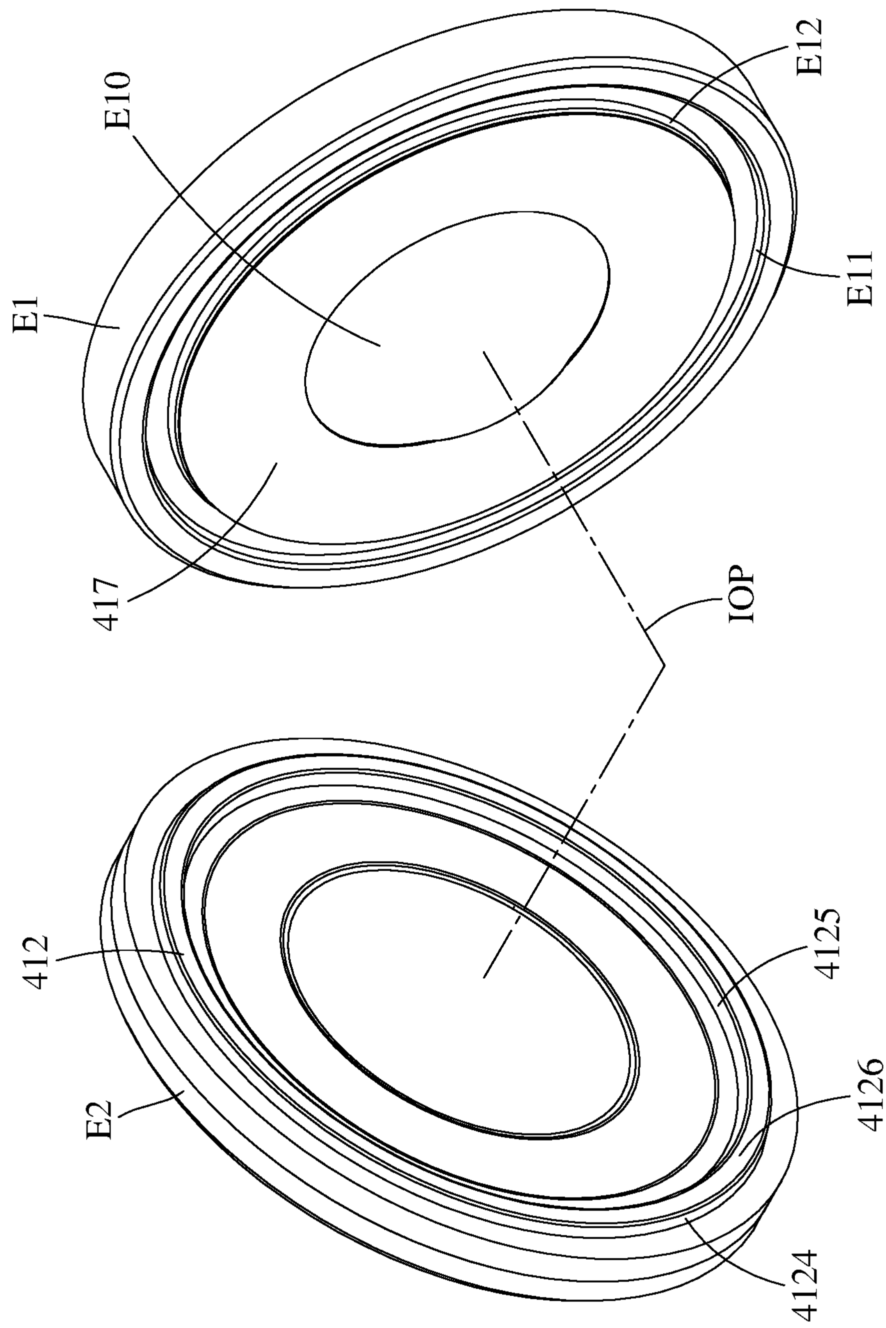
FIG. 21 is an exploded view of a first lens element, a second lens element, an aperture element and a light-shielding element of an imaging lens system of the image capturing module in FIG. 20.
Figure 22:
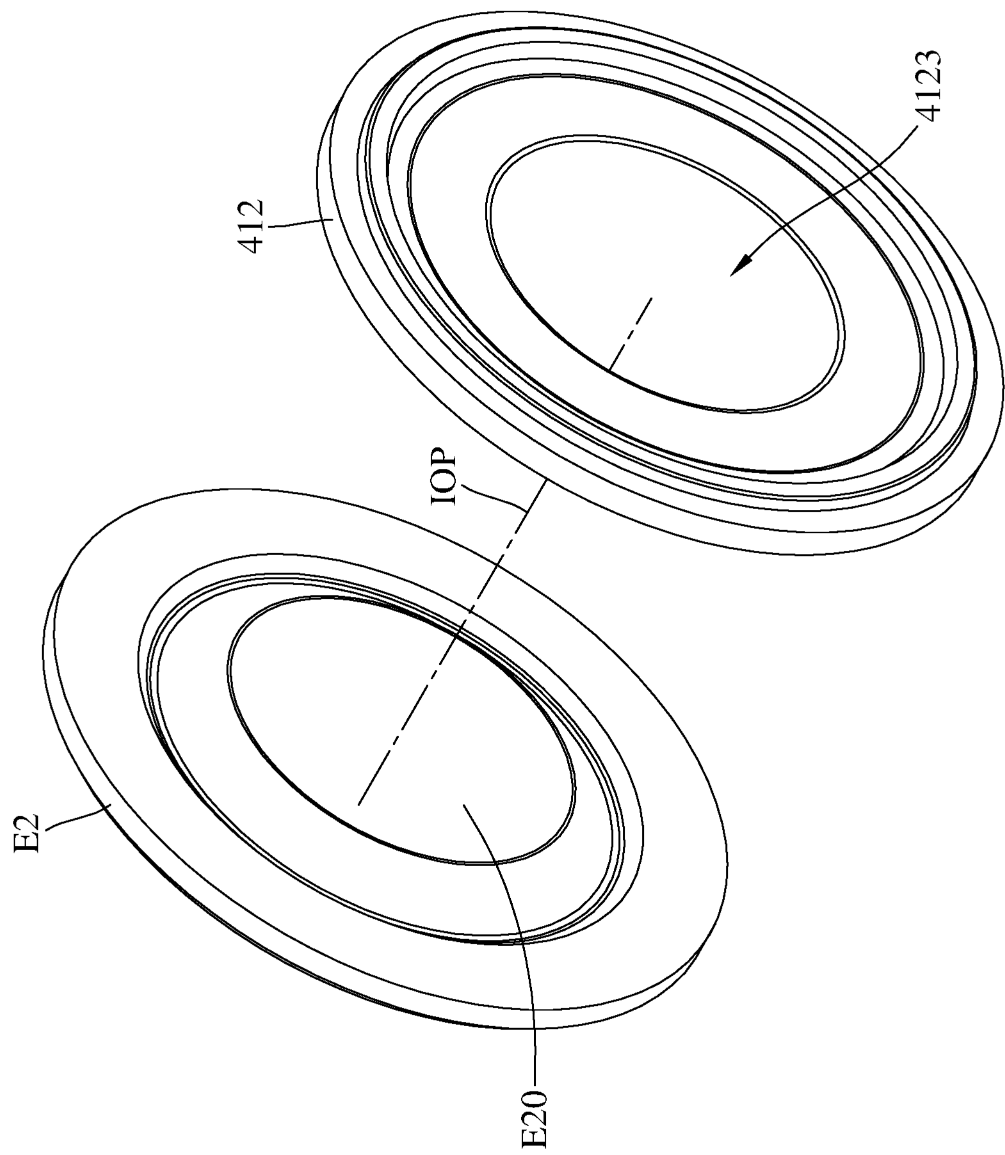
FIG. 22 is an exploded view of the second lens element and the aperture element of the imaging lens system of the image capturing module in FIG. 20.
Figure 23:
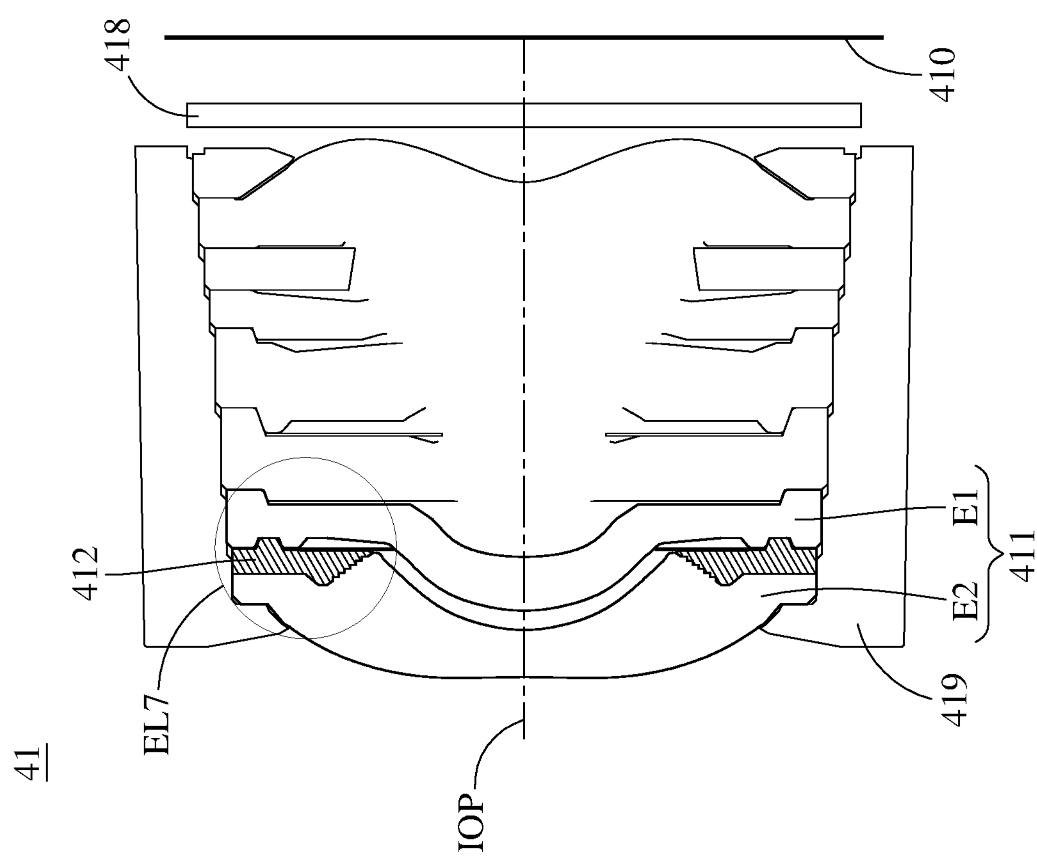
FIG. 23 is a cross-sectional view of the imaging lens system of the image capturing module in FIG. 20.
Figure 24:
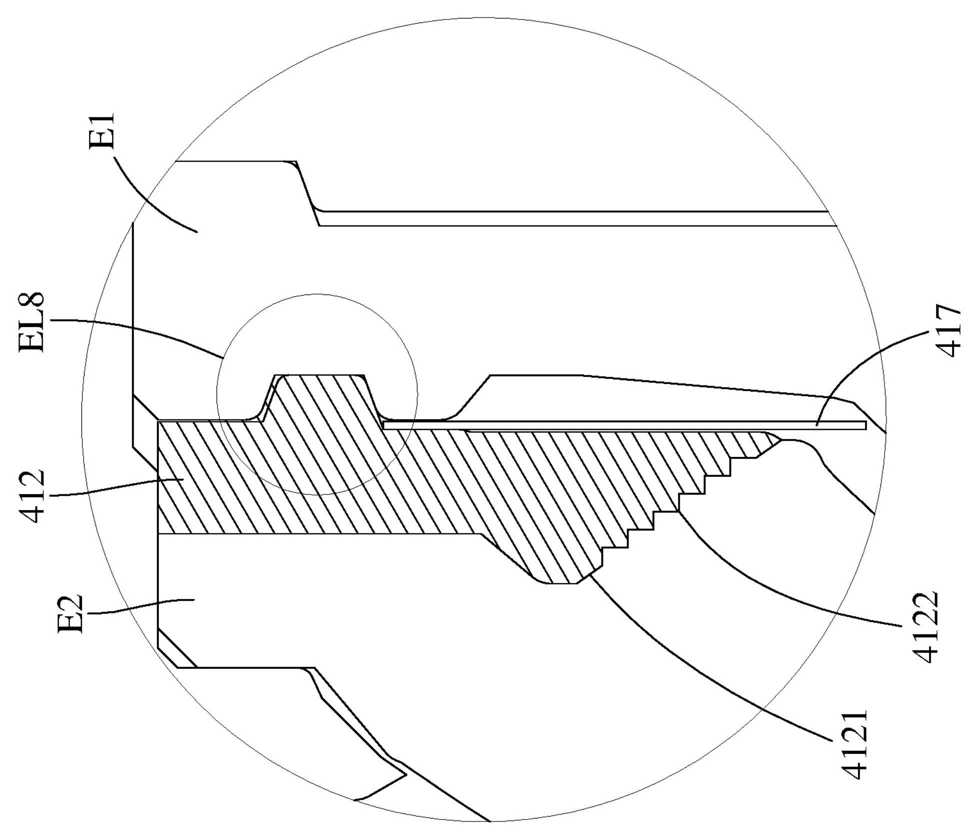
FIG. 24 is an enlarged view of region EL7 in FIG. 23.
Figure 26:
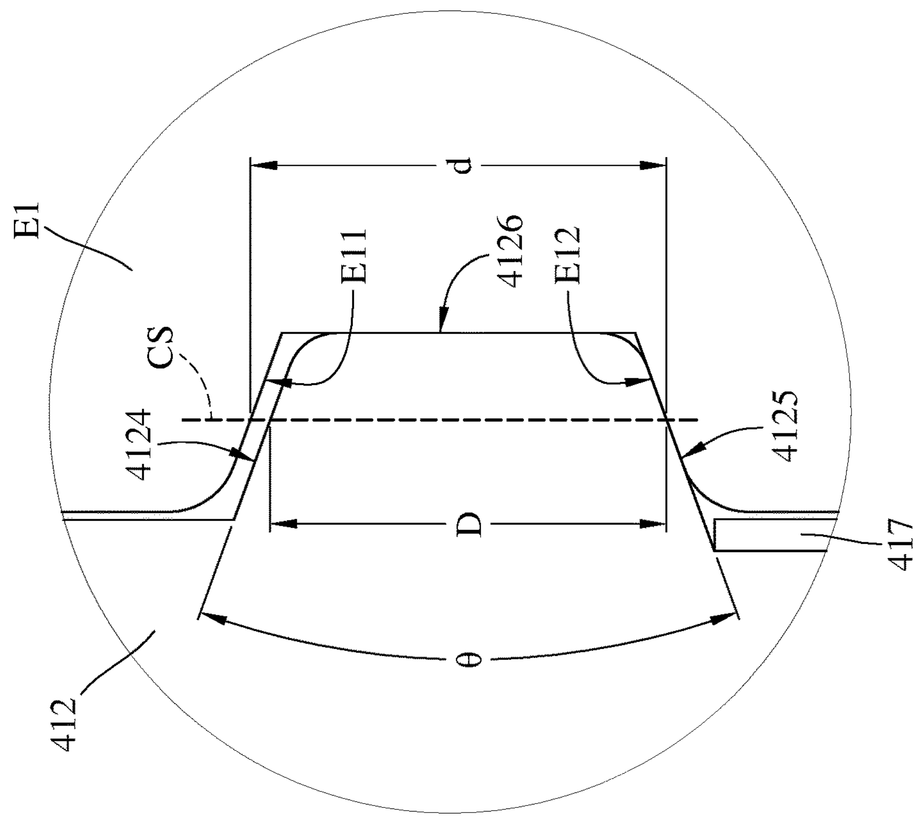
FIG. 26 is an enlarged view of region EL8 in FIG. 24 when the imaging lens system is in a second environment condition.
Figure 25:
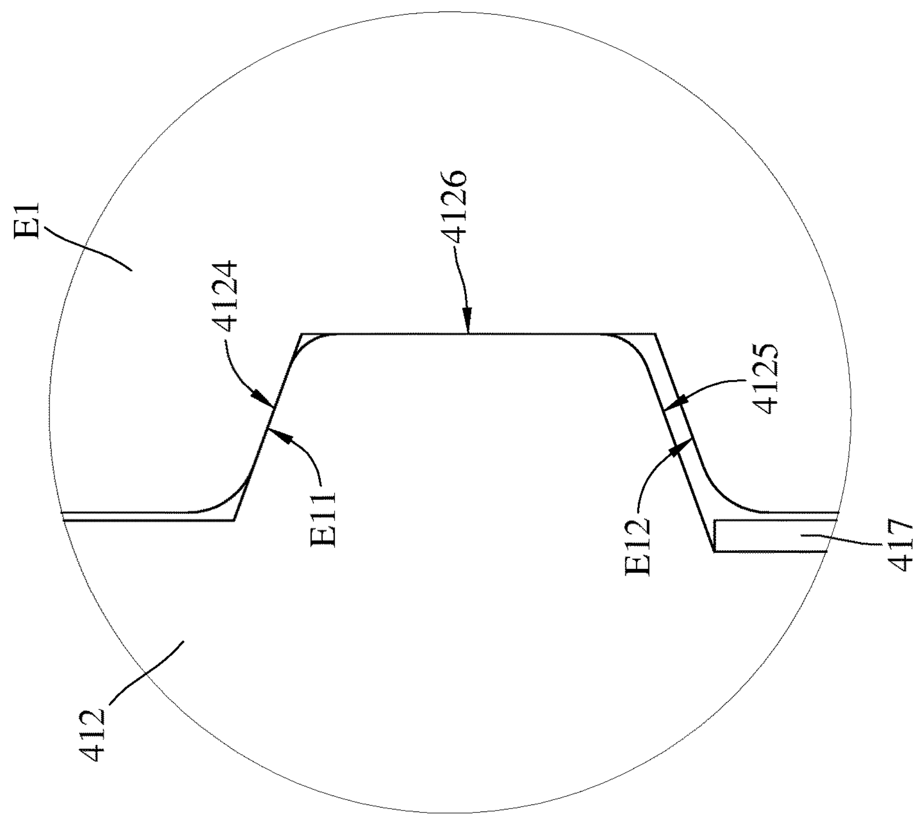
FIG. 25 is an enlarged view of region EL8 in FIG. 24 when the imaging lens system is in a first environment condition.

Please refer to FIG. 20 to FIG. 26. FIG. 20 is a sectional perspective view of an image capturing module according to the 4th embodiment of the present disclosure, FIG. 21 is an exploded view of a first lens element, a second lens element, an aperture element and a light-shielding element of an imaging lens system of the image capturing module in FIG. 20, FIG. 22 is an exploded view of the second lens element and the aperture element of the imaging lens system of the image capturing module in FIG. 20, FIG. 23 is a cross-sectional view of the imaging lens system of the image capturing module in FIG. 20, FIG. 24 is an enlarged view of region EL7 in FIG. 23, FIG. 25 is an enlarged view of region EL8 in FIG. 24 when the imaging lens system is in a first environment condition, and FIG. 26 is an enlarged view of region EL8 in FIG. 24 when the imaging lens system is in a second environment condition.

In this embodiment, an image capturing module includes an imaging lens system 41 and an image sensor 40. The image sensor 40 is disposed on an image surface 410 of the imaging lens system 41.

The imaging lens system 41 includes an imaging lens assembly 411, an aperture element 412, a light-shielding element 417, a filter 418 and a barrel 419. The barrel 419 is configured for holding the imaging lens assembly 411 and the aperture element 412. The filter 418 is disposed between the imaging lens assembly 411 and image surface 410.

The imaging lens assembly 411 includes, in order from an image side to an object side along an imaging optical path 10P of the imaging lens system 41, a first lens element E1 and a second lens element E2. The first lens element E1 has an optically effective region E10, and the imaging optical path 10P passes through the optically effective region E10 of the first lens element E1.

The aperture element 412 is disposed between the first lens element E1 and the second lens element E2, and the aperture element 412 faces and is in physical contact with an object side of the first lens element E1. The aperture element 412 works as a spacer between adjacent two lens elements. In addition, the aperture element 412 is an opaque element, which can block non-imaging light coming from a non-optically effective region E29 outside an optically effective region E20 of the second lens element E2 and prevent the non-imaging light from entering the imaging lens system 41, thereby preventing the non-imaging light from entering the image sensor 40. As such, the aperture element 412 can reduce non-imaging light into the image sensor 40.

The aperture element 412 includes an inner surface 4121 and an anti-reflective structure 4122. The inner surface 4121 surrounds the imaging optical path 10P and forms an aperture 4123, and the anti-reflective structure 4122 covers at least a part of the inner surface 4121. The anti-reflective structure 4122 includes a plurality of annular grooves surrounding the imaging optical path 10P, and the annular grooves are adjacently arranged to from a convex-concave structure which reduces the amount of non-imaging light reaching the image sensor 40 by reflection on the inner surface 4121, so that the aperture element 412 can reduce flare. In this embodiment, the aperture element 412 is, for example, an opaque plastic component, ceramic component or metallic component, the second lens element E2 is, for example, an opaque plastic component or glass component, and the aperture element 412 and the second lens element E2 are integrally jointed together by two-shot molding process. In addition, the aperture element 412 and the second lens element E2 can be made of the same material, and the aperture element 412 is formed by adding opaque pigments. Therefore, the connection between the aperture element 412 and the second lens element E2 is enhanced. Moreover, the aperture element 412 and the second lens element E2 can alternatively be made of different materials, and the opaque region and the optically effective region can be connected to each other in an embedded manner. Therefore, the connection between the optically effective region and the opaque region is enhanced.

One side of the aperture element 412 facing the first lens element E1 further includes a first conical surface 4124, a second conical surface 4125 and a contact surface 4126. The first conical surface 4124 surrounds the imaging optical path 101D with the imaging optical path 10P as an axis. The second conical surface 4125 surrounds the imaging optical path 10P with the imaging optical path 10P as an axis, and the second conical surface 4125 is located closer to the aperture 4123 than the first conical surface 4124 to the aperture 4123. The contact surface 4126 is substantially perpendicular to the imaging optical path 10P, and the contact surface 4126 is in physical contact with the first lens element E1.

One side of the first lens element E1 facing the aperture element 412 further includes a first counterpart conical surface E11 and a second counterpart conical surface E12. The first counterpart conical surface E11 and the first conical surface 4124 are disposed corresponding to each other, and the second counterpart conical surface E12 and the second conical surface 4125 are disposed corresponding to each other.

The light-shielding element 417 is disposed between the first lens element E1 and the aperture element 412. Therefore, the light-shielding element 417 can block non-imaging light so as to reduce flare and thus improve image quality.

In this embodiment, the aperture element 412 and the second lens element E2 are integrally jointed together by two-shot molding process, and thus the aperture element 412 can be considered an opaque region of the second lens element E2 surrounding an optically effective region E20 of the second lens element E2 and located farther away from the imaging optical path 10P than the optically effective region E20 to the imaging optical path 10P.

As shown in FIG. 25, when the imaging lens system 41 is in a first environment condition, the first conical surface 4124 is in physical contact with the first lens element E1, and the second conical surface 4125 is spaced apart from the first lens element E1. In the meantime, the aperture 4123 of the aperture element 412 is aligned with the optically effective region E10 of the first lens element E1. In addition, as shown in FIG. 26, when the imaging lens system 41 is in a second environment condition, the second conical surface 4125 is in physical contact with the first lens element E1, and the first conical surface 4124 is spaced apart from the first lens element E1. In the meantime, the aperture 4123 of the aperture element 412 is aligned with the optically effective region E10 of the first lens element E1. In addition, the contact surface 4126 of the aperture element 412 is maintained in physical contact with the first lens element E1.

In this embodiment, the first environment condition and the second environment condition have a temperature dependent relation. When a temperature of the first environment condition is Ta, and a temperature of the second environment condition is Tb, the following conditions are satisfied: Ta=353.1 K; Tb=253.1 K; and |Ta−Tb|=100 K.

In this embodiment, the first environment condition and the second environment condition also have a humidity dependent relation. When a relative humidity of the first environment condition is RHa, and a relative humidity of the second environment condition is RHb, the following conditions are satisfied: RHa=90%; RHb=20%; and |RHa−RHb|=70%.

As shown in FIG. 26, on a plane CS perpendicular to the imaging optical path 10P and crossing the first conical surface 4124, the first counterpart conical surface E11, the second conical surface 4125 and the second counterpart conical surface E12, when a minimum distance between the first conical surface 4124 and the second conical surface 4125 is D, and a minimum distance between the first counterpart conical surface E11 and the second counterpart conical surface E12 is d, the following conditions are satisfied: D=0.32 mm; d=0.336 mm; and |D−d|=16 um.

When an angle between the first conical surface 4124 and the second conical surface 4125 on a plane parallel to the imaging optical path 10P is θ, the following condition is satisfied: θ=40 degrees.

5th Embodiment

Figure 27:
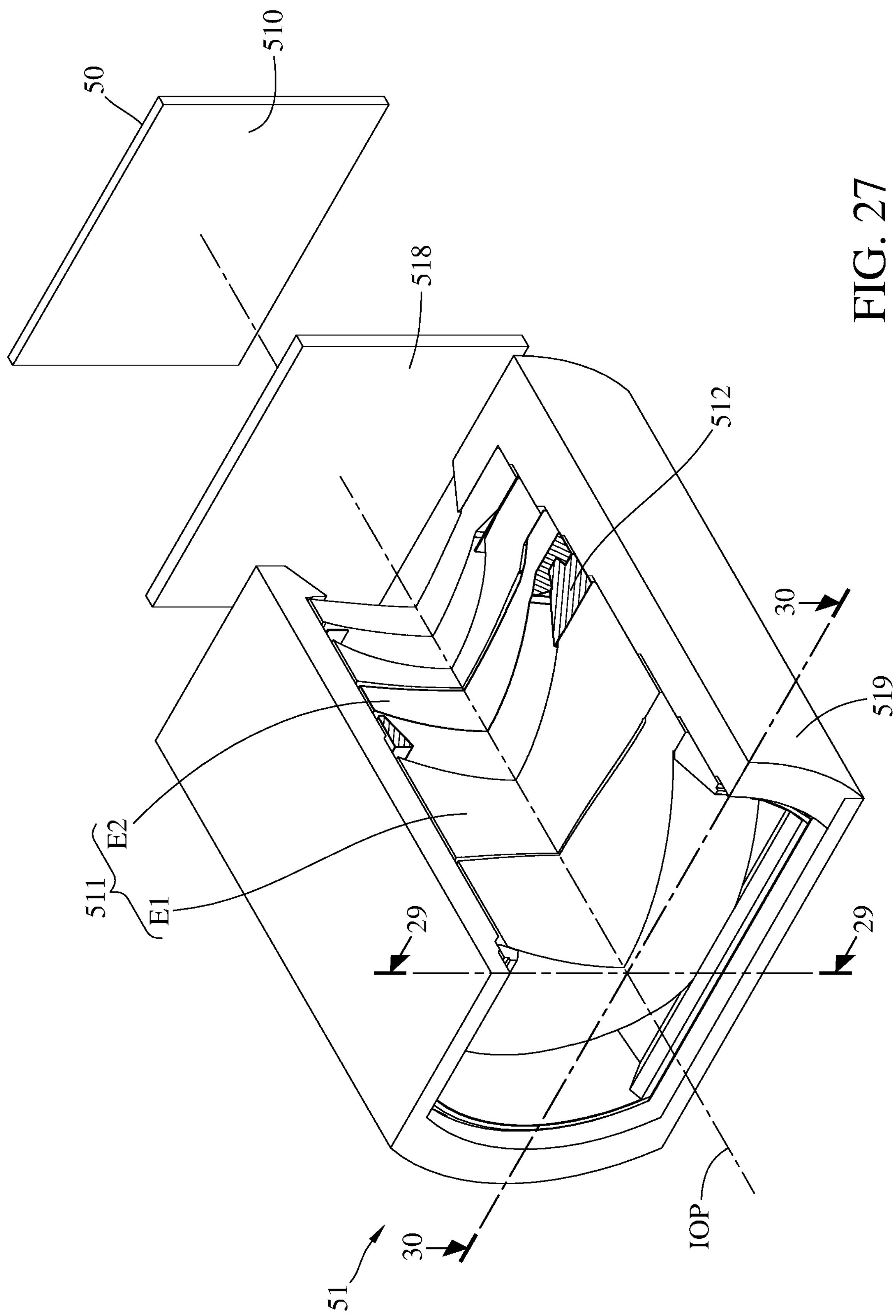
FIG. 27 is a sectional perspective view of an image capturing module according to the 5th embodiment of the present disclosure.
Figure 28:
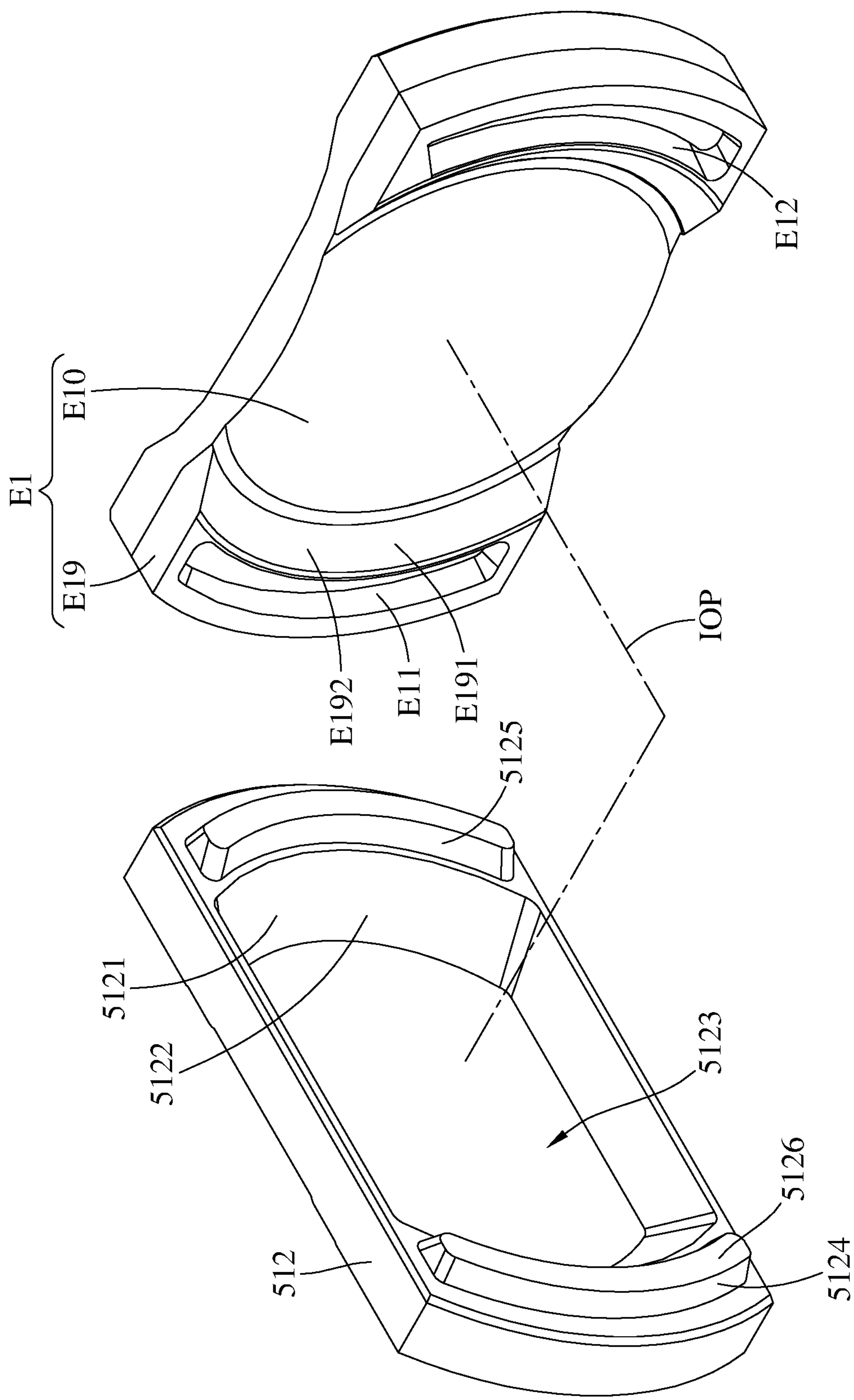
FIG. 28 is an exploded view of a first lens element and an aperture element of an imaging lens system of the image capturing module in FIG. 27.
Figure 29:
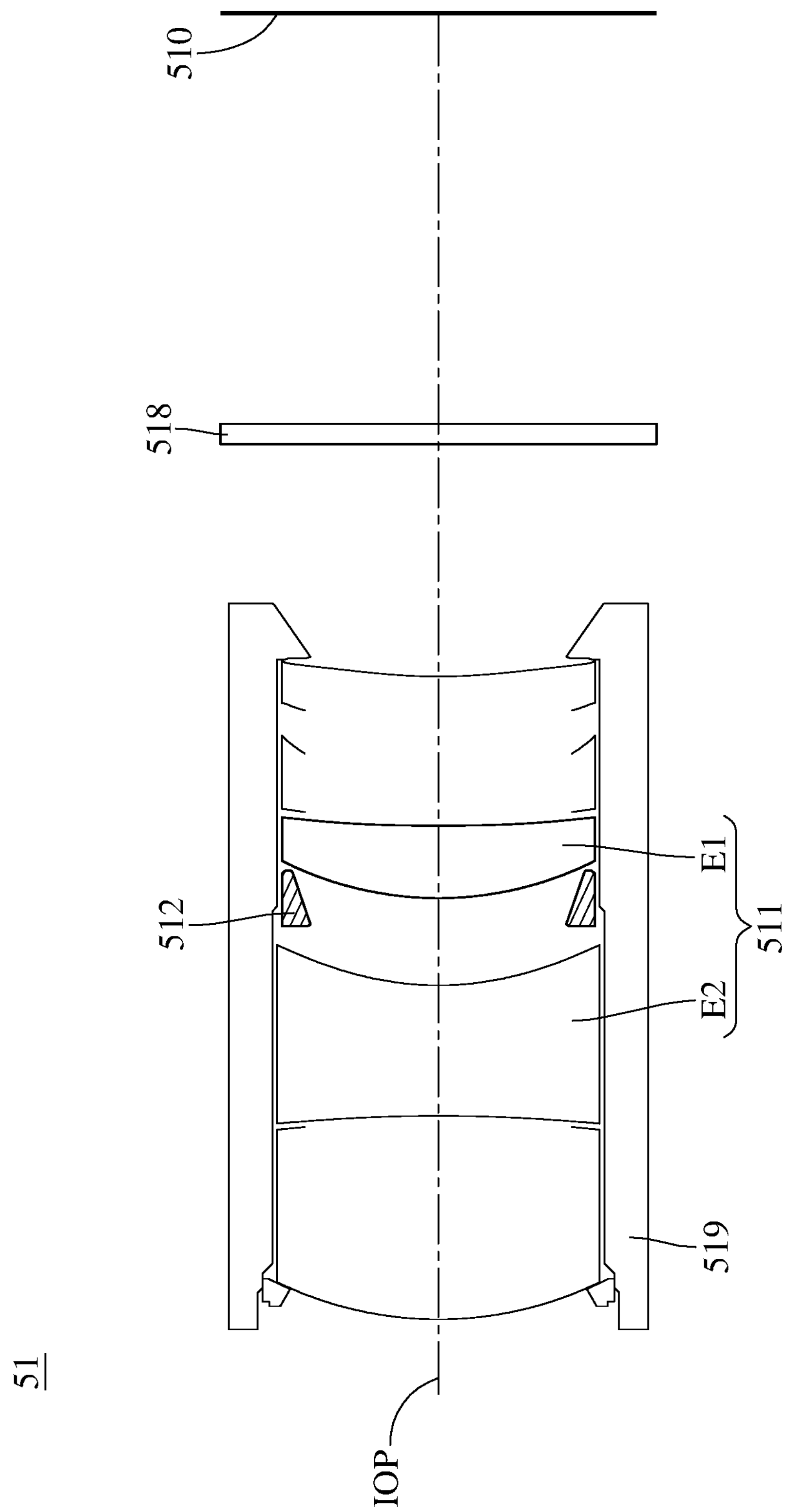
FIG. 29 is a cross-sectional view of the imaging lens system of the image capturing module along line 29-29 in FIG. 27.
Figure 30:
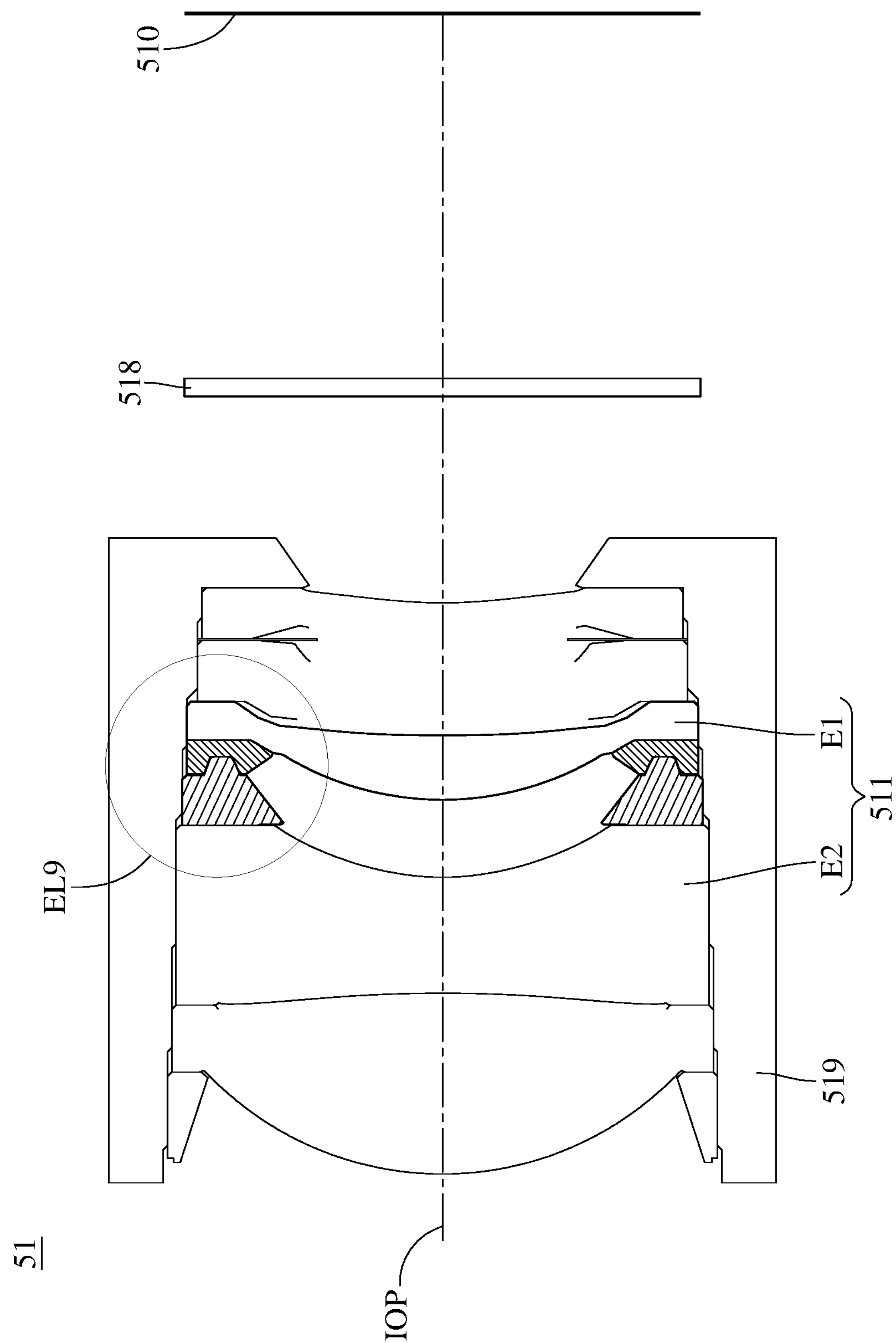
FIG. 30 is a cross-sectional view of the imaging lens system of the image capturing module along line 30-30 in FIG. 27.
Figure 31:
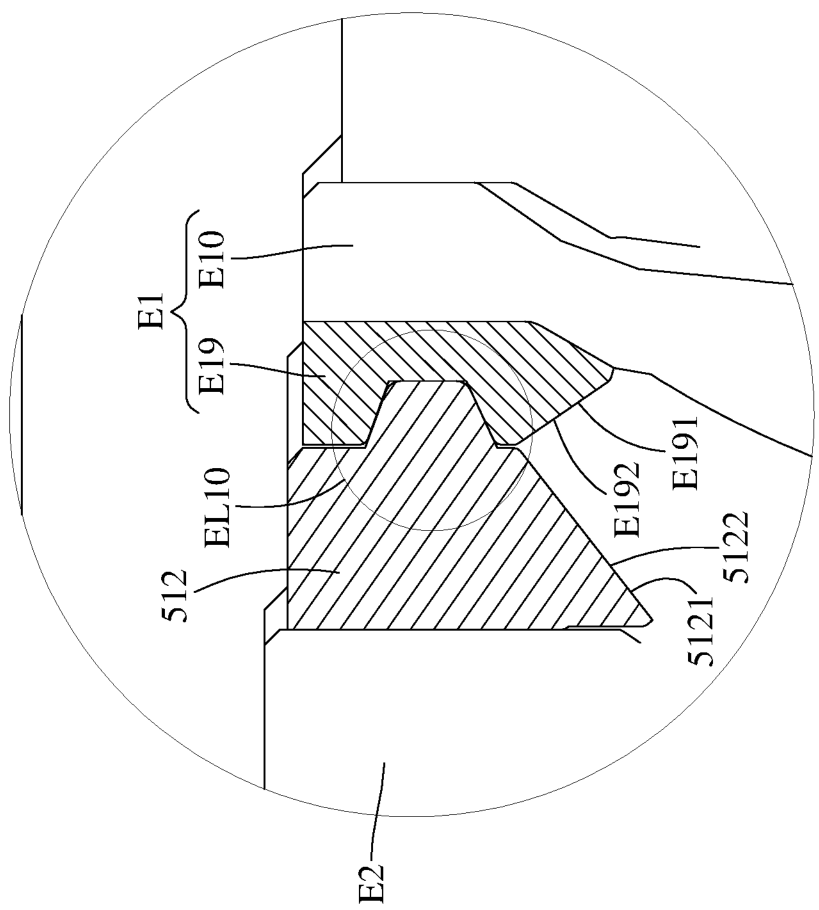
FIG. 31 is an enlarged view of region EL 9 in FIG. 30.
Figure 33:
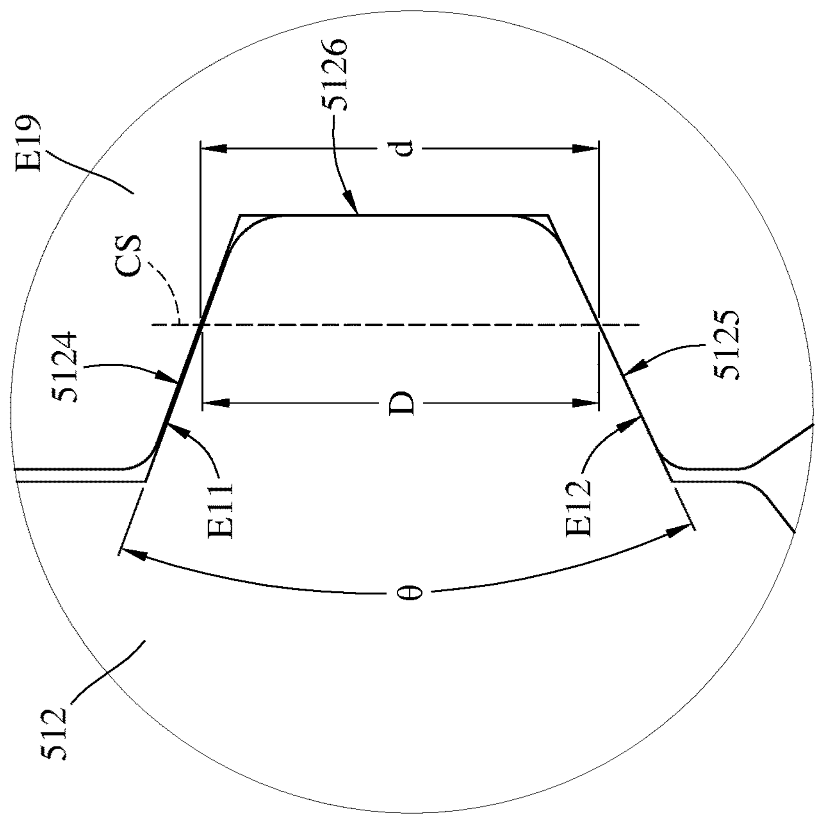
FIG. 33 is an enlarged view of region EL10 in FIG. 31 when the imaging lens system is in a second environment condition.
Figure 32:
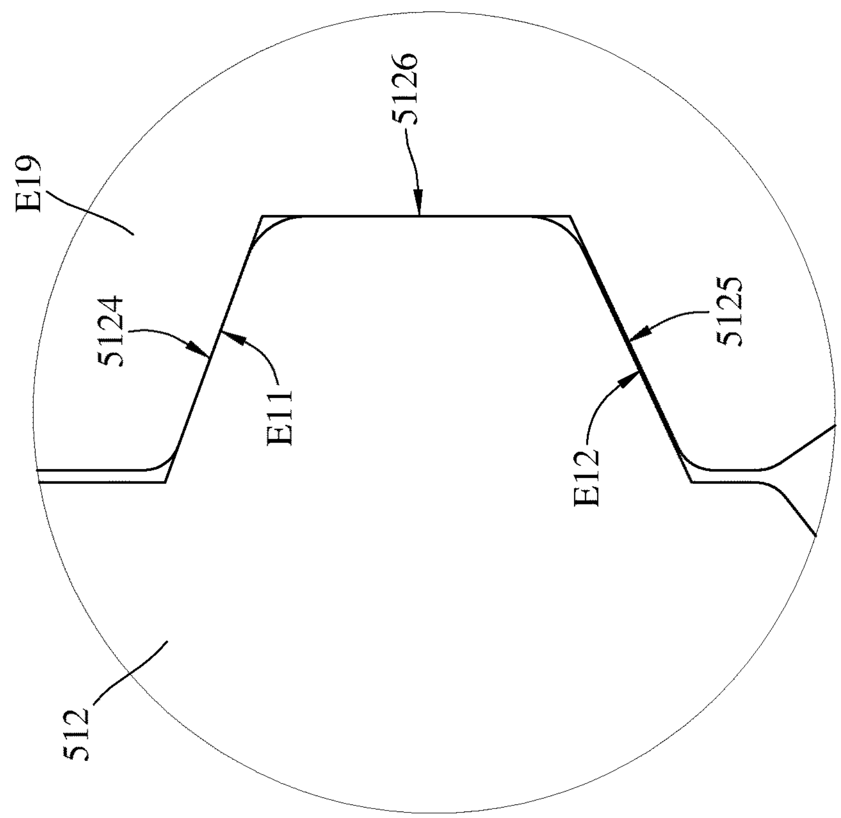
FIG. 32 is an enlarged view of region EL10 in FIG. 31 when the imaging lens system is in a first environment condition.

Please refer to FIG. 27 to FIG. 33. FIG. 27 is a sectional perspective view of an image capturing module according to the 5th embodiment of the present disclosure, FIG. 28 is an exploded view of a first lens element and an aperture element of an imaging lens system of the image capturing module in FIG. 27, FIG. 29 is a cross-sectional view of the imaging lens system of the image capturing module along line 29-29 in FIG. 27, FIG. 30 is a cross-sectional view of the imaging lens system of the image capturing module along line 30-30 in FIG. 27, FIG. 31 is an enlarged view of region EL 9 in FIG. 30, FIG. 32 is an enlarged view of region EL10 in FIG. 31 when the imaging lens system is in a first environment condition, and FIG. 33 is an enlarged view of region EL10 in FIG. 31 when the imaging lens system is in a second environment condition.

In this embodiment, an image capturing module includes an imaging lens system 51 and an image sensor 50. The image sensor 50 is disposed on an image surface 510 of the imaging lens system 51.

The imaging lens system 51 includes an imaging lens assembly 511, an aperture element 512, a filter 518 and a barrel 519. The barrel 519 is configured for holding the imaging lens assembly 511 and the aperture element 512. The filter 518 is disposed between the imaging lens assembly 511 and image surface 510.

The imaging lens assembly 511 includes, in order from an image side to an object side along an imaging optical path 10P of the imaging lens system 51, a first lens element E1 and a second lens element E2. The first lens element E1 has an optically effective region E10 and an opaque region E19. The imaging optical path 10P passes through the optically effective region E10 of the first lens element E1. The opaque region E19 surrounds the optically effective region E10, and the opaque region E19 and the optically effective region E10 are jointed together by two-shot molding process to integrally form the first lens element E1. In addition, the opaque region E19 and the optically effective region E10 can be made of the same material, and the opaque region E19 is formed by adding opaque pigments. Therefore, the connection between the opaque region E19 and the optically effective region E10 is enhanced. Furthermore, the opaque region and the optically effective region can alternatively be made of different materials.

The aperture element 512 is disposed between the first lens element E1 and the second lens element E2, and the aperture element 512 faces and is in physical contact with an object side of the first lens element E1. In specific, the aperture element 512 is in physical contact with the opaque region E19 of the first lens element E1. The aperture element 512 works as a spacer between adjacent two lens elements. In addition, the aperture element 512 is an opaque element, which includes an inner surface 5121 and an anti-reflective structure 5122. The inner surface 5121 surrounds the imaging optical path 10P and forms an aperture 5123, and the anti-reflective structure 5122 covers at least a part of the inner surface 5121. In this embodiment, the aperture element 512 is, for example, an opaque plastic component, ceramic component or metallic component.

One side of the aperture element 512 facing the first lens element E1 further include a first conical surface 5124, a second conical surface 5125 and a contact surface 5126. The first conical surface 5124 surrounds the imaging optical path 10P with the imaging optical path 10P as an axis. The second conical surface 5125 surrounds the imaging optical path 10P with the imaging optical path 10P as an axis, and the second conical surface 5125 is located closer to the aperture 5123 than the first conical surface 5124 to the aperture 5123. The contact surface 5126 is substantially perpendicular to the imaging optical path 10P, and the contact surface 5126 is in physical contact with the first lens element E1.

One side of the opaque region E19 of the first lens element E1 facing the aperture element 512 further includes a first counterpart conical surface E11 and a second counterpart conical surface E12. The first counterpart conical surface E11 and the first conical surface 5124 are disposed corresponding to each other, and the second counterpart conical surface E12 and the second conical surface 5125 are disposed corresponding to each other. Furthermore, the opaque region E19 further includes an inner surface E191 and an anti-reflective structure E192. The inner surface E191 faces the imaging optical path 10P, and the anti-reflective structure E192 covers at least a part of the inner surface E191.

In this embodiment, the inner surface 5121 of the aperture element 512 and the inner surface E191 of the opaque region E19 of the first lens element E1 are together provided with the anti-reflective structures 5122 and E192. Each of the anti-reflective structures 5122 and E192 is a recess structure recessed in a direction away from the imaging optical path 10P, which can prevent non-imaging light of large angle from reaching the image sensor 50 by reflection on the inner surfaces 5121 and E191, so that the aperture element 512 and the opaque region E19 of the first lens element E1 can reduce flare. Moreover, the inner surface 5121 of the aperture element 512 can further have a coating layer having a light absorption functionality so as to further improve image quality.

In this embodiment, the aperture element 512 and the lens elements of the imaging lens assembly 511 are non-circular, so that the size in a single dimension of the imaging lens system 51 can be reduced. As shown in FIG. 28, the first conical surface 5124, the second conical surface 5125, the first counterpart conical surface E11, the second counterpart conical surface E12 and the contact surface 5126 are adaptive surfaces and do not entirely surround the imaging optical path 10P. In specific, each of the first conical surface 5124, the second conical surface 5125, the first counterpart conical surface E11, the second counterpart conical surface E12 and the contact surface 5126 has two parts respectively disposed on opposite sides of the imaging optical path 10P and respectively formed in a C-shape, and the opaque region E19 of the first lens element E1 has two parts respective disposed on opposite sides of the optically effective region E10.

As shown in FIG. 32, when the imaging lens system 51 is in a first environment condition, the first conical surface 5124 is in physical contact with the first lens element E1, and the second conical surface 5125 is spaced apart from the first lens element E1. In the meantime, the aperture 5123 of the aperture element 512 is aligned with the optically effective region E10 of the first lens element E1. In addition, as shown in FIG. 33, when the imaging lens system 51 is in a second environment condition, the second conical surface 5125 is in physical contact with the first lens element E1, and the first conical surface 5124 is spaced apart from the first lens element E1. In the meantime, the aperture 5123 of the aperture element 512 is aligned with the optically effective region E10 of the first lens element E1. In addition, the contact surface 5126 of the aperture element 512 is maintained in physical contact with the first lens element E1. The first environment condition and the second environment condition have a temperature dependent relation. When a temperature of the first environment condition is Ta, and a temperature of the second environment condition is Tb, the following conditions are satisfied: Ta=323.1 K; Tb=293.1 K; and |Ta−Tb|=30 K. Furthermore, in this embodiment, a relative humidity of the first environment condition and a relative humidity of the second environment condition are the same, and both of them are, for example, 40%. Therefore, the first environment condition and the second environment condition have no humidity dependent relation.

As shown in FIG. 33, on a plane CS perpendicular to the imaging optical path 10P and crossing the first conical surface 5124, the first counterpart conical surface E11, the second conical surface 5125 and the second counterpart conical surface E12, when a minimum distance between the first conical surface 5124 and the second conical surface 5125 is D, and a minimum distance between the first counterpart conical surface E11 and the second counterpart conical surface E12 is d, the following conditions are satisfied: D=0.32 mm; d=0.322 mm; and |D−d|=2 um.

When an angle between the first conical surface 5124 and the second conical surface 5125 on a plane parallel to the imaging optical path 10P is θ, the following condition is satisfied: θ=45 degrees.

6th Embodiment

Figure 34:
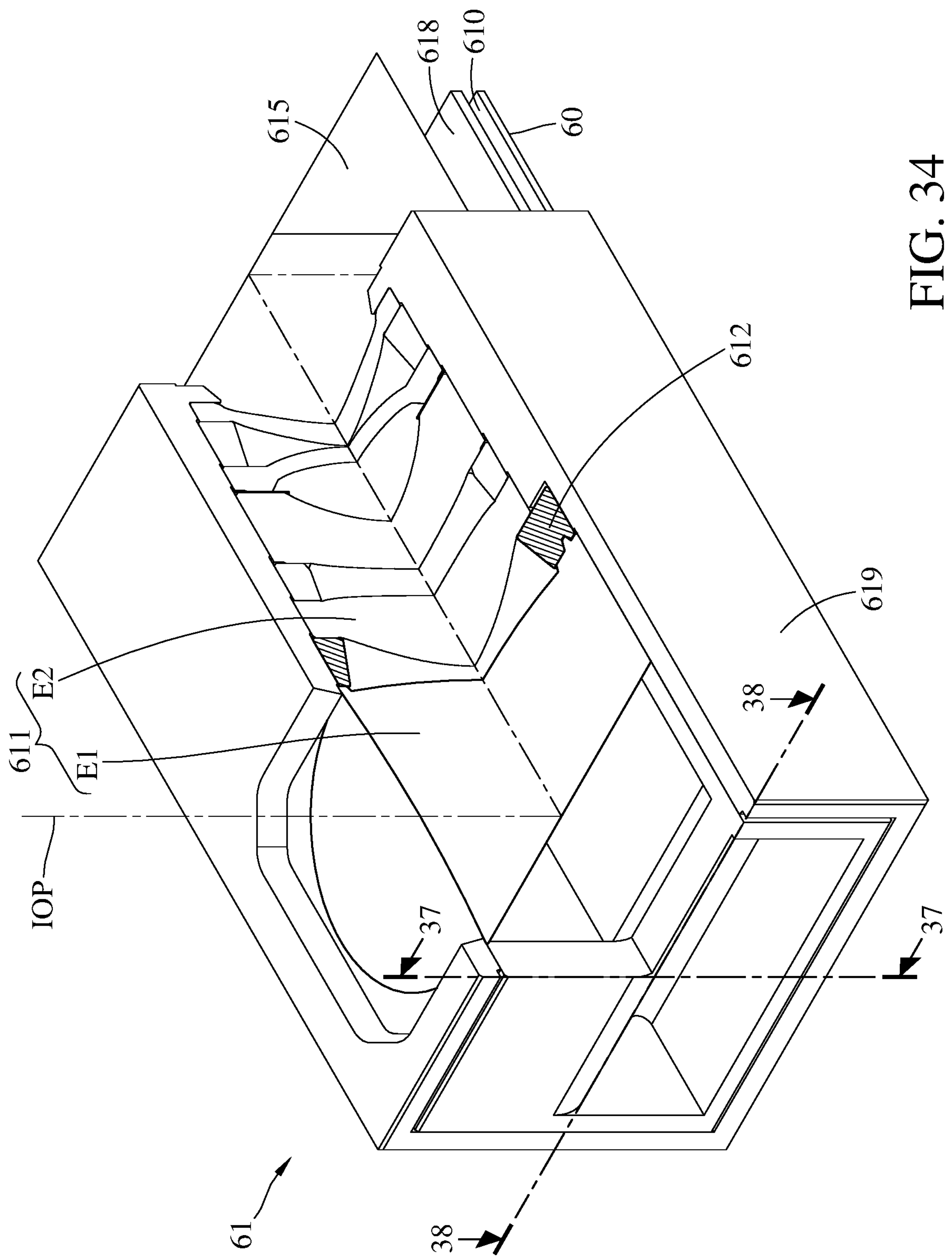
FIG. 34 is a sectional perspective view of an image capturing module according to the 6th embodiment of the present disclosure.
Figure 35:
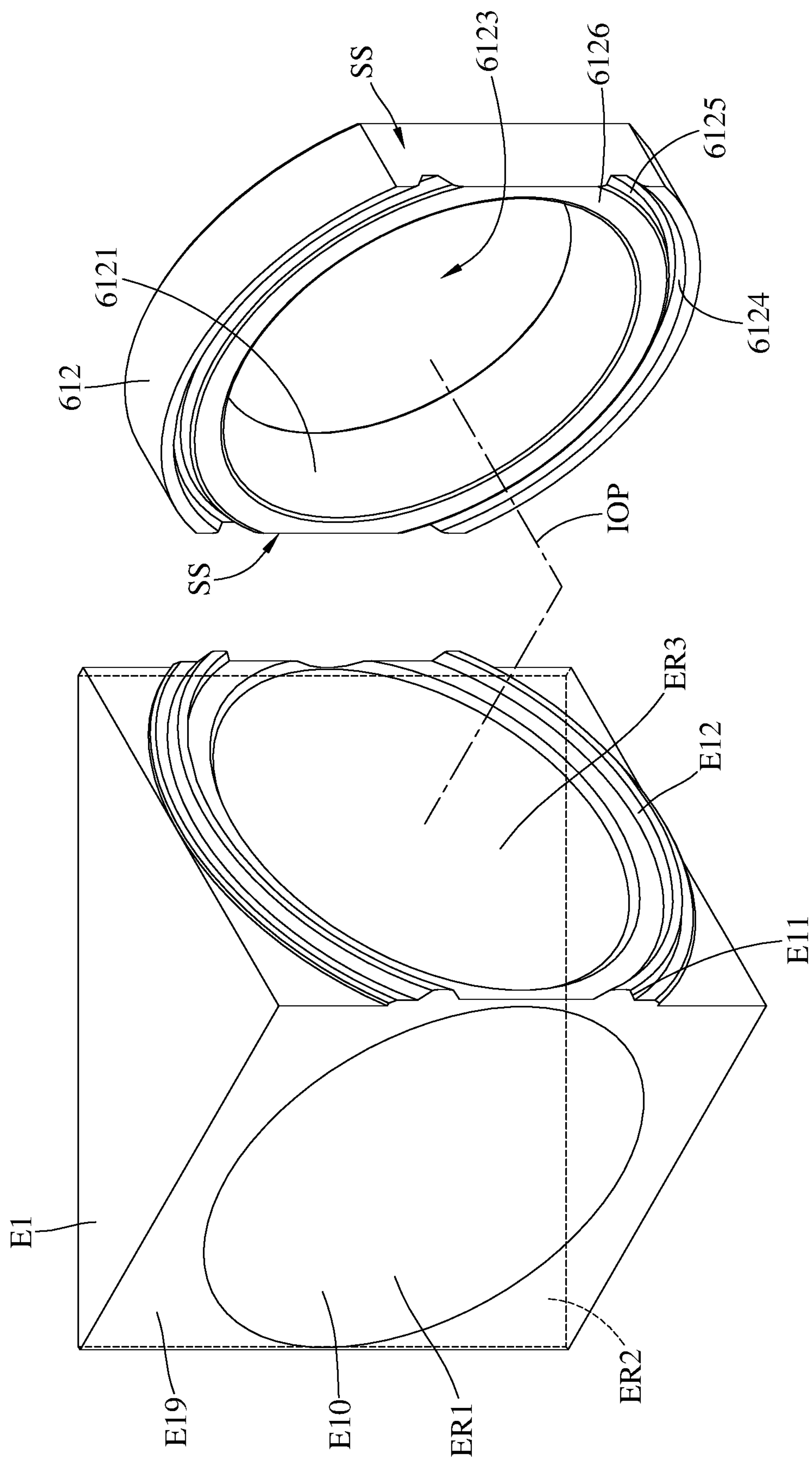
FIG. 35 is an exploded view of a first lens element and an aperture element of an imaging lens system of the image capturing module in FIG. 34.
Figure 36:
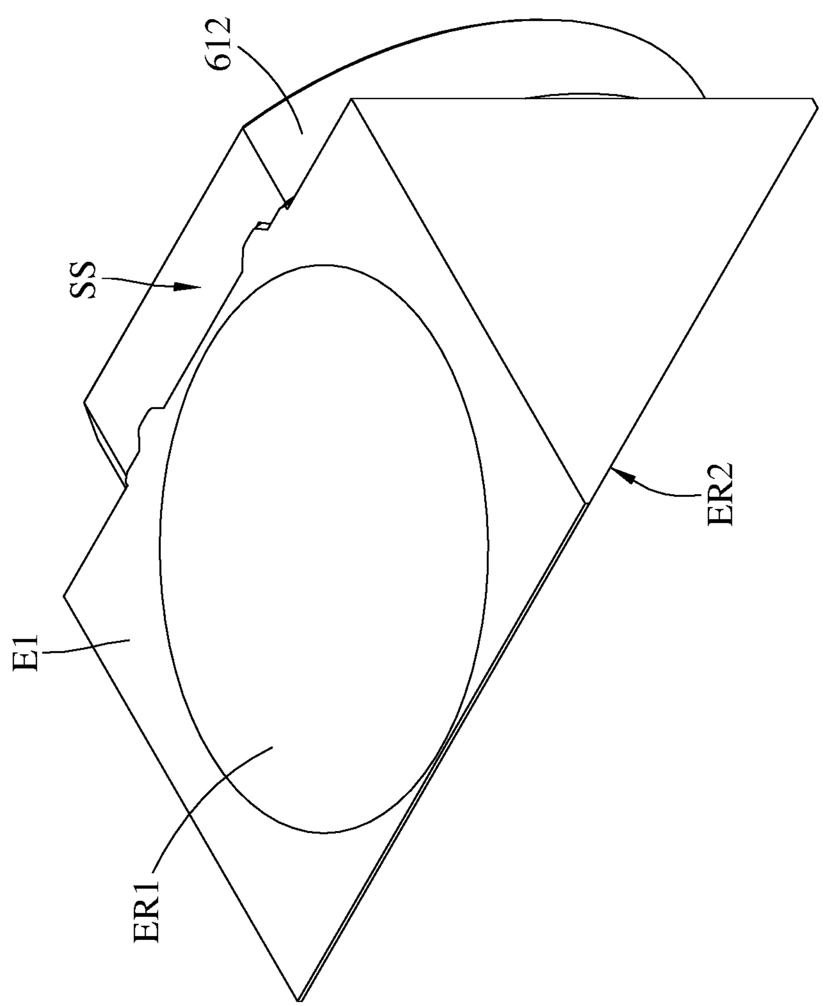
FIG. 36 is another exploded view of the first lens element and the aperture element of the imaging lens system of the image capturing module in FIG. 34.
Figure 37:
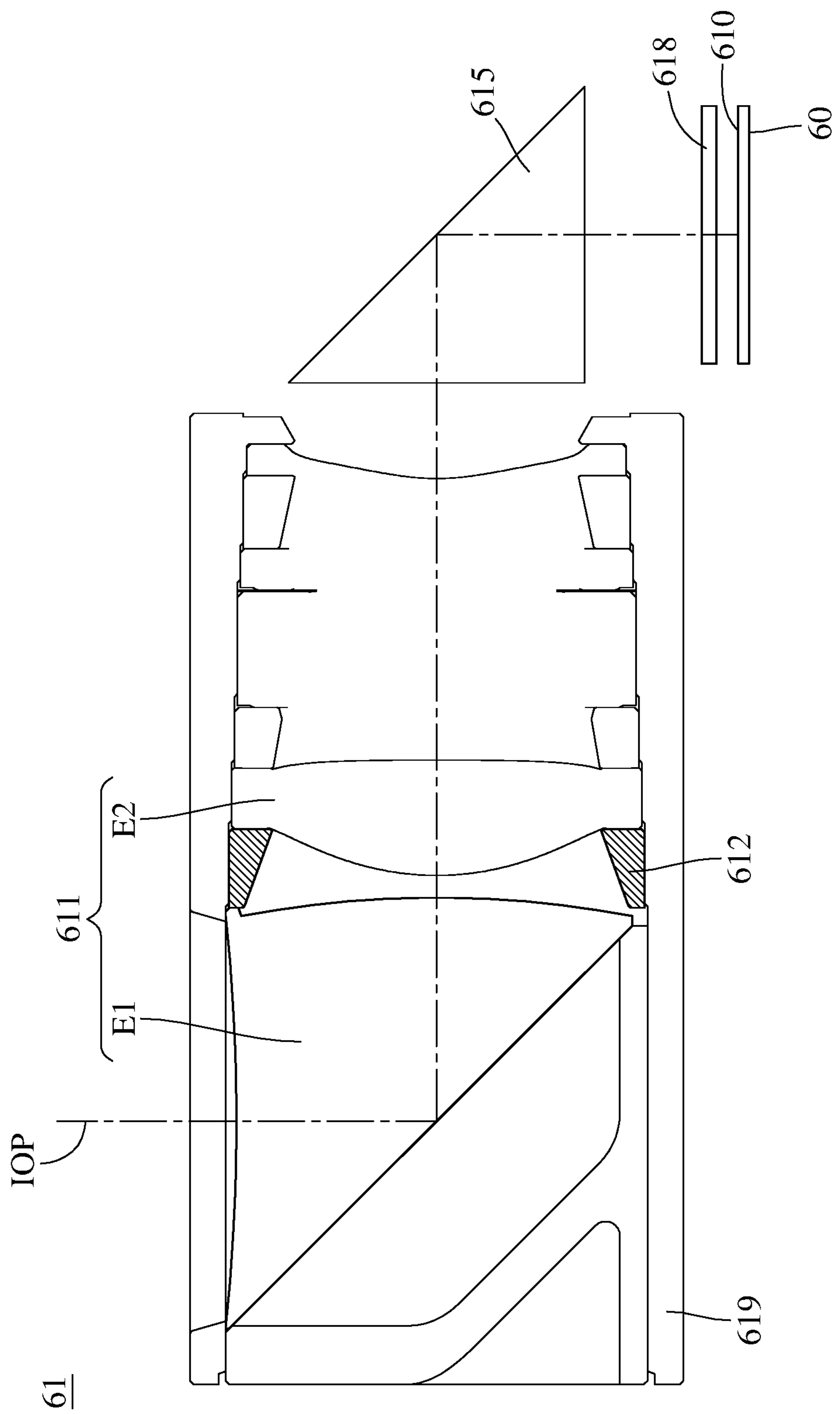
FIG. 37 is a cross-sectional view of the imaging lens system of the image capturing module along line 37-37 in FIG. 34.
Figure 38:
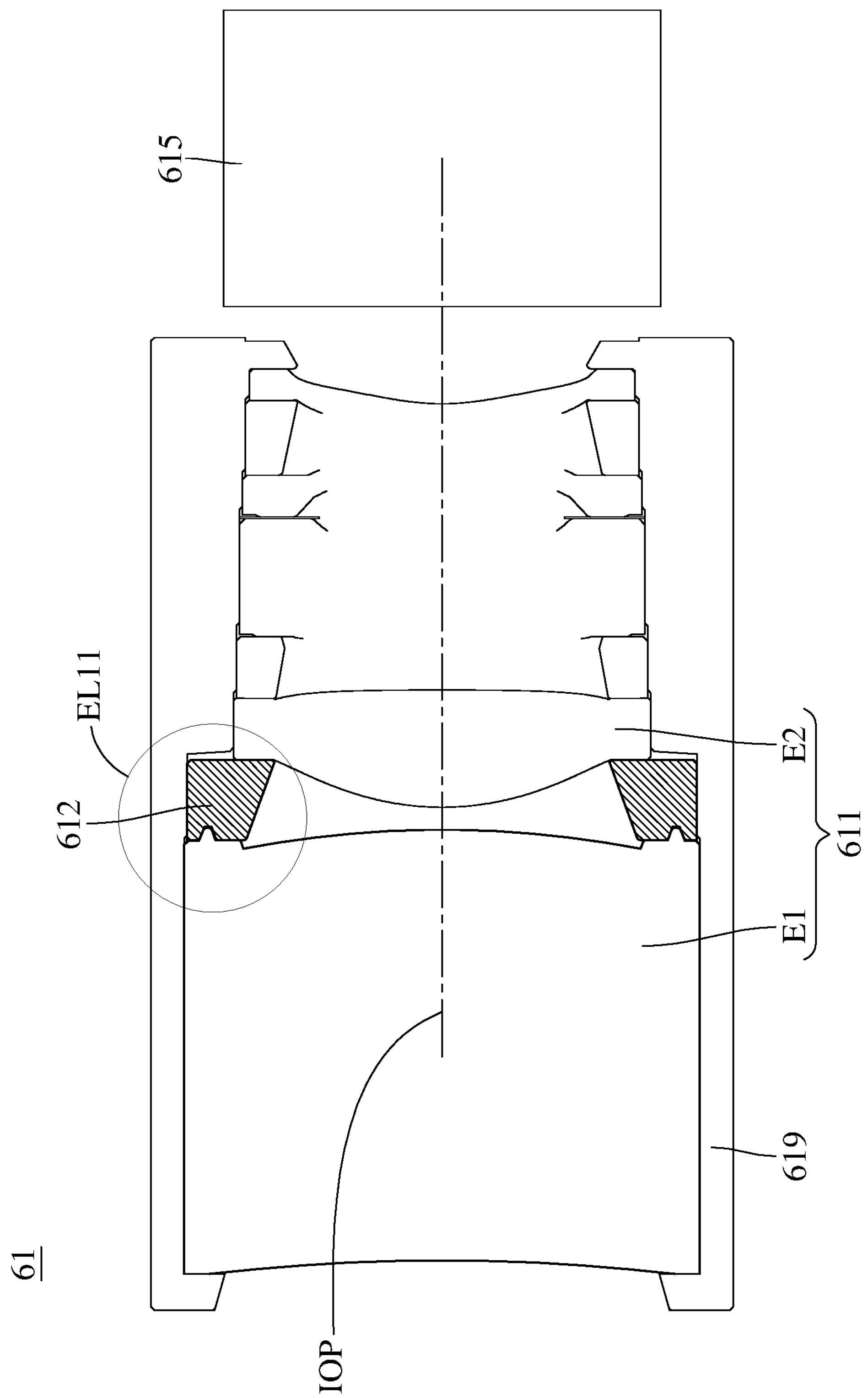
FIG. 38 is a cross-sectional view of the imaging lens system of the image capturing module along line 38-38 in FIG. 34.
Figure 39:
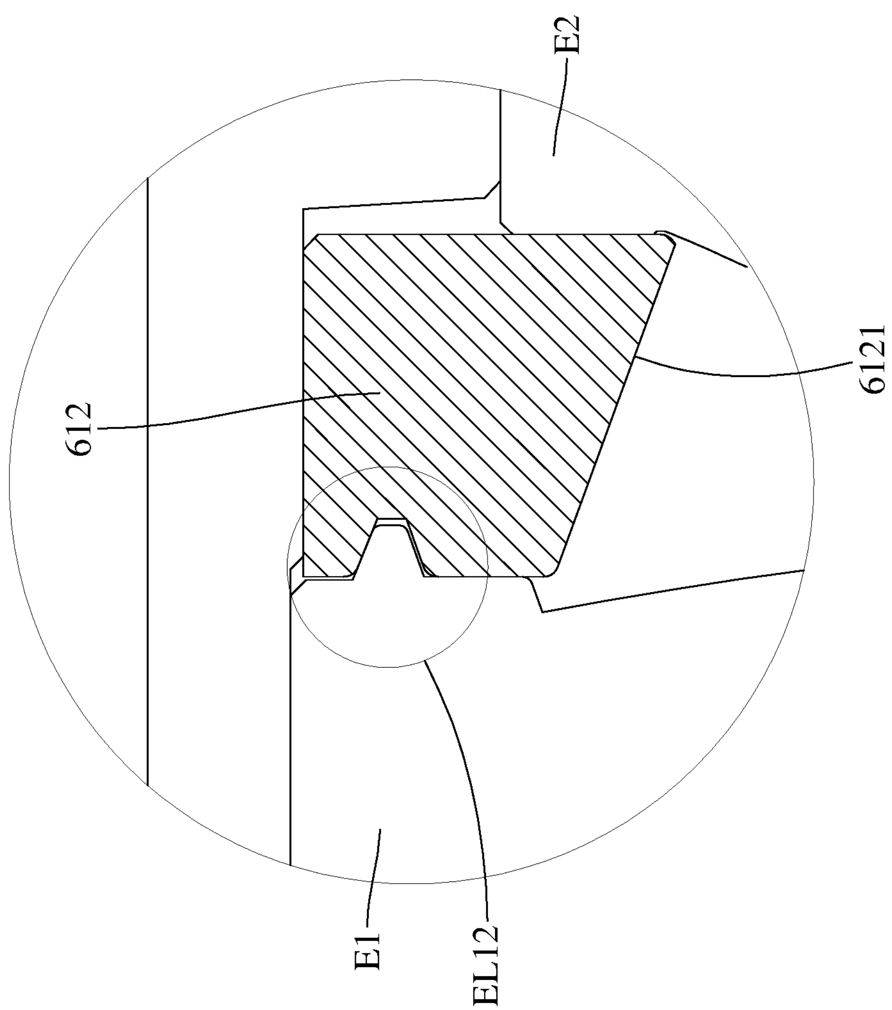
FIG. 39 is an enlarged view of region EL 11 in FIG. 38.
Figure 41:
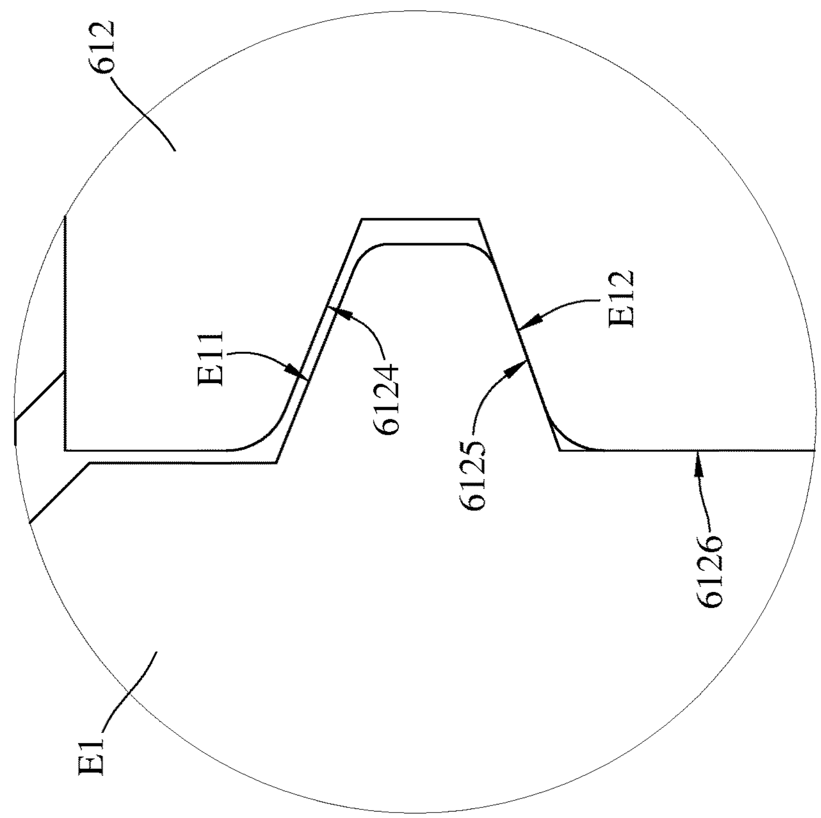
FIG. 41 is an enlarged view of region EL12 in FIG. 39 when the imaging lens system is in a second environment condition.
Figure 40:
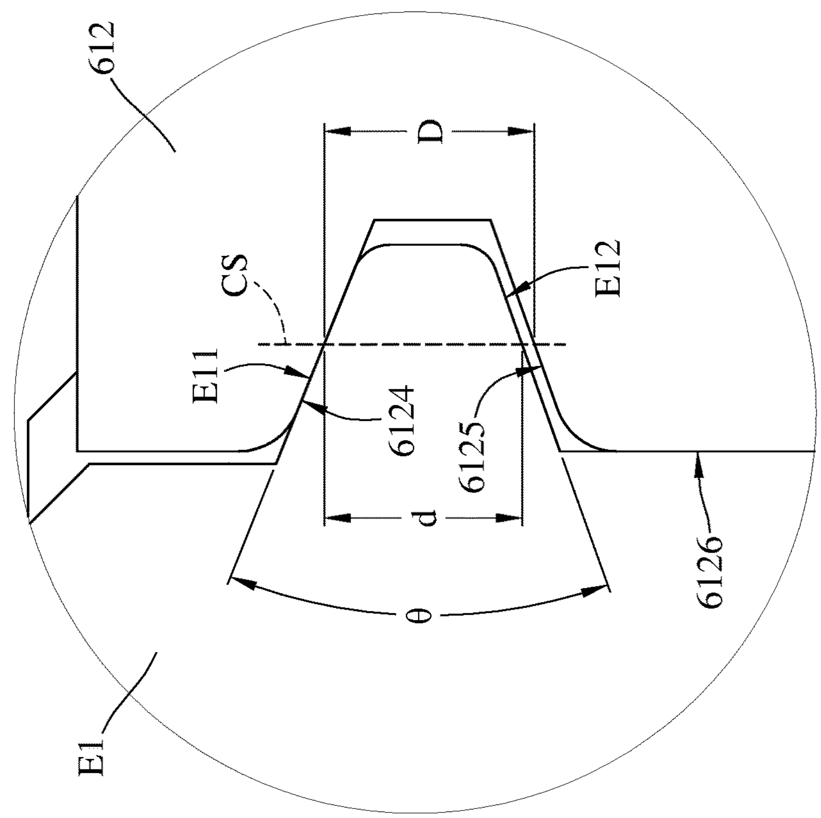
FIG. 40 is an enlarged view of region EL12 in FIG. 39 when the imaging lens system is in a first environment condition.

Please refer to FIG. 34 to FIG. 41. FIG. 34 is a sectional perspective view of an image capturing module according to the 6th embodiment of the present disclosure, FIG. 35 is an exploded view of a first lens element and an aperture element of an imaging lens system of the image capturing module in FIG. 34, FIG. 36 is another exploded view of the first lens element and the aperture element of the imaging lens system of the image capturing module in FIG. 34, FIG. 37 is a cross-sectional view of the imaging lens system of the image capturing module along line 37-37 in FIG. 34, FIG. 38 is a cross-sectional view of the imaging lens system of the image capturing module along line 38-38 in FIG. 34, FIG. 39 is an enlarged view of region EL 11 in FIG. 38, FIG. 40 is an enlarged view of region EL12 in FIG. 39 when the imaging lens system is in a first environment condition, and FIG. 41 is an enlarged view of region EL12 in FIG. 39 when the imaging lens system is in a second environment condition.

In this embodiment, an image capturing module includes an imaging lens system 61 and an image sensor 60. The image sensor 60 is disposed on an image surface 610 of the imaging lens system 61.

The imaging lens system 61 includes an imaging lens assembly 611, an aperture element 612, a reflection element 615, a filter 618 and a barrel 619. The barrel 619 is configured for holding the imaging lens assembly 611 and the aperture element 612. The filter 618 is disposed between the imaging lens assembly 611 and the image surface 610. The reflection element 615 is disposed between the imaging lens assembly 611 and the filter 618.

The imaging lens assembly 611 includes, in order from an object side to an image side along an imaging optical path 10P of the imaging lens system 61, a first lens element E1 and a second lens element E2. The first lens element E1 has an optically effective region E10 and an opaque region E19. The imaging optical path 10P passes through the optically effective region E10 of the first lens element E1. The opaque region E19 surrounds the optically effective region E10, and the opaque region E19 and the optically effective region E10 are jointed together by two-shot molding process to integrally form the first lens element E1.

The aperture element 612 is disposed between the first lens element E1 and the second lens element E2, and the aperture element 612 faces and is in physical contact with an image side of the first lens element E1. The aperture element 612 works as a spacer between adjacent two lens elements. Furthermore, the aperture element 612 is an opaque element, which includes an inner surface 6121, and the inner surface 6121 surrounds the imaging optical path 10P and forms an aperture 6123. In this embodiment, the aperture element 612 is, for example, an opaque plastic component, ceramic component or metallic component.

One side of the aperture element 612 facing the first lens element E1 further includes a first conical surface 6124, a second conical surface 6125 and a contact surface 6126. The first conical surface 6124 surrounds the imaging optical path 10P with the imaging optical path 10P as an axis. The second conical surface 6125 surrounds the imaging optical path 10P with the imaging optical path 10P as an axis, and the second conical surface 6125 is located closer to the aperture 6123 than the first conical surface 6124 to the aperture 6123. The contact surface 6126 is substantially perpendicular to the imaging optical path 10P, and the contact surface 6126 is in physical contact with the first lens element E1.

One side of the first lens element E1 facing the aperture element 612 further includes a first counterpart conical surface E11 and a second counterpart conical surface E12. The first counterpart conical surface E11 and the first conical surface 6124 are disposed corresponding to each other, and the second counterpart conical surface E12 and the second conical surface 6125 are disposed corresponding to each other.

In this embodiment, the first lens element E1 is a reflection lens element, which includes, in order from the object side to the image side along the imaging optical path 10P, a light entrance surface ER1, a reflecting surface ER2 and a light exit surface ER3, and the imaging optical path 10P is folded at the reflecting surface ER2.

As shown in FIG. 35, the aperture element 612 is non-circular so as to have a shape adaptive to the reflection lens element. Furthermore, the aperture element 612 can have two reducing surfaces SS, and the reducing surfaces SS intersect the first conical surface 6124 and the second conical surface 6125, and partially intersect the contact surface 6126. As such, the first conical surface 6124 and the second conical surface 6125 do not entirely surround the imaging optical path 10P. The contact surface 6126 has a width reduced in one direction perpendicular to the imaging optical path 10P. Moreover, each of the first conical surface 6124 and the second conical surface 6125 has two parts respectively disposed on opposite sides of the imaging optical path 10P and respectively formed in a C-shape.

As shown in FIG. 40, when the imaging lens system 61 is in a first environment condition, the first conical surface 6124 is in physical contact with the first lens element E1, and the second conical surface 6125 is spaced apart from the first lens element E1. In the meantime, the aperture 6123 of the aperture element 612 is aligned with the optically effective region E10 of the first lens element E1. In addition, as shown in FIG. 41, when the imaging lens system 61 is in a second environment condition, the second conical surface 6125 is in physical contact with the first lens element E1, and the first conical surface 6124 is spaced apart from the first lens element E1. In the meantime, the aperture 6123 of the aperture element 612 is aligned with the optically effective region E10 of the first lens element E1. In addition, the contact surface 6126 of the aperture element 612 is maintained in physical contact with the first lens element E1.

In this embodiment, the first environment condition and the second environment condition have a temperature dependent relation. When a temperature of the first environment condition is Ta, and a temperature of the second environment condition is Tb, the following conditions are satisfied: $Ta=298.1$ K; $Tb=363.1$ K; and $|Ta-Tb|=65$ K.

In this embodiment, the first environment condition and the second environment condition also have a humidity dependent relation. When a relative humidity of the first environment condition is RHa, and a relative humidity of the second environment condition is RHb, the following conditions are satisfied: $RHa=40\%$; $RHb=80\%$; and $|RHa-RHb|=40\%$.

As shown in FIG. 40, on a plane CS perpendicular to the imaging optical path 10P and crossing the first conical surface 6124, the first counterpart conical surface E11, the second conical surface 6125 and the second counterpart conical surface E12, when a minimum distance between the first conical surface 6124 and the second conical surface 6125 is D, and a minimum distance between the first counterpart conical surface E11 and the second counterpart conical surface E12 is d, the following conditions are satisfied: $D=0.17$ mm; $d=0.16$ mm; and $|D-d|=10$ um.

When an angle between the first conical surface 6124 and the second conical surface 6125 on a plane parallel to the imaging optical path 10P is θ, the following condition is satisfied: $\theta=41$ degrees.

7th Embodiment

Figure 42:
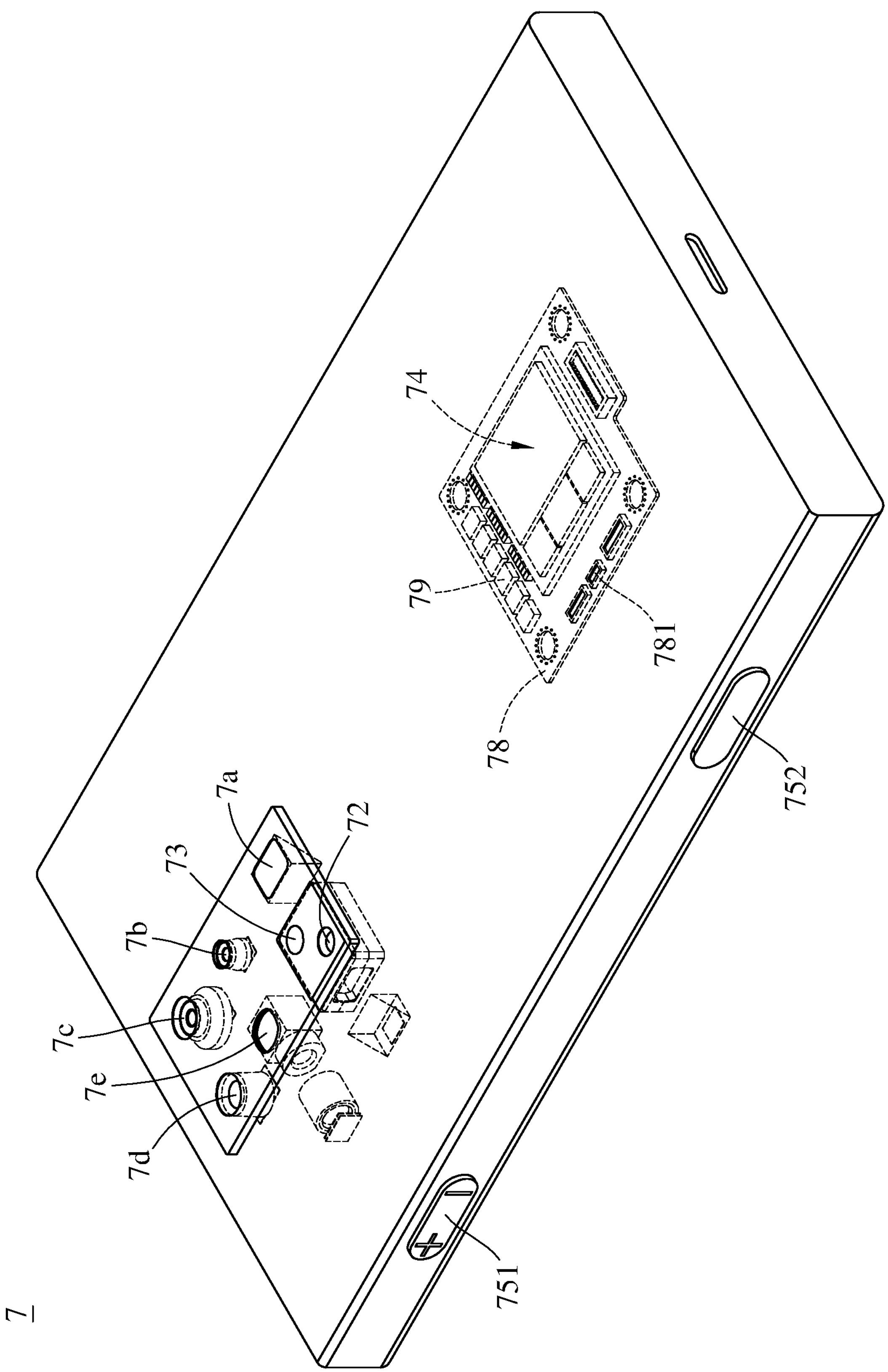
FIG. 42 is one perspective view of an electronic device according to the 7th embodiment of the present disclosure.
Figure 43:
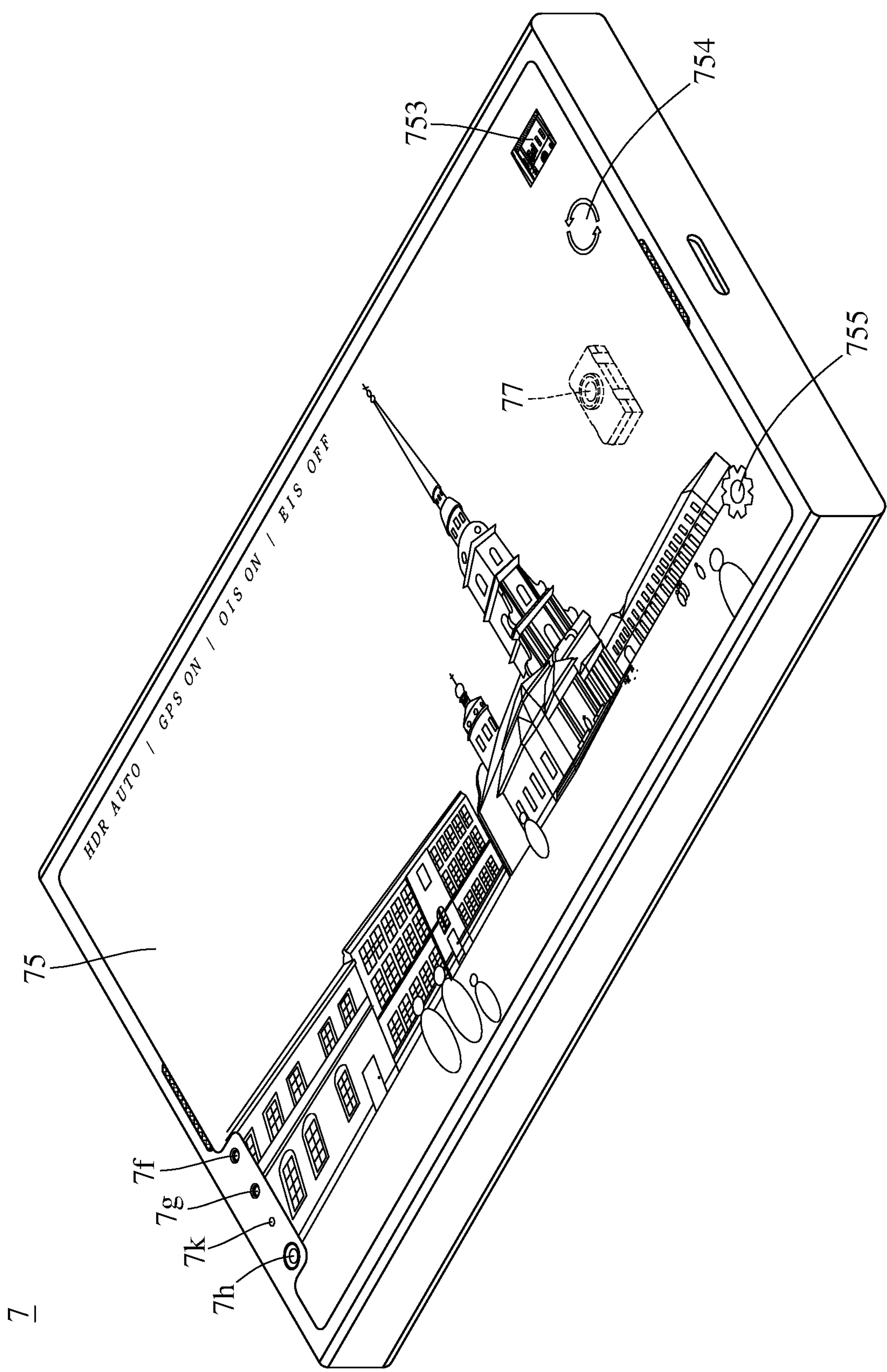
FIG. 43 is another perspective view of the electronic device in FIG. 42.
Figure 44:
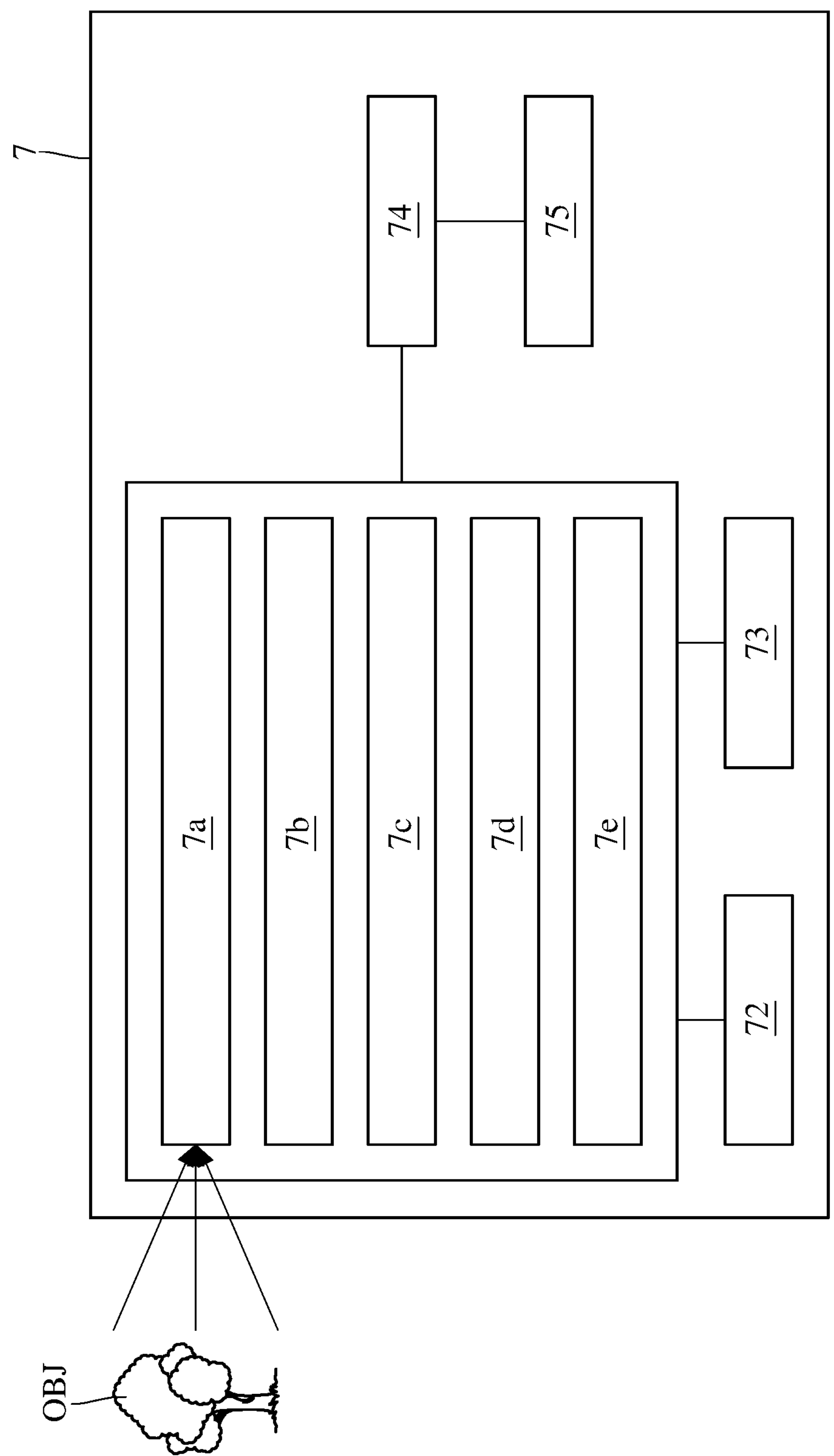
FIG. 44 is a block diagram of the electronic device in FIG. 42.

Please refer to FIG. 42 to FIG. 44. FIG. 42 is one perspective view of an electronic device according to the 7th embodiment of the present disclosure, FIG. 43 is another perspective view of the electronic device in FIG. 42, and FIG. 44 is a block diagram of the electronic device in FIG. 42.

In this embodiment, an electronic device 7 is a mobile device such as a computer, a smartphone, a smart wearable device, a camera drone, a driving recorder and displayer, and the present disclosure is not limited thereto. The electronic device 7 includes an image capturing module **7*a*, an image capturing module 7*b*, an image capturing module 7*c*, an image capturing module 7*d*, an image capturing module 7*e*, an image capturing module 7*f*, an image capturing module 7*g*, an image capturing module 74, a flash module 72, a focus assist module 73, an image signal processor, a display module 75, an image software processor and a biometric identification device 77**.

Each of the image capturing module **7*a*, the image capturing module 7*b*, the image capturing module 7*c*, the image capturing module 7*d*, the image capturing module 7*e*, the image capturing module 7*f*, the image capturing module 7*g* and the image capturing module 7*h*** may include the imaging lens system of the present disclosure and an image sensor.

Figure 45:
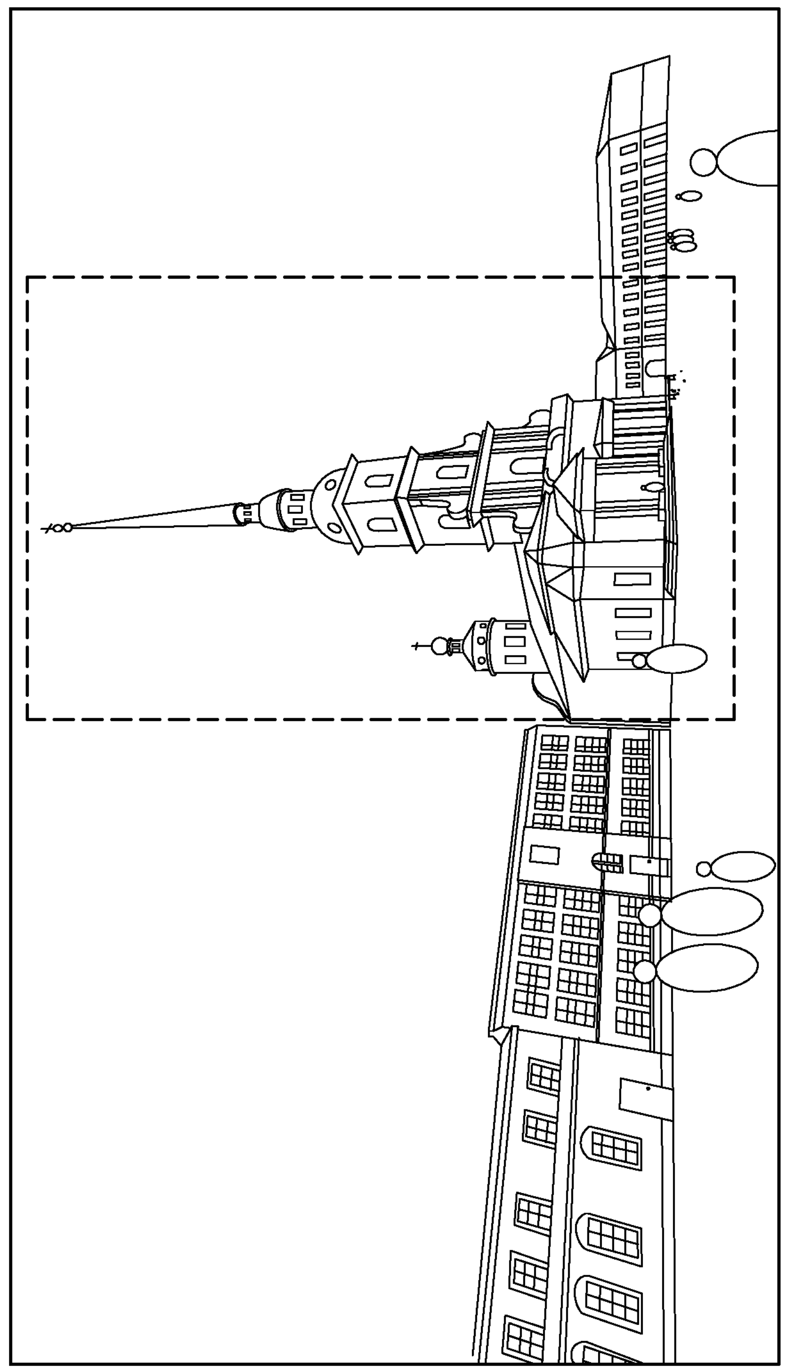
FIG. 45 shows an image captured by the electronic device in FIG. 42 with an equivalent focal length ranging between 11 mm and 14 mm.
Figure 46:
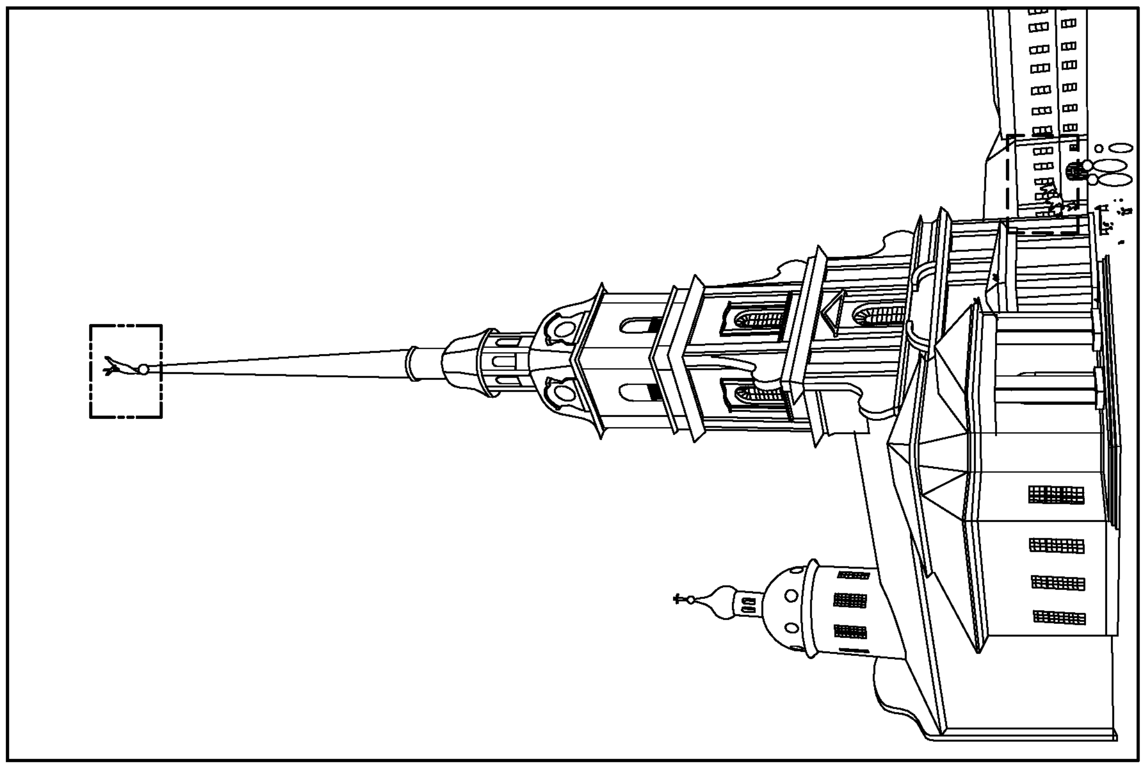
FIG. 46 shows an image captured by the electronic device in FIG. 42 with an equivalent focal length ranging between 22 mm and 30 mm.
Figure 47:
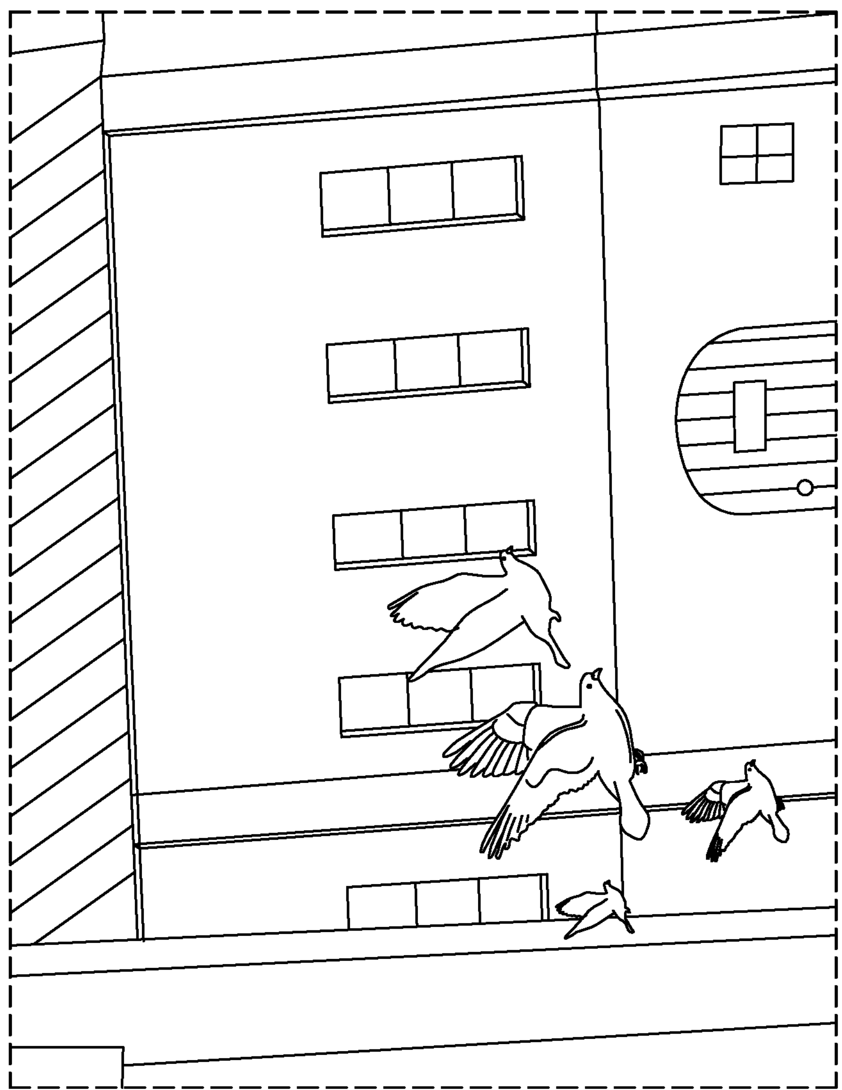
FIG. 47 shows an image captured by the electronic device in FIG. 42 with an equivalent focal length ranging between 60 mm and 300 mm.
Figure 48:
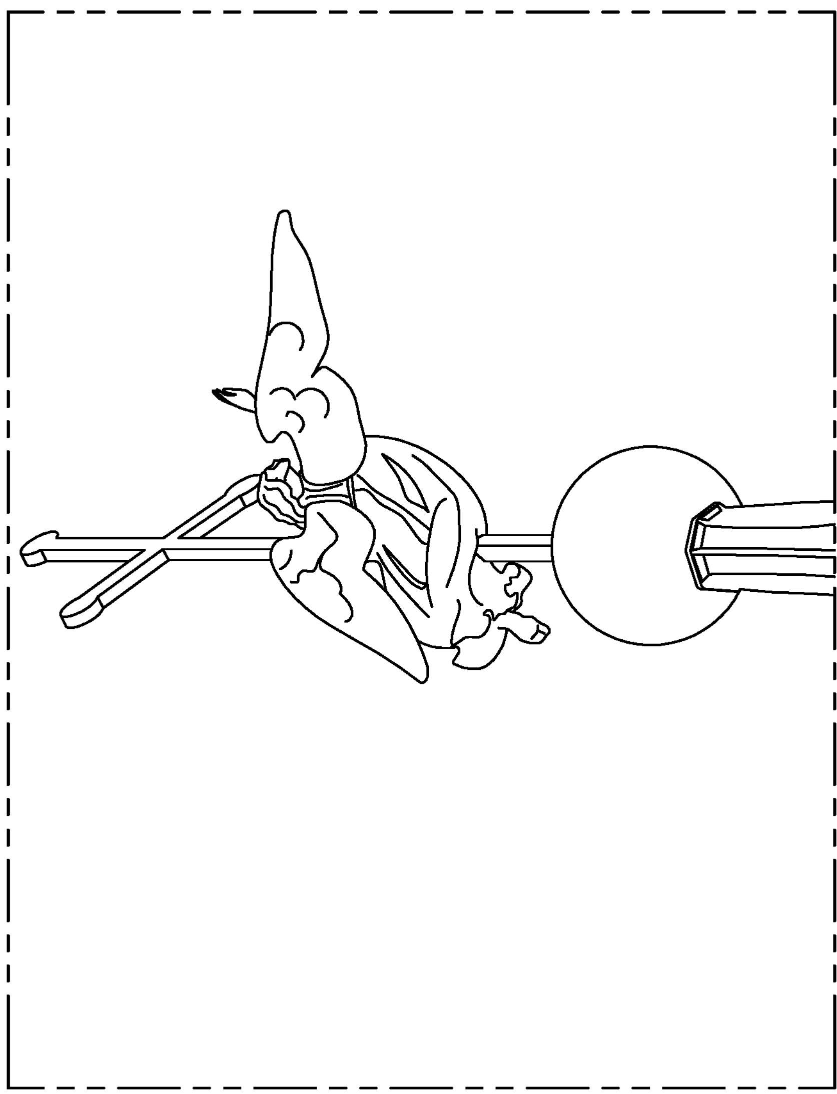
FIG. 48 shows an image captured by the electronic device in FIG. 42 with an equivalent focal length ranging between 400 mm and 600 mm.

The image capturing module **7*a*, the image capturing module 7*b*, the image capturing module 7*c*, the image capturing module 7*d* and the image capturing module 7*e* are disposed on the same side of the electronic device 7. The image capturing module 7*f*, the image capturing module 7*g*, the image capturing module 7*h* and the display module 75 are disposed on the opposite side of the electronic device 7. The display module 75 can be a user interface, so that the image capturing modules 7*f*, 7*g* and 7*h* can be front-facing cameras of the electronic device 7 for taking selfies, but the present disclosure is not limited thereto. The image capturing module 7*a* is an ultra-telephoto image capturing module, the image capturing module 7*b* is a macro-photo image capturing module, the image capturing module 7*c* is a wide-angle image capturing module, the image capturing module 7*d* is an ultra-wide-angle image capturing module, the image capturing module 7*e* is a telephoto image capturing module, the image capturing module 7*f* is an ultra-wide-angle image capturing module, the image capturing module 7*g* is a wide-angle image capturing module and the image capturing module 7*h* is a ToF (time of flight) image capturing module. In this embodiment, the image capturing modules 7***a*, 7*b*, 7*c*, 7*d* and 7*e* have different fields of view, such that the electronic device 7 can have various magnification ratios so as to meet the requirement of optical zoom functionality. For example, the ultra-wide-angle image capturing module 7*d* with the maximum field of view ranging between 105 degrees and 125 degrees can achieve an image with an equivalent focal length between 11 mm and 14 mm. In this case, the image captured by the ultra-wide-angle image capturing module 7*d* can refer to FIG. 45, which shows an image captured by the electronic device 7 with an equivalent focal length ranging between 11 mm and 14 mm, and the captured image as shown in FIG. 45 includes the whole cathedral, surrounding buildings and people on the square. The captured image as shown in FIG. 45 has a relatively large field of view and depth of view, but it often has a relatively large degree of distortion. The wide-angle image capturing module 7*c* with the maximum field of view ranging between 70 degrees and 90 degrees can achieve an image with an equivalent focal length between 22 mm and 30 mm. In this case, the image captured by the wide-angle image capturing module 7*c* can refer to FIG. 46, which shows an image captured by the electronic device 7 with an equivalent focal length ranging between 22 mm and 30 mm, and the captured image as shown in FIG. 46 includes the whole cathedral and people in front of the cathedral. The zoom-telephoto image capturing module 7*e* with the maximum field of view ranging between 10 degrees and 40 degrees can achieve an image with an equivalent focal length between 60 mm and 300 mm, and the zoom-telephoto image capturing module 7*e* can be regarded as able to provide 5× magnification. In this case, the image captured by the zoom-telephoto image capturing module 7*e* can refer to FIG. 47, which shows an image captured by the electronic device 7 with an equivalent focal length ranging between 60 mm and 300 mm, and the captured image as shown in FIG. 47 includes the birds flying in front of the cathedral. The captured image as shown in FIG. 47 has a relatively small field of view and depth of view, and the zoom-telephoto image capturing module 7*e* can be used for shooting moving targets. For this, a lens driving module can drive the imaging lens system to quickly and continuously autofocus on the target, such that the captured image of the target would not be blurred due to long focusing distance. When imaging, the zoom-telephoto image capturing module 7*e* can further perform optical zoom for imaged objects so as to obtain clearer images. Said magnification ratio of one image capturing module is defined as a ratio of the maximum focal length to the minimum focal length of the image capturing module. For instance, the magnification ratio of the zoom-telephoto image capturing module 7*e* is 5× magnification. The ultra-telephoto image capturing module 7*a* with the maximum field of view ranging between 4 degrees and 8 degrees can achieve an image with an equivalent focal length between 400 mm and 600 mm. In this case, the image captured by the ultra-telephoto image capturing module 7*a* can refer to FIG. 48, which shows an image captured by the electronic device 7 with an equivalent focal length ranging between 400 mm and 600 mm, and the captured image as shown in FIG. 48 includes the angel-and-cross-topped spire of the cathedral. The captured image as shown in FIG. 48 has a smaller field of view and depth of view, and the imaging lens system of the ultra-telephoto image capturing module 7*a* may easily capture an out of focus image due to slight camera shake. For this, the lens driving module can provide a feedback force to correct the shake so as to achieve optical image stabilization while providing a force to drive the imaging lens system of the ultra-telephoto image capturing module 7*a* to focus on a target. In addition, the image capturing module 7*h* can determine depth information of the imaged object. In this embodiment, the electronic device 7 includes multiple image capturing modules 7*a*, 7*b*, 7*c*, 7*d*, 7*e*, 7*f*, 7*g* and 7*h*, but the present disclosure is not limited to the number and arrangement of image capturing modules. The equivalent focal lengths to which the abovementioned image capturing modules correspond are estimated values based on particular conversion functions, and the estimated values may be different from actual focal lengths of the image capturing modules due to designs of the imaging lens systems and sizes of the image sensors.

When a user captures images of an object OBJ, light rays converge in the photographing camera 7*a*, the image capturing module 7*b*, the image capturing module 7*c*, the image capturing module 7*d*, the image capturing module 7*e* or the image capturing module 7*f* to generate images, and the flash module 72 is activated for light supplement. The focus assist module 73 detects the object distance of the imaged object OBJ to achieve fast auto focusing. The image signal processor is configured to optimize the captured image to improve image quality. The light beam emitted from the focus assist module 73 can be either conventional infrared or laser.

In addition, the light rays may converge in the image capturing module 7*f*, 7*g* or 7*h* to generate images. The electronic device 7 can include a reminder light 7*k* that can be illuminated to remind the user that the image capturing module 7*f*, 7*g* or 7*h* of the electronic device 7 is working. The display module 75 can be a touch screen or physical buttons such as a zoom button 751 and a shutter release button 752. The user is able to interact with the display module 75 and the image software processor having multiple functions to capture images and complete image processing. The image processed by the image software processor can be displayed on the display module 75. The user can replay the previously captured image through an image playback button 753 of the display module 75, can choose a suitable image capturing module for shooting through an image capturing modules switching button 754 of the display module 75, and can properly adjust shooting parameters according to current shooting situations through an integrated menu button 755 of the display module 75.

Further, the electronic device 7 further includes a circuit board 78 and a plurality of electronic components 79 disposed on the circuit board 78. The image capturing modules 7*a*, 7*b*, 7*c*, 7*d*, 7*e*, 7*f*, 7*g* and 7*h* are electrically connected to the electronic components 79 via connectors 781 on the circuit board 78. The electronic components 79 can include a signal emitting module and can transmit image(s) to other electronic device or a cloud storage via the signal emitting module. The signal emitting module can be a wireless fidelity (WiFi) module, a Bluetooth module, an infrared module, a network service module or an integrated module for transmitting various signals mentioned above, and the present disclosure is not limited thereto.

The electronic components 79 can also include a storage unit, a random access memory for storing image information, a gyroscope, and a position locator for facilitating the navigation or positioning of the electronic device 7. In this embodiment, the image signal processor, the image software processor and the random access memory are integrated into a single chip system 74, but the present disclosure is not limited thereto. In some other embodiments, the electronic components can also be integrated in the image capturing module or can also be disposed on one of the circuit boards.

In addition, the user can use the biometric identification device 77 to turn on and unlock the electronic device 7.

The smartphone in this embodiment is only exemplary for showing the imaging lens system of the present disclosure installed in an electronic device, and the present disclosure is not limited thereto. The imaging lens system can be optionally applied to optical systems with a movable focus. Furthermore, the imaging lens system features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens system, comprising:

a first lens element, having an optically effective region, and an imaging optical path of the imaging lens system passing through the optically effective region; and an aperture element, surrounding the imaging optical path and forming an aperture, and the aperture element facing and in physical contact with an object side or an image side of the first lens element;

wherein one side of the aperture element facing the first lens element comprises:

a first conical surface, surrounding the imaging optical path;

a second conical surface, surrounding the imaging optical path, and the second conical surface located closer to the aperture than the first conical surface to the aperture; and a contact surface, substantially perpendicular to the imaging optical path, and the contact surface in physical contact with the first lens element;

wherein when the imaging lens system is in a first environment condition, the first conical surface is in physical contact with the first lens element, the second conical surface is spaced apart from the first lens element, and the aperture is aligned with the optically effective region;

wherein when the imaging lens system is in a second environment condition, the second conical surface is in physical contact with the first lens element, the first conical surface is spaced apart from the first lens element, and the aperture is aligned with the optically effective region;

wherein the first environment condition and the second environment condition have at least one of the following relations:

a temperature dependent relation, wherein a temperature of the first environment condition is Ta, a temperature of the second environment condition is Tb, and the following condition is satisfied: $6\ K \leq |Ta-Tb| \leq 198\ K$; and a humidity dependent relation, wherein a relative humidity of the first environment condition is RHa, a relative humidity of the second environment condition is RHb, and the following condition is satisfied: $14\% \leq |RHa-RHb| \leq 81\%$.

2. The imaging lens system of claim 1, wherein the first lens element further comprises a first counterpart conical surface and a second counterpart conical surface, the first counterpart conical surface and the first conical surface are disposed corresponding to each other, and the second counterpart conical surface and the second conical surface are disposed corresponding to each other;

wherein on a plane perpendicular to the imaging optical path and crossing the first conical surface, the first counterpart conical surface, the second conical surface and the second counterpart conical surface, a minimum distance between the first conical surface and the second conical surface is D, a minimum distance between the first counterpart conical surface and the second counterpart conical surface is d, and the following condition is satisfied:

$$0.2\ \text{um} \leq |D-d| \leq 19.8\ \text{um}.$$

3. The imaging lens system of claim 2, wherein the first lens element further comprises an opaque region surrounding the optically effective region, the opaque region has the first counterpart conical surface and the second counterpart conical surface, and the opaque region and the optically effective region are jointed together by two-shot molding process to integrally form the first lens element.

4. The imaging lens system of claim 1, wherein an angle between the first conical surface and the second conical surface on a plane parallel to the imaging optical path is θ, and the following condition is satisfied:

$12\ \text{degrees} \leq \theta \leq 145\ \text{degrees}$.

5. The imaging lens system of claim 1, further comprising a second lens element, wherein the aperture element further comprises an inner surface surrounding the imaging optical path and forming the aperture, and the second lens element is disposed in the aperture and in physical contact with the inner surface.

6. The imaging lens system of claim 1, wherein the aperture element further comprises an inner surface and an anti-reflective structure, the inner surface surrounds the imaging optical path and forms the aperture, and the anti-reflective structure covers at least a part of the inner surface.

7. The imaging lens system of claim 1, further comprising a second lens element, wherein the second lens element and the aperture element are integrally jointed together by two-shot molding process.

8. The imaging lens system of claim 1, wherein the first lens element is a reflection lens element, the first lens element comprises, in order from the object side to the image side along the imaging optical path, a light entrance surface, at least one reflecting surface and a light exit surface, and the imaging optical path is folded at the at least one reflecting surface.

9. The imaging lens system of claim 1, further comprising a light-shielding element disposed between the first lens element and the aperture element.

10. The imaging lens system of claim 1, wherein at least one of the first conical surface and the second conical surface does not entirely surround the imaging optical path.

11. The imaging lens system of claim 1, wherein the aperture element is an opaque element.

12. The imaging lens system of claim 1, further comprising a third lens element, wherein the third lens element is spaced apart from the first lens element, and the aperture element is disposed between the first lens element and the third lens element.

13. An image capturing module, comprising:
the imaging lens system of claim 1; and
an image sensor, disposed on an image surface of the imaging lens system.

14. An electronic device, comprising:
the image capturing module of claim 13.

15. An imaging lens system, comprising:
a first aperture element, surrounding an imaging optical path of the imaging lens system and forming a first aperture; and
a second aperture element, surrounding the imaging optical path and forming a second aperture, and the second aperture element facing and in physical contact with an object side or an image side of the first aperture element;
wherein one side of the first aperture element facing the second aperture element comprises:
a first conical surface, surrounding the imaging optical path;
a second conical surface, surrounding the imaging optical path, and the second conical surface located closer to the first aperture than the first conical surface to the first aperture; and
a contact surface, substantially perpendicular to the imaging optical path, and the contact surface in physical contact with the second aperture element;
wherein when the imaging lens system is in a first environment condition, the first conical surface is in physical contact with the second aperture element, the second conical surface is spaced apart from the second aperture element, and the first aperture is aligned with the second aperture;
wherein when the imaging lens system is in a second environment condition, the second conical surface is in physical contact with the second aperture element, the first conical surface is spaced apart from the second aperture element, and the first aperture is aligned with the second aperture;
wherein the first environment condition and the second environment condition have at least one of the following relations:
a temperature dependent relation, wherein a temperature of the first environment condition is Ta, a temperature of the second environment condition is Tb, and the following condition is satisfied: 6 K≤|Ta−Tb|≤198 K; and
a humidity dependent relation, wherein a relative humidity of the first environment condition is RHa, a relative humidity of the second environment condition is RHb, and the following condition is satisfied: 14%≤|RHa−RHb|≤81%.

16. The imaging lens system of claim 15, wherein the second aperture element further comprises a first counterpart conical surface and a second counterpart conical surface, the first counterpart conical surface and the first conical surface are disposed corresponding to each other, and the second counterpart conical surface and the second conical surface are disposed corresponding to each other;
wherein on a plane perpendicular to the imaging optical path and crossing the first conical surface, the first counterpart conical surface, the second conical surface and the second counterpart conical surface, a minimum distance between the first conical surface and the second conical surface is D, a minimum distance between the first counterpart conical surface and the second counterpart conical surface is d, and the following condition is satisfied:

$$0.2\ \text{um} \le |D-d| \le 19.8\ \text{um}.$$

17. The imaging lens system of claim 15, wherein an angle between the first conical surface and the second conical surface on a plane parallel to the imaging optical path is θ, and the following condition is satisfied:
12 degrees≤θ≤145 degrees.

18. The imaging lens system of claim 15, further comprising a first lens element, wherein the first aperture element further comprises an inner surface surrounding the imaging optical path and forming the first aperture, and the first lens element is disposed in the first aperture and in physical contact with the inner surface.

19. The imaging lens system of claim 15, wherein the first aperture element further comprises an inner surface and an anti-reflective structure, the inner surface surrounds the imaging optical path and forms the first aperture, and the anti-reflective structure covers at least a part of the inner surface.

20. The imaging lens system of claim 15, further comprising a first lens element, wherein the first lens element and the first aperture element are integrally jointed together by two-shot molding process.

21. The imaging lens system of claim 20, wherein the first lens element is a reflection lens element, the first lens element comprises, in order from the object side to the image side along the imaging optical path, a light entrance surface, at least one reflecting surface and a light exit surface, and the imaging optical path is folded at the at least one reflecting surface.

22. The imaging lens system of claim 15, further comprising a light-shielding element disposed between the first aperture element and the second aperture element.

23. The imaging lens system of claim 15, wherein at least one of the first conical surface and the second conical surface does not entirely surround the imaging optical path.

24. The imaging lens system of claim 15, wherein the first aperture element and the second aperture element are opaque elements.

25. An image capturing module, comprising:
the imaging lens system of claim 15; and
an image sensor, disposed on an image surface of the imaging lens system.

26. An electronic device, comprising:
the image capturing module of claim 25.

27. An imaging lens system, comprising:
a first lens element, having a first optically effective region, and an imaging optical path of the imaging lens system passing through the first optically effective region; and
a second lens element, comprising a second optically effective region and an opaque region, the imaging optical path passing through the second optically effective region, the opaque region is located farther away from the imaging optical path than the second optically effective region to the imaging optical path, and the opaque region facing and in physical contact with an object side or an image side of the first lens element;

wherein one side of the opaque region facing the first lens element comprises:

a first conical surface, surrounding the imaging optical path;

a second conical surface, surrounding the imaging optical path, and the second conical surface is located closer to the second optically effective region than the first conical surface to the second optically effective region; and a contact surface, substantially perpendicular to the imaging optical path, and the contact surface in physical contact with the first lens element;

wherein when the imaging lens system is in a first environment condition, the first conical surface is in physical contact with the first lens element, the second conical surface is spaced apart from the first lens element, and the first optically effective region is aligned with the second optically effective region;

wherein when the imaging lens system is in a second environment condition, the second conical surface is in physical contact with the first lens element, the first conical surface is spaced apart from the first lens element, and the first optically effective region is aligned with the second optically effective region;

wherein the first environment condition and the second environment condition have at least one of the following relations:

a temperature dependent relation, wherein a temperature of the first environment condition is Ta, wherein a temperature of the second environment condition is Tb, and the following condition is satisfied: $6\ K \leq |Ta-Tb| \leq 198\ K$; and a humidity dependent relation, wherein a relative humidity of the first environment condition is RHa, a relative humidity of the second environment condition is RHb, and the following condition is satisfied: $14\% \leq |RHa-RHb| \leq 81\%$.

28. The imaging lens system of claim 27, wherein the first lens element further comprises a first counterpart conical surface and a second counterpart conical surface, the first counterpart conical surface and the first conical surface are disposed corresponding to each other, and the second counterpart conical surface and the second conical surface are disposed corresponding to each other;

wherein on a plane perpendicular to the imaging optical path and crossing the first conical surface, the first counterpart conical surface, the second conical surface and the second counterpart conical surface, a minimum distance between the first conical surface and the second conical surface is D, a minimum distance between the first counterpart conical surface and the second counterpart conical surface is d, and the following condition is satisfied:

$$0.2\ \text{um} \leq |D-d| \leq 19.8\ \text{um}.$$

29. The imaging lens system of claim 27, wherein an angle between the first conical surface and the second conical surface on a plane parallel to the imaging optical path is θ, and the following condition is satisfied:

$$12\ \text{degrees} \leq \theta \leq 145\ \text{degrees}.$$

30. The imaging lens system of claim 27, wherein the opaque region further comprises an inner surface and an anti-reflective structure, the inner surface faces the imaging optical path, and the anti-reflective structure covers at least a part of the inner surface.

31. The imaging lens system of claim 27, wherein one of the first lens element and the second lens element is a reflection lens element, the reflection lens element comprises, in order from the object side to the image side along the imaging optical path, a light entrance surface, at least one reflecting surface and a light exit surface, and the imaging optical path is folded at the at least one reflecting surface.

32. The imaging lens system of claim 27, further comprising a light-shielding element disposed between the first lens element and the second lens element.

33. The imaging lens system of claim 27, wherein at least one of the first conical surface and the second conical surface does not entirely surround the imaging optical path.

34. The imaging lens system of claim 27, wherein the opaque region and the second optically effective region are jointed together by two-shot molding process to integrally form the second lens element, the opaque region is an aperture element, and the opaque region surrounds the imaging optical path and forms an aperture.

35. An image capturing module, comprising:

the imaging lens system of claim 27; and an image sensor, disposed on an image surface of the imaging lens system.

36. An electronic device, comprising:

the image capturing module of claim 35.

* * * * *